US010361900B2

(12) United States Patent
Jung et al.

(10) Patent No.: US 10,361,900 B2
(45) Date of Patent: *Jul. 23, 2019

(54) METHODS AND SYSTEMS FOR MANAGING DATA

(71) Applicant: Elwha LLC, Bellevue, WA (US)

(72) Inventors: Edward K. Y. Jung, Bellevue, WA (US); Royce A. Levien, Lexington, MA (US); Richard T. Lord, Tacoma, WA (US); Robert W. Lord, Seattle, WA (US); Mark A. Malamud, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,612

(22) Filed: Nov. 26, 2012

(65) Prior Publication Data

US 2014/0123306 A1    May 1, 2014

Related U.S. Application Data

(63) Continuation of application No. 13/685,488, filed on Nov. 26, 2012, now Pat. No. 9,755,884, which is a
(Continued)

(51) Int. Cl.
*G06F 21/00* (2013.01)
*H04L 29/06* (2006.01)
(Continued)

(52) U.S. Cl.
CPC .......... *H04L 29/0602* (2013.01); *G06F 21/60* (2013.01); *G06F 21/6218* (2013.01);
(Continued)

(58) Field of Classification Search
None
See application file for complete search history.

(56) References Cited

U.S. PATENT DOCUMENTS 6,029,175 A * 2/2000 Chow ............... G06F 17/30899
6,122,520 A 9/2000 Want et al.
(Continued)

FOREIGN PATENT DOCUMENTS

EP       1818807 A      8/2007
WO    WO 01/28273 A1   4/2001

OTHER PUBLICATIONS

PCT International Search Report; International App. No. PCT/US14/19562; dated Jun. 10, 2014; pp. 1-2.
(Continued)

*Primary Examiner* — Maung T Lwin

(57) ABSTRACT

Computationally implemented methods and systems include identifying one or more services configured to be provided to a user of a device, said identifying at least partly based on data regarding one or more properties of the device, requesting access to data collected by one or more portions of the device, in exchange for providing at least a portion of one of the one or more identified services, and providing at least a portion of the one or more services after receiving access to the data collectable by one or more portions of the device. In addition to the foregoing, other aspects are described in the claims, drawings, and text.

42 Claims, 35 Drawing Sheets

Related U.S. Application Data continuation-in-part of application No. 13/987,300, filed on Oct. 30, 2012, now Pat. No. 10,091,325, and a continuation-in-part of application No. 13/385,604, filed on Oct. 31, 2012, now Pat. No. 9,088,450.

(51) Int. Cl.

| | | |
|---|---|---|
| *H04L 29/08* | (2006.01) | |
| *G06F 21/60* | (2013.01) | |
| *H04L 12/24* | (2006.01) | |
| *G06F 21/62* | (2013.01) | |

(52) U.S. Cl.
CPC .... *G06F 21/6254* (2013.01); *H04L 29/06551* (2013.01); *H04L 29/08072* (2013.01); *H04L 41/5054* (2013.01); *H04L 63/10* (2013.01); *H04L 67/16* (2013.01); *H04L 67/18* (2013.01); *H04L 69/329* (2013.01); *G06F 2221/2111* (2013.01); *G06F 2221/2117* (2013.01); *G06F 2221/2141* (2013.01); *G06F 2221/2149* (2013.01); *G06F 2221/2153* (2013.01)

(56) References Cited

U.S. PATENT DOCUMENTS

| | | | |
|---|---|---|---|
| 6,509,830 B1* | 1/2003 | Elliott | H04W 64/00 340/286.02 |
| 6,810,321 B1 | 10/2004 | Cook | |
| 6,871,277 B1 | 3/2005 | Keronen | |
| 7,178,034 B2 | 2/2007 | Cihula et al. | |
| 7,203,752 B2 | 4/2007 | Rice et al. | |
| 7,216,263 B2 | 5/2007 | Takaoka et al. | |
| 7,269,853 B1 | 9/2007 | Dunn | |
| 7,496,652 B2* | 2/2009 | Pezzutti | H04L 41/065 709/217 |
| 7,647,164 B2* | 1/2010 | Reeves | H04L 67/16 455/404.2 |
| 7,680,889 B2 | 3/2010 | Blumenau et al. | |
| 7,685,238 B2 | 3/2010 | Etelapera | |
| 7,849,311 B2 | 12/2010 | Donlin et al. | |
| 7,860,807 B2* | 12/2010 | Kaneko et al. | 705/400 |
| 7,873,957 B2 | 1/2011 | Nallipogu et al. | |
| 7,913,312 B2 | 3/2011 | de Jong | |
| 7,917,154 B2 | 3/2011 | Fortescue et al. | |
| 7,996,682 B2 | 8/2011 | Schutz et al. | |
| 8,175,794 B1 | 5/2012 | Szybalski | |
| 8,364,389 B2 | 1/2013 | Dorogusker et al. | |
| 8,387,155 B2 | 2/2013 | Gregg et al. | |
| 8,504,729 B2* | 8/2013 | Pezzutti | H04L 41/065 379/93.02 |
| 8,554,608 B1* | 10/2013 | O'Connor | G08G 1/202 705/1.1 |
| 8,578,483 B2 | 11/2013 | Seshadri et al. | |
| 8,630,494 B1 | 1/2014 | Svendsen | |
| 8,756,321 B2 | 6/2014 | Clark et al. | |
| 8,838,751 B1* | 9/2014 | Scofield | H04W 4/02 455/456.1 |
| 9,047,648 B1 | 6/2015 | Lekutai et al. | |
| 2001/0025316 A1* | 9/2001 | Oh | H04L 63/083 709/231 |
| 2002/0032798 A1* | 3/2002 | Xu | H04L 29/06 709/238 |
| 2003/0023726 A1* | 1/2003 | Rice et al. | 709/225 |
| 2003/0045308 A1* | 3/2003 | Sidhu | H04L 12/4633 455/466 |
| 2003/0130893 A1 | 7/2003 | Farmer | |
| 2003/0145229 A1* | 7/2003 | Cohen | H04L 29/06 726/14 |
| 2003/0191877 A1 | 10/2003 | Zaudtke et al. | |
| 2003/0217137 A1* | 11/2003 | Roese | G01S 5/02 709/223 |
| 2004/0002902 A1* | 1/2004 | Muehlhaeuser | G06Q 20/12 705/26.1 |
| 2004/0036611 A1* | 2/2004 | Kidney | G08G 1/123 340/573.1 |
| 2004/0122956 A1* | 6/2004 | Myers | H04W 88/06 709/228 |
| 2004/0128500 A1* | 7/2004 | Cihula et al. | 713/155 |
| 2004/0214576 A1* | 10/2004 | Myers | H04L 63/0272 455/445 |
| 2004/0230835 A1 | 11/2004 | Goldfeder et al. | |
| 2005/0162699 A1 | 7/2005 | Fukunaga et al. | |
| 2005/0182825 A1* | 8/2005 | Eytchison | H04L 67/16 709/217 |
| 2005/0272445 A1 | 12/2005 | Zellner | |
| 2005/0278342 A1 | 12/2005 | Abdo et al. | |
| 2006/0010047 A1 | 1/2006 | Minor | |
| 2006/0031337 A1 | 2/2006 | Kim | |
| 2006/0181411 A1* | 8/2006 | Fast | G01S 5/0018 340/539.13 |
| 2006/0229778 A1* | 10/2006 | Obradovich | G01C 21/26 701/517 |
| 2007/0006321 A1 | 1/2007 | Bantz et al. | |
| 2007/0044143 A1 | 2/2007 | Zhu et al. | |
| 2007/0113079 A1 | 5/2007 | Ito et al. | |
| 2007/0136466 A1 | 6/2007 | Etelapera | |
| 2007/0142727 A1 | 6/2007 | Zhang et al. | |
| 2007/0232268 A1 | 10/2007 | Park et al. | |
| 2007/0273583 A1 | 11/2007 | Rosenberg | |
| 2008/0046886 A1 | 2/2008 | Brown et al. | |
| 2008/0076451 A1* | 3/2008 | Sheha | G01C 21/3679 455/456.3 |
| 2008/0102856 A1 | 5/2008 | Fortescue et al. | |
| 2008/0126541 A1* | 5/2008 | Rosenberg | H04L 65/1016 709/225 |
| 2008/0133423 A1* | 6/2008 | Adiga | G06Q 40/04 705/80 |
| 2008/0153670 A1 | 6/2008 | McKirdy et al. | |
| 2008/0189793 A1 | 8/2008 | Kirkup et al. | |
| 2008/0207232 A1 | 8/2008 | Rice et al. | |
| 2008/0229389 A1 | 9/2008 | Singh et al. | |
| 2008/0242311 A1* | 10/2008 | Craine | G08B 21/0269 455/456.1 |
| 2008/0275604 A1* | 11/2008 | Perry | B60R 25/2018 701/31.5 |
| 2009/0077085 A1 | 3/2009 | Olivieri et al. | |
| 2009/0117921 A1* | 5/2009 | Beydler | G01S 5/0027 455/457 |
| 2009/0119119 A1* | 5/2009 | Scalisi | G06Q 10/08 705/333 |
| 2009/0147711 A1* | 6/2009 | Lee | G01S 19/25 370/310 |
| 2009/0160970 A1 | 6/2009 | Fredlund et al. | |
| 2009/0248833 A1 | 10/2009 | Frazier | |
| 2009/0287837 A1* | 11/2009 | Felsher | G06F 19/328 709/229 |
| 2010/0015993 A1 | 1/2010 | Dingler et al. | |
| 2010/0024020 A1 | 1/2010 | Baugher et al. | |
| 2010/0035596 A1* | 2/2010 | Nachman | G06F 17/30241 455/418 |
| 2010/0070475 A1 | 3/2010 | Chen | |
| 2010/0082237 A1 | 4/2010 | Black | |
| 2010/0094458 A1 | 4/2010 | Sagady et al. | |
| 2010/0107225 A1* | 4/2010 | Spencer | H04L 63/0876 726/4 |
| 2010/0131642 A1* | 5/2010 | Chalikouras | G06Q 30/02 709/224 |
| 2010/0151842 A1* | 6/2010 | De Vries | H04L 12/5895 455/414.1 |
| 2010/0238985 A1 | 9/2010 | Traywick et al. | |
| 2010/0323657 A1 | 12/2010 | Barnard et al. | |
| 2010/0324819 A1 | 12/2010 | Nurminen et al. | |
| 2010/0325239 A1 | 12/2010 | Khedouri et al. | |
| 2011/0007901 A1* | 1/2011 | Ikeda | H04B 5/02 380/270 |
| 2011/0018759 A1 | 1/2011 | Bennett et al. | |
| 2011/0022468 A1 | 1/2011 | Muster et al. | |
| 2011/0029358 A1* | 2/2011 | Hyde | G06Q 30/02 705/14.1 |

(56) References Cited

U.S. PATENT DOCUMENTS

| | | |
|---|---|---|
| 2011/0059693 A1* | 3/2011 | O'Sullivan .......... G06Q 10/00 455/41.1 |
| 2011/0093941 A1 | 4/2011 | Liu et al. |
| 2011/0099040 A1* | 4/2011 | Felt .................. G06F 17/3087 705/7.12 |
| 2011/0125866 A1 | 5/2011 | Williams |
| 2011/0128568 A1 | 6/2011 | Bhogal et al. |
| 2011/0136472 A1 | 6/2011 | Rector et al. |
| 2011/0145089 A1* | 6/2011 | Khunger .......... G01C 21/3438 705/26.4 |
| 2011/0153189 A1 | 6/2011 | Chiang et al. |
| 2011/0173681 A1* | 7/2011 | Qureshi ............ H04L 63/0823 726/4 |
| 2011/0179366 A1 | 7/2011 | Chae |
| 2011/0190009 A1* | 8/2011 | Gerber, Jr. .......... H04L 63/0407 455/456.3 |
| 2011/0205965 A1* | 8/2011 | Sprigg .................. G06F 9/4411 370/328 |
| 2011/0209221 A1 | 8/2011 | Hanson et al. |
| 2011/0231092 A1 | 9/2011 | Kuo et al. |
| 2011/0243553 A1* | 10/2011 | Russell .............. G06Q 30/0631 726/1 |
| 2011/0274011 A1* | 11/2011 | Stuempert ............ H04L 12/14 370/259 |
| 2011/0295899 A1 | 12/2011 | James et al. |
| 2011/0301435 A1 | 12/2011 | Albert et al. |
| 2011/0313804 A1* | 12/2011 | Camp .................. G06Q 10/02 705/7.13 |
| 2011/0313880 A1* | 12/2011 | Paul .................. G06Q 30/0631 705/26.7 |
| 2012/0016951 A1 | 1/2012 | Li et al. |
| 2012/0017252 A1 | 1/2012 | Li et al. |
| 2012/0034917 A1* | 2/2012 | Kazmi .................. H04W 48/16 455/434 |
| 2012/0036345 A1 | 2/2012 | Chen et al. |
| 2012/0054841 A1 | 3/2012 | Schultz et al. |
| 2012/0084247 A1 | 4/2012 | Aguera y Arcas et al. |
| 2012/0089465 A1 | 4/2012 | Froloff |
| 2012/0096080 A1 | 4/2012 | Levesque et al. |
| 2012/0101952 A1* | 4/2012 | Raleigh ................ G06Q 30/016 705/304 |
| 2012/0117232 A1 | 5/2012 | Brown et al. |
| 2012/0143662 A1 | 6/2012 | Heath |
| 2012/0179764 A1* | 7/2012 | Erdal .................. G06Q 50/01 709/206 |
| 2012/0185912 A1 | 7/2012 | Lee et al. |
| 2012/0197852 A1 | 8/2012 | Dutta et al. |
| 2012/0209923 A1 | 8/2012 | Mathur et al. |
| 2012/0222083 A1* | 8/2012 | Vaha-Sipila .......... H04L 63/102 726/1 |
| 2012/0252498 A1* | 10/2012 | Trinchero ............ H04W 4/02 455/456.3 |
| 2012/0291101 A1 | 11/2012 | Ahlstrom et al. |
| 2012/0293465 A1* | 11/2012 | Nandu .................. H04W 4/003 345/204 |
| 2012/0296455 A1 | 11/2012 | Ohnemus et al. |
| 2012/0306659 A1* | 12/2012 | Ben-Dayan .......... G08B 21/0261 340/686.1 |
| 2012/0317565 A1 | 12/2012 | Carrara et al. |
| 2013/0014212 A1 | 1/2013 | Cohen |
| 2013/0046632 A1 | 2/2013 | Grigg et al. |
| 2013/0054139 A1* | 2/2013 | Bodin ................ G06Q 10/00 701/468 |
| 2013/0059698 A1 | 3/2013 | Barton |
| 2013/0110854 A1 | 5/2013 | Lockhart et al. |
| 2013/0124546 A1 | 5/2013 | Wormley et al. |
| 2013/0179244 A1* | 7/2013 | Laffoon et al. ............ 705/14.23 |
| 2013/0179988 A1 | 7/2013 | Bekker et al. |
| 2013/0218704 A1 | 8/2013 | Duncan et al. |
| 2013/0219461 A1 | 8/2013 | Esaki et al. |
| 2013/0232573 A1 | 9/2013 | Saidi et al. |
| 2013/0263000 A1 | 10/2013 | Lucas et al. |
| 2013/0263206 A1* | 10/2013 | Nefedov ............ G06F 21/6218 726/1 |
| 2013/0268378 A1 | 10/2013 | Yovin |
| 2013/0282227 A1 | 10/2013 | Chen et al. |
| 2013/0290359 A1 | 10/2013 | Eronen et al. |
| 2013/0318627 A1 | 11/2013 | Lundkvist et al. |
| 2013/0339234 A1 | 12/2013 | Prakash et al. |
| 2014/0006616 A1 | 1/2014 | Aad et al. |
| 2014/0031959 A1 | 1/2014 | Glode et al. |
| 2014/0040978 A1 | 2/2014 | Barton et al. |
| 2014/0047062 A1* | 2/2014 | Krueger ............ H04L 67/2842 709/216 |
| 2014/0059695 A1 | 2/2014 | Parecki et al. |
| 2014/0074570 A1 | 3/2014 | Hope et al. |
| 2014/0078304 A1 | 3/2014 | Othmer |
| 2014/0122890 A1 | 5/2014 | Prot |
| 2014/0123300 A1 | 5/2014 | Jung et al. |
| 2014/0129942 A1* | 5/2014 | Rathod ............ H04N 21/44222 715/720 |
| 2014/0195349 A1 | 7/2014 | Muster et al. |
| 2015/0222641 A1 | 8/2015 | Lu et al. |

OTHER PUBLICATIONS

Zhou, Yajin et al., "Taming Information-Stealing Smartphone Applications (on Android)," Proceedings of the 4th International Conference on Trust and Trustworthy Computing, Pittsburgh, PA, Jun. 2011, 15 pages.

Reddy et al.; "Biketastic: Sensing and Mapping for Better Biking"; CHI 2010; Apr. 10-15, 2010; pp. 1-4; ACM; located at http://research.cens.ucla.edu/people/estrin/resources/conferences/2010apr-Reddy-Shilton-Biketastic.pdf.

Holder, Joseph; "BlackBerry 101—Application permissions"; bearing a date of Dec. 31, 2010; printed on Sep. 28, 2016; pp. 1-6.

Extended European Search Report; European App. No. EP 14 75 7393; dated Oct. 13, 2016; pp. 1-8.

Hildenbrand, Jerry; "Android app permissions—How Google gets it right . . ."; bearing a date of Feb. 2012; printed on Apr. 1, 2017; pp. 1-22; located at: http://www.androidcentral.com/android-permissions-privacy-security.

Tasker; "Total Automation for Android"; User Guide, Jul. 5, 2012;14 pages; located at: http://tasker.dinglisch.net/.

Beresford et al.; "MockDroid: trading privacy for application functionality on smartphones"; Hotmobile '11; Mar. 1-3, 2011; pp. 49-54.

* cited by examiner

152 Identifying One Or More Services Configured To Carry Out At Least One Task For A Device, The Identifying At Least Partly Based On Device Data Module 202 Identifying A Notification Presentation Service Configured To Notify When One Or More Entities Are Within A Particular Proximity To The Device, The Identifying At Least Partly Based On Device Data Module 204 Identifying A Notification Presentation Service Configured To Notify When One Or More Entities Are Within A Particular Proximity To The Device, The Identifying At Least Partly Based On Data Indicating The Device Has A Large Contact List Module 206 Identifying A Notification Presentation Service Configured To Notify When One Or More Entities Are Within A Particular Proximity To The Device, The Identifying At Least Partly Based On Data Indicating That A Device Contact List Has Restricted Access Module 208 Identifying One Or More Services Configured To Carry Out At Least One Task For A Device, The Identifying At Least Partly Based On Device Data To Which Limited Access Is Provided Module 210 Identifying One Or More Services Configured To Carry Out At Least One Task For A Device, The Identifying At Least Partly Based On Device Data To Which Limited Access Is Provided To One Or More Programs Module 212 Identifying One Or More Position-dependent Services Configured To Carry Out At Least One Task For A Device, The Identifying At Least Partly Based On Device Data To Which Limited Access Is Provided To One Or More Augmented Reality Programs Module 214 Identifying One Or More Services Configured To Carry Out At Least One Task For A Device, The Identifying At Least Partly Based On Device Data To Which Limited Access Is Provided To A Kernel-level Program Module

| Fig. 2A | Fig. 2B | Fig. 2C | Fig. 2D | Fig. 2E | Fig. 2F | Fig. 2G | Fig. 2H |

152 Identifying One Or More Services Configured To Carry Out At Least One Task For A Device, The Identifying At Least Partly Based On Device Data Module

216 Identifying One Or More Services Configured To Carry Out At Least One Task For A Device, The Identifying At Least Partly Based On Device Sensor Data Module

218 Identifying One Or More Services Configured To Carry Out At Least One Task For A Device, The Identifying At Least Partly Based On Device Image Capturing Sensor Data Module

220 Identifying One Or More Image Processing Services Configured To Carry Out At Least One Task For A Device, The Identifying At Least Partly Based On Device Image Capturing Sensor Data Module

222 Identifying One Or More Services Configured To Be Provided To A User Of The Device, Said Identifying At Least Partly Based On Data Indicating Reestricted Access To One Or More Sensors Of The Device Module

224 Identifying One Or More Services Configured To Carry Out At Least One Task For A Device, The Identifying At Least Partly Based On Device Sensor Data To Which Access Is Restricted To At Least A Portion Of The Device Module

226 Identifying One Or More Services Configured To Carry Out At Least One Task For A Device, The Identifying At Least Partly Based On Device Data To Which Access Is Restricted From One Or More External Entities Module

228 Identifying One Or More Services Configured To Carry Out At Least One Task For A Device, The Identifying At Least Partly Based On Device Data To Which Access Is Restricted From A Communication Network Provider Module

230 Identifying One Or More Services Configured To Carry Out At Least One Task For A Device, The Identifying At Least Partly Based On Device Data To Which Access Is Restricted From A Device Manufacturer Module

232 Identifying One Or More Services Configured To Carry Out At Least One Task For A Device, The Identifying At Least Partly Based On Device Data To Which Access Is Restricted From A Device Application Producer Module

234 Identifying One Or More Services, The Identifying At Least Partly Based On Device Data To Which Access Is Restricted From A Device Operating System Producer Module

FIG. 2B

| Fig. 2A | Fig. 2B | Fig. 2C | Fig. 2D | Fig. 2E | Fig. 2F | Fig. 2G | Fig. 2H |

FIG. 2D (E) 152 Identifying One Or More Services Configured To Carry Out At Least One Task For A Device, The Identifying At Least Partly Based On Device Data Module 236 Identifying One Or More Services Configured To Carry Out At Least One Task For A Device, The Identifying At Least Partly Based On Device Property Data Module (J)

(F) 238 Identifying One Or More Services From One Or More Service Provider Provided Available Services Configured To Carry Out At Least One Task For A Device, The Identifying At Least Partly Based On Device Property Data Module (K)

240 Identifying One Or More Services From Two Or More Available Services Provided By Two Or More Discrete Service Providers, Said One Or More Services Configured To Carry Out At Least One Task For A Device, The Identifying At Least Partly Based On Device Property Data Module (G) 242 Identifying One Or More Services From Two Or More Available Services Provided By Two Or More Discrete Service Providers, Said One Or More Services Configured To Carry Out At Least One Task For A Device, The Identifying At Least Partly Based On Device Property Data And Partly Based On One Or More Service Provider Properties Module (L)

(H) 246 Identifying One Or More Services From Two Or More Available Services Provided By Two Or More Discrete Service Providers, Said One Or More Services Configured To Carry Out At Least One Task For A Device, The Identifying At Least Partly Based On Device Property Data And Partly Based On Service Provider History With Device Module 252 Identifying One Or More Services From Two Or More Available Services Provided By Two Or More Discrete Service Providers, Said One Or More Services Configured To Carry Out At Least One Task For A Device, The Identifying At Least Partly Based On Device Property Data And Partly Based On Service Provider Data Sharing Agreement Module 250 Identifying One Or More Services From Two Or More Available Services Provided By Two Or More Discrete Service Providers, Said One Or More Services Configured To Carry Out At Least One Task For A Device, The Identifying At Least Partly Based On Device Property Data And Partly Based On The Service Provider Providing The One Or More Identified Services To A Different Device Having A Common Characteristic With The Device Module (I)

| Fig. 2A | Fig. 2B | Fig. 2C | Fig. 2D | Fig. 2E | Fig. 2F | Fig. 2G | Fig. 2H |

152 Identifying One Or More Services Configured To Carry Out At Least One Task For A Device, The Identifying At Least Partly Based On Device Data Module 236 Identifying One Or More Services Configured To Carry Out At Least One Task For A Device, The Identifying At Least Partly Based On Device Property Data Module 238 Identifying One Or More Services From One Or More Service Provider Provided Available Services Configured To Carry Out At Least One Task For A Device . . . Device Property Data Module 240 Identifying One Or More Services From Two Or More Available Services Provided By Two Or More Discrete Service Providers, Said One Or More Services Configured To Carry Out At Least One Task For A Device, The Identifying At Least Partly Based On Device Property Data Module 242 Identifying One Or More Services From Two Or More Available Services Provided By Two Or More Discrete Service Providers, Said One Or More Services Configured To Carry Out At Least One Task For A Device, The Identifying At Least Partly Based On Device Property Data And Partly Based On One Or More Service Provider Properties Module 254 Identifying One Or More Services From Two Or More Available Services Provided By Two Or More Discrete Service Providers, Said One Or More Services Configured To Carry Out At Least One Task For A Device, The Identifying At Least Partly Based On Device Property Data And Partly Based On Service Provider Prior Contract Module

Fig. 2

| Fig. 2A | Fig. 2B | Fig. 2C | Fig. 2D | Fig. 2E | Fig. 2F | Fig. 2G | Fig. 2H |

FIG. 2E

152 Identifying One Or More Services Configured To Carry Out At Least One Task For A Device, The Identifying At Least Partly Based On Device Data Module 256 Identifying One Or More Services Configured To Carry Out At Least One Task For A Device, The Identifying At Least Partly Based On Device Usage Information Data Module 258 Identifying One Or More Services Configured To Carry Out At Least One Task For A Device, The Identifying At Least Partly Based On Device Position History Information Module 260 Identifying A Caloric Intake Service Configured To Carry Out At Least One Task For A Device, The Identifying At Least Partly Based On Device Position History Information Module 262 Identifying One Or More Services Configured To Carry Out At Least One Task For A Device, The Identifying At Least Partly Based On Device Application Usage Information Data Module 264 Identifying One Or More Services Configured To Carry Out At Least One Task For A Device, The Identifying At Least Partly Based On Device Web Browsing Information Data Module 266 Identifying One Or More Services Configured To Carry Out At Least One Task For A Device, The Identifying At Least Partly Based On Device Web Browsing Information Indicating Three Or More Downloads A Day From Bank Account Websites Data Module 268 Identifying One Or More Services Configured To Carry Out At Least One Task For A Device, The Identifying At Least Partly Based On Particular Application Usage Time Amount Data Module 270 Identifying One Or More Game Playing Services Configured To Carry Out At Least One Task For A Device, The Identifying At Least Partly Based On Particular Game Usage Time Amount Greater Than A Particular Amount Module

Fig. 2

| Fig. 2A | Fig. 2B | Fig. 2C | Fig. 2D | Fig. 2E | Fig. 2F | Fig. 2G | Fig. 2H |

FIG. 2F

152 Identifying One Or More Services Configured To Carry Out At Least One Task For A Device, The Identifying At Least Partly Based On Device Data Module

272 Identifying One Or More Services Configured To Carry Out At Least One Task For A Device, The Identifying At Least Partly Based On Device Data Transmission Amount Module

274 Identifying One Or More Services Configured To Carry Out At Least One Task For A Device, The Identifying At Least Partly Based On Restricted Device Data Inventory Module

276 Identifying One Or More Services Configured To Carry Out At Least One Task For A Device, The Identifying At Least Partly Based On Restricted Device Data Inventory Indicating Restricted Position Data Module

278 Identifying One Or More Services Configured To Carry Out At Least One Task For A Device, The Identifying At Least Partly Based On Restricted Device Data Inventory Indicating A Number Of Stored Previous Locations And A Number Of Stored Previous Contacts Module

280 Identifying One Or More Services Configured To Carry Out At Least One Task For A Device, The Identifying At Least Partly Based On Restricted Device Sensor Module

282 Identifying One Or More Data Traffic Analysis Services Configured To Carry Out At Least One Task For A Device, The Identifying At Least Partly Based On A Restricted Data Radio Module

284 Identifying One Or More Weather Analysis Services Configured To Carry Out At Least One Task For A Device, The Identifying At Least Partly Based On A Restricted Barometric Pressure Sensor Module

| Fig. 2A | Fig. 2B | Fig. 2C | Fig. 2D | Fig. 2E | Fig. 2F | Fig. 2G | Fig. 2H |

FIG. 2H

152 Identifying One Or More Services Configured To Carry Out At Least One Task For A Device, The Identifying At Least Partly Based On Device Data Module 286 Identifying One Or More Alert Services Configured To Alert When One Or More Devices Controlled By A Person In The Device Contact List Is Within A Particular Proximity To The Device, The Identifying At Least Partly Based On Device Data Module

| Fig. 2A | Fig. 2B | Fig. 2C | Fig. 2D | Fig. 2E | Fig. 2F | Fig. 2G | Fig. 2H |

Fig. 2

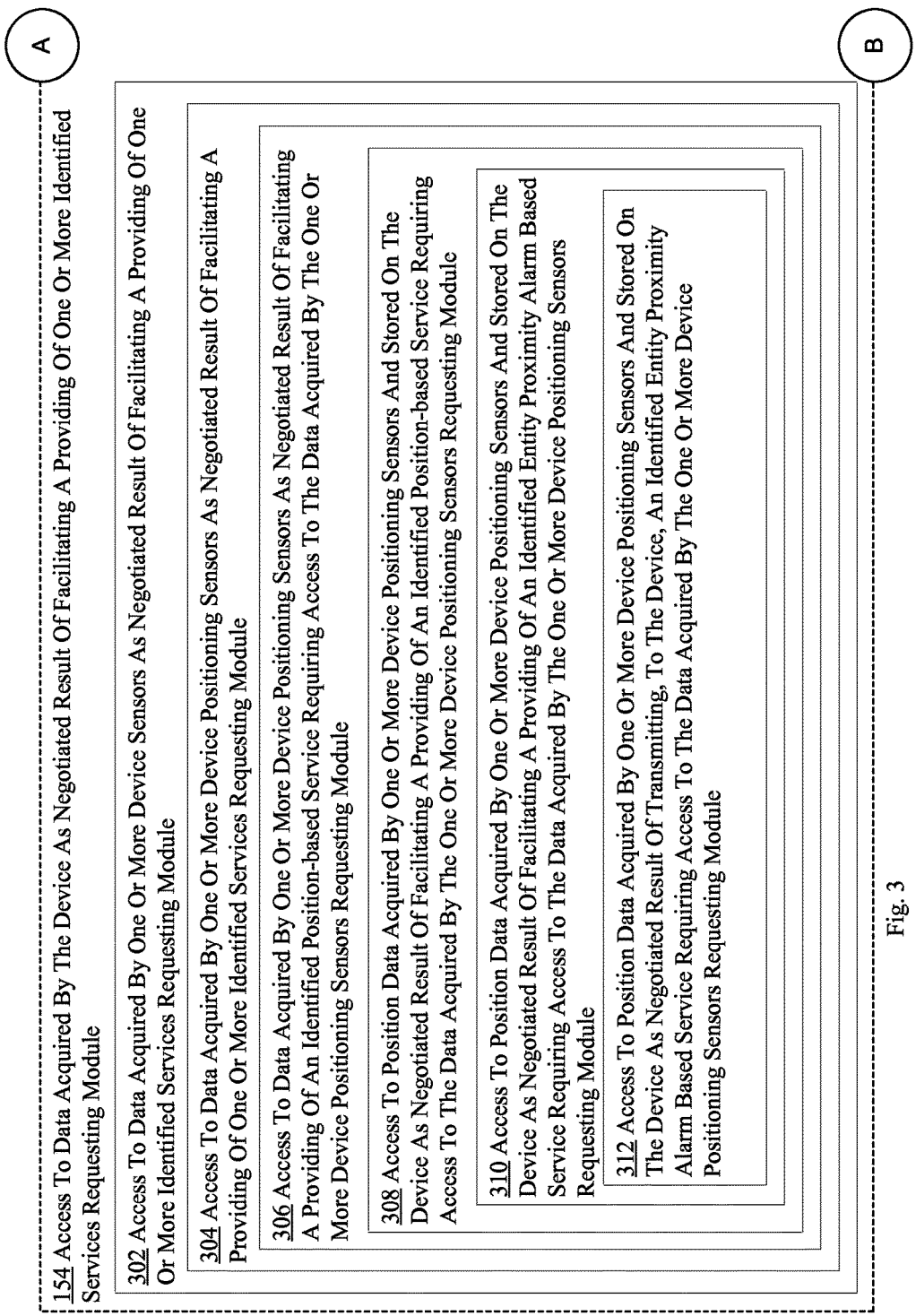

154 Access To Data Acquired By The Device As Negotiated Result Of Facilitating A Providing Of One Or More Identified Services Requesting Module 326 Access To Data Acquired By The Device As Negotiated Result Of Facilitating A Providing Of One Or More Identified Services Requesting From Device Operator Module 328 Access To Data Acquired By The Device As Negotiated Result Of Facilitating A Providing Of One Or More Identified Services Requesting, Via The Device, From Device Operator Module 330 Access To Data Acquired By The Device As Negotiated Result Of Facilitating A Providing Of One Or More Identified Services Requesting, By Instructing Device To Carry Out User Interaction Operations, From Device Operator Module 332 Facilitation Of User Interaction Regarding Access To Data Acquired By The Device As Negotiated Result Of Facilitating A Providing Of One Or More Identified Services Requesting Module 334 Transmission Of Instructions To Proceed With A User Interaction Regarding Access To Data Acquired By The Device As Negotiated Result Of Facilitating A Providing Of One Or More Identified Services Requesting Module 336 Transmission Of An Application That Executes A User Interaction Regarding Access To Data Acquired By The Device As Negotiated Result Of Facilitating A Providing Of One Or More Identified Services Requesting Module 338 Facilitation Of Presentation Of Request For Access To Data Acquired By The Device As Negotiated Result Of Facilitating A Providing Of One Or More Identified Services Requesting Module 340 Facilitation Of Display Of Request For Access To Data Acquired By The Device As Negotiated Result Of Facilitating A Providing Of One Or More Identified Services Requesting Module 342 Facilitation Of Display Of Request For Access To Data Acquired By The Device As A Payment For Facilitation Of Providing Of One Or More Identified Services Requesting Module 344 Facilitation Of Display Of Request For Access To Data Acquired By The Device As A Necessary Condition Precedent To Facilitation Of Providing Of One Or More Identified Services Requesting Module

Fig. 3

| Fig. 3A | Fig. 3B | Fig. 3C | Fig. 3D |

FIG. 3C

156 Provision Of At Least A Portion Of The One Or More Services Facilitating Upon Receipt Of Negotiated Access To Data Acquired By The Device Module

| 402 Provision Of At Least A Portion Of The One Or More Services Facilitating Upon Receipt Of Negotiated Access To Data Previously Acquired By The Device Module | 404 Provision Of At Least A Portion Of The One Or More Services Facilitating Upon Receipt Of Negotiated Access To Data As It Is Obtained By The Device Module | 406 Provision Of At Least A Portion Of The One Or More Services Facilitating Upon Receipt Of Negotiated Access To Data After It Is Obtained By The Device Module | 408 Provision Of At Least A Portion Of The One Or More Services Facilitating Upon Receipt Of Negotiated Access To Data Obtained By A Device Environment Interaction Component Module | 410 Providing A Location At Which One Or More Applications Configured To Perform One Or More Services Are Configured To Be Downloaded Upon Receipt Of Negotiated Access To Data Acquired By The Device Module |

Fig. 4

| Fig. 4A | Fig. 4B |

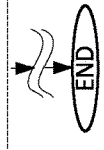

502 Identifying One Or More Services Configured To Be Provided To A User Of A Device, Said Identifying At Least Partly Based On Data Regarding One Or More Properties Of The Device 686 Identifying One Or More Data Management Services Configured To Be Provided To A User Of A Device, Said Identifying At Least Partly Based On Data Indicating That The Device Transmits More Than A Particular Amount Of Data Per Day

FIG. 6I

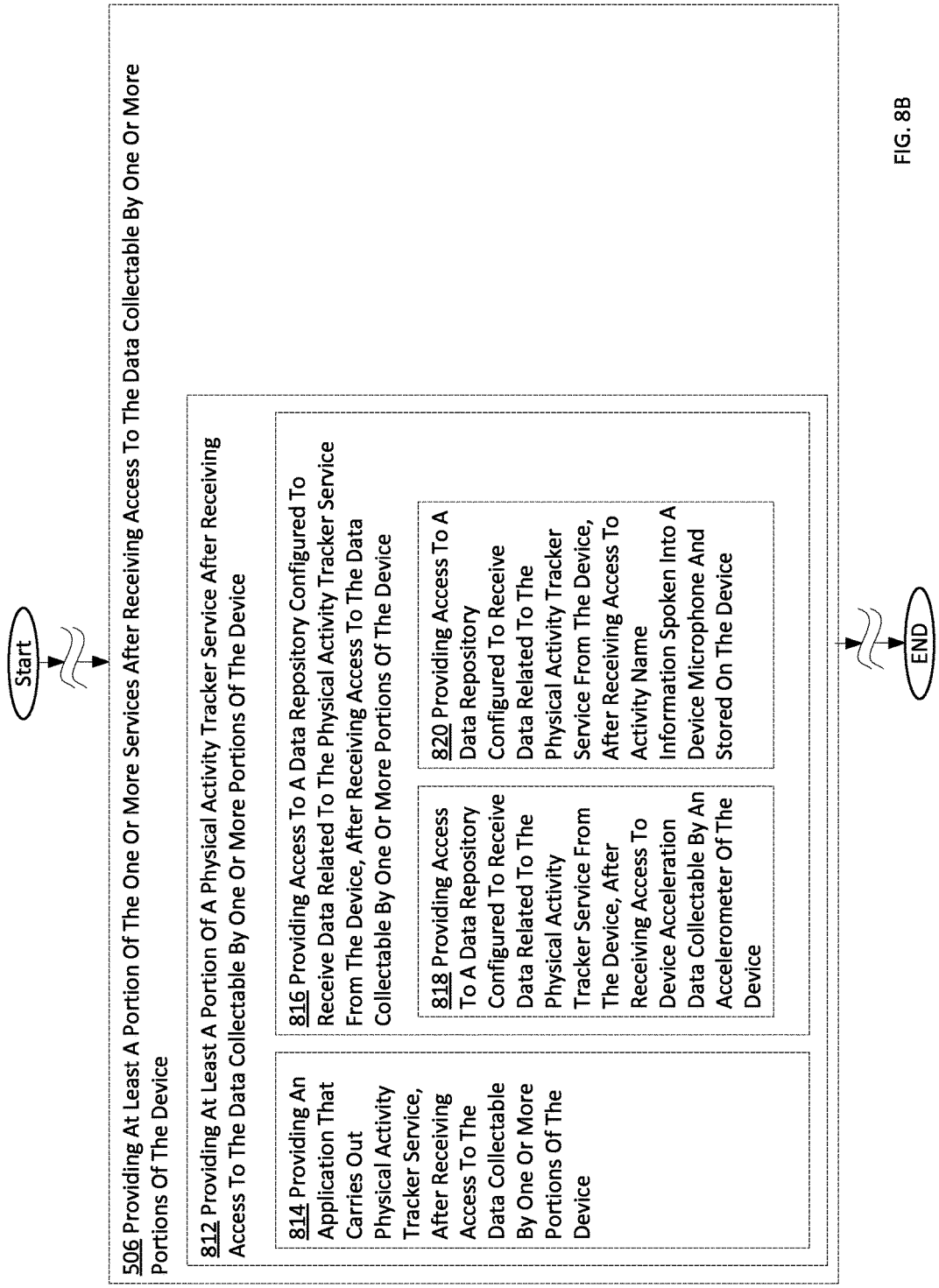

METHODS AND SYSTEMS FOR MANAGING DATA

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation of U. S. patent application Ser. No. 13/685,488, entitled METHODS AND SYSTEMS FOR MANAGING DATA, naming Edward K.Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application claims benefit of priority of U.S. Provisional Patent Application No. 61/720,245 titled METHODS AND SYSTEMS FOR DATA SERVICES, naming Edward K. Y. Jung, Royce A. Levien, Richard T. Lord, Robert W. Lord, and Mark A. Malamud as inventors, filed 30 Oct. 2012, which was filed within the twelve months preceding the filing date of the present application or is an application of which a currently co-pending application is entitled to the benefit of the filing date.

For purposes of the USPTO extra-statutory requirements, the present application claims benefit of priority of U.S. Provisional Patent Application No. 61/720,874 titled METHODS AND SYSTEMS FOR DATA SERVICES, naming Edward K. Y. Jung, Royce A. Levien, Richard T. Lord, Robert W. Lord, and Mark A. Malamud as inventors, filed 31 Oct. 2012, which was filed within the twelve months preceding the filing date of the present application or is an application of which a currently co-pending application is entitled to the benefit of the filing date.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

RELATED APPLICATIONS

U.S. patent application Ser. No. 13/685,485, entitled METHODS AND SYSTEMS FOR MANAGING DATA, naming Edward K.Y. Jung, Royce A. Levien, Richard T. Lord, Robert W. Lord, and Mark A. Malamud as inventors, filed 26 Nov. 2012, is related to the present application.

U.S. patent application Ser. No. 13/685,609, entitled METHODS AND SYSTEMS FOR MANAGING DATA, naming Edward K.Y. Jung, Royce A. Levien, Richard T. Lord, Robert W. Lord, and Mark A. Malamud as inventors, filed 26 Nov. 2012, is related to the present application.

U.S. patent application Ser. No. 13/685,612, entitled METHODS AND SYSTEMS FOR MANAGING DATA, naming Edward K.Y. Jung, Royce A. Levien, Richard T. Lord, Robert W. Lord, and Mark A. Malamud as inventors, filed 26 Nov. 2012, is related to the present application.

U.S. patent application Ser. No. To Be Assigned 13/685,491, entitled METHODS AND SYSTEMS FOR MANAGING DATA, naming Edward K.Y. Jung, Royce A. Levien, Richard T. Lord, Robert W. Lord, and Mark A. Malamud as inventors, filed 26 Nov. 2012, is related to the present application.

U S. patent application Ser. No. 13/685,613, entitled METHODS AND SYSTEMS FOR MANAGING DATA, naming Edward K.Y. Jung, Royce A. Levien, Richard T. Lord, Robert W. Lord, and Mark A. Malamud as inventors, filed 26 November 2012, is related to the present application The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

This application is related to data services.

SUMMARY

In one or more various aspects, a method includes but is not limited to identifying one or more services configured to be provided to a user of a device, said identifying at least partly based on data regarding one or more properties of the device, requesting access to data collected by one or more portions of the device, in exchange for providing at least a portion of one of the one or more identified services, and providing at least a portion of the one or more services after receiving access to the data collectable by one or more portions of the device. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein referenced method aspects. The circuitry and/or programming may be virtually any combination of hardware, software, and/or firmware configured to effect the herein referenced method aspects depending upon the design choices of the system designer, and limited to patentable subject matter under 35 USC 101.

In one or more various aspects, a system includes, but is not limited to, means for identifying one or more services configured to be provided to a user of a device, said identifying at least partly based on data regarding one or more properties of the device, means for requesting access to data collected by one or more portions of the device, in exchange for providing at least a portion of one of the one or more identified services, and means for providing at least a portion of the one or more services after receiving access to the data collectable by one or more portions of the device. In addition to the foregoing, other system aspects are described in the claims, drawings, and text forming a part of the disclosure set forth herein.

In one or more various aspects, a system includes, but is not limited to, circuitry for identifying one or more services configured to be provided to a user of a device, said identifying at least partly based on data regarding one or more properties of the device, circuitry for requesting access to data collected by one or more portions of the device, in exchange for providing at least a portion of one of the one or more identified services, and circuitry for providing at least a portion of the one or more services after receiving access to the data collectable by one or more portions of the device. In addition to the foregoing, other system aspects are described in the claims, drawings, and text forming a part of the disclosure set forth herein.

In one or more various aspects, a computer program product, comprising a signal bearing medium, bearing one or more instructions including, but not limited to, one or more instructions for identifying one or more services configured to be provided to a user of a device, said identifying at least partly based on data regarding one or more properties of the device, one or more instructions for requesting access to data collected by one or more portions of the device, in exchange for providing at least a portion of one of the one or more identified services, and one or more instructions for providing at least a portion of the one or more services after receiving access to the data collectable by one or more portions of the device. In addition to the foregoing, other computer program product aspects are described in the claims, drawings, and text forming a part of the disclosure set forth herein.

In one or more various aspects, a device is defined by a computational language, such that the device comprises one or more interchained physical machines ordered for identifying one or more services configured to be provided to a user of a device, said identifying at least partly based on data regarding one or more properties of the device, one or more interchained physical machines ordered for requesting access to data collected by one or more portions of the device, in exchange for providing at least a portion of one of the one or more identified services, and one or more interchained physical machines ordered for providing at least a portion of the one or more services after receiving access to the data collectable by one or more portions of the device.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 2, including FIGS. 2A-2H, shows a particular perspective of the identifying one or more services configured to carry out at least one task for a device, the identifying at least partly based on device data module 152 of processing module 150 of computing device 130 of FIG. 1B, according to an embodiment.

FIG. 3, including FIGS. 3A-3D, shows a particular perspective of the access to data acquired by the device as negotiated result of facilitating a providing of one or more identified services requesting module 154 of processing module 150 of computing device 130 of FIG. 1B, according to an embodiment.

FIG. 4, including FIGS. 4A-4B, shows a particular perspective of the provision of at least a portion of the one or more services facilitating upon receipt of negotiated access to data acquired by the device module 156 of processing module 150 of computing device 130 of FIG. 1B, according to an embodiment.

FIG. 6I is a high-level logic flow chart of a process depicting alternate implementations of an identifying services operation 502, according to one or more embodiments.

FIG. 8B is a high-level logic flow chart of a process depicting alternate implementations of a providing operation 506, according to one or more embodiments.

DETAILED DESCRIPTION

Figure 1A:
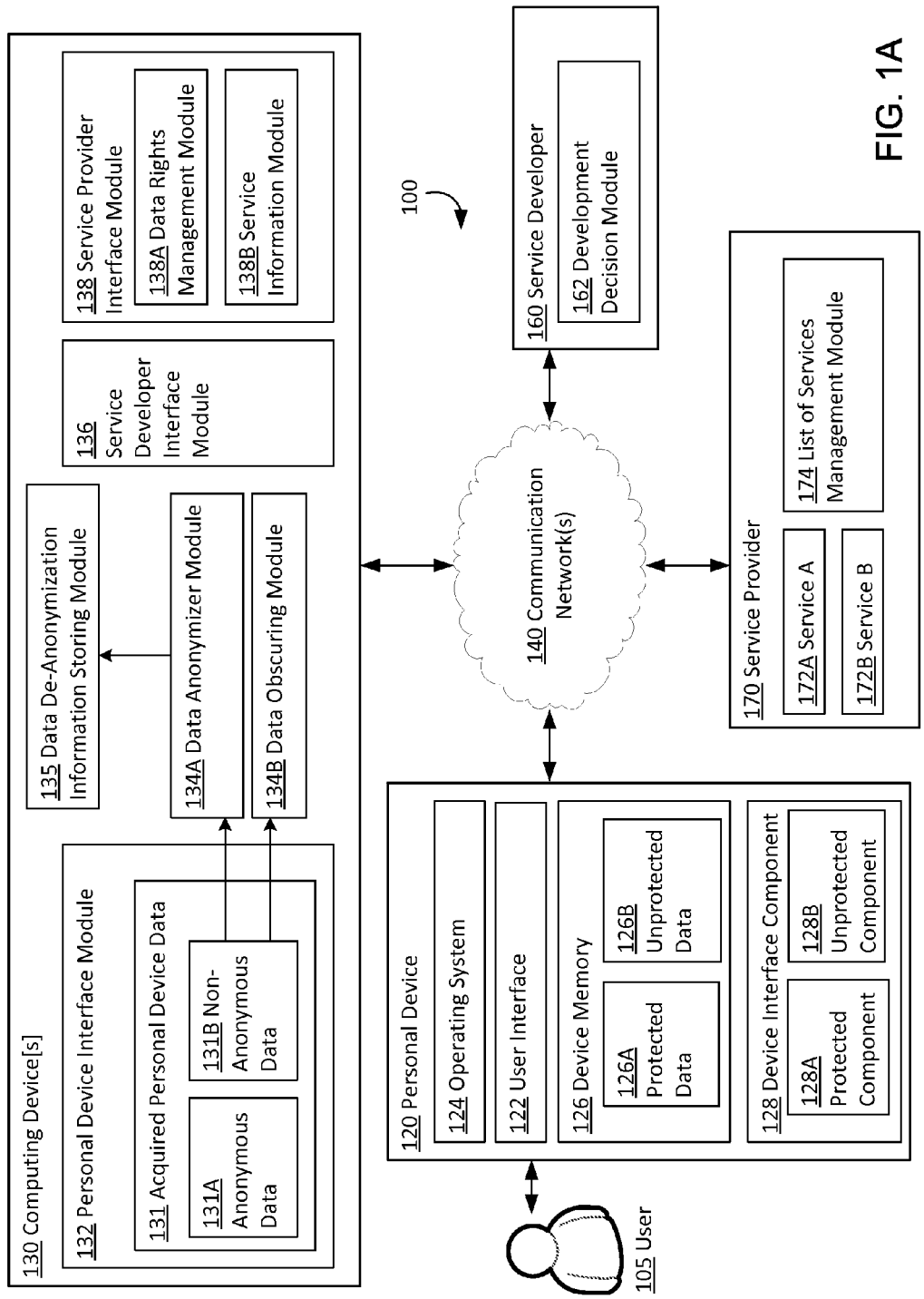
FIG. 1A shows a high-level block diagram of an exemplary environment 100, according to an embodiment.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide an interface for identifying one or more services configured to be provided to a user of a device, said identifying at least partly based on data regarding one or more properties of the device, requesting access to data collected by one or more portions of the device, in exchange for providing at least a portion of one of the one or more identified services, and providing at least a portion of the one or more services after receiving access to the data collectable by one or more portions of the device.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although user 105 is shown/described herein, e.g., in FIG. 1, and other places, as a single illustrated figure, those skilled in the art will appreciate that user 105 may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In known systems, devices that are associated with one or more users, e.g., phones, tablets, laptops, desktops, cars, game systems, appliances, and the like, may collect data regarding the user. This data may be desired by third parties. The following describes, among other implementations, methods and systems of managing user data collected by one or more devices that may also be useful to entities that are not the user, and which entities may not necessarily have access to the data.

Referring now to FIG. 1, FIG. 1 illustrates an example environment 100 in which the methods, systems, circuitry, articles of manufacture, and computer program products and architecture, in accordance with various embodiments, may be implemented by one or more computing devices 130 As shown in FIG. 1A, one or more personal devices 120, one or more service providers 170, one or more service developers 160, and one or more computing devices 130 may communicate via one or more communication networks 140. In an embodiment, service provider 170 may have one or more services that personal device 120 may want. In an embodiment, computing device 130, which may be a remote or local server, or distributed set of servers, may manage data that is gathered, stored, controlled, accessed, restricted, monitored, under the control of, checked, examined, verified, authenticated, authorized, manipulated, updated, altered, filtered, or otherwise acted upon, whether passively or actively, by personal device 120. In an embodiment, as described in more detail herein, computing device 130 may have access to some or all of the data on personal device 120. In another embodiment, computing device 130 may have access to only a portion of the data on personal device 120. In still another embodiment, computing device 30 may have access to a modified version of the data on personal device 120. Specifically, in an embodiment, computing device 120 may have access to the data stored on personal device 120, but in anonymous form.

In an embodiment, computing device 130 may offer one or more services to personal device 120. In an embodiment, the offer of one or more services may be conditional on a grant of access to part or all of the data stored and/or collected by personal device 120. In an embodiment, computing device 130 may receive one or more services from service provider 170 and/or service developer 160, and may select one or more of the received services for presentation to the personal device 120. In an embodiment, the data from personal device 120 may be shared with one or more of service provider 170 and service developer 160. In an embodiment, the data from personal device 20 may be anonymized prior to sharing with service developer 160 and/or service developer 170.

Referring again to FIG. 1A, FIG. 1A shows a personal device 120. Personal device 120 may be any electronic device, portable or not, that may be operated by or associated with one or more users. Personal device 120 is shown as interacting with a user 105. As set forth above, user 105 may be a person, or a group of people, or another entity that mimics the operations of a user. In some embodiments, user 105 may be a computer or a computer-controlled device. Personal device 120 may be, but is not limited to, a cellular phone, a network phone, a smartphone, a tablet, a music player, a walkie-talkie, a radio, a USB drive, a portable solid state drive, a portable disc-type hard drive, an augmented reality device (e.g., augmented reality glasses and/or headphones), earphones, headphones, audio/visual equipment, media player, television, projection screen, flat screen, monitor, clock, appliance (e.g., microwave, convection oven, stove, refrigerator, freezer), a navigation system (e.g., a Global Positioning System ("GPS") system), a medical alert device, a remote control, a peripheral, an electronic safe, an electronic lock, an electronic security system, a video camera, a personal video recorder, a personal audio recorder, and the like.

Referring again to FIG. 1A, personal device 120 may include an operating system 124. In this context, operating system 124 refers to any hardware, software, firmware, and combination thereof which is considered at the core or baseline of a device. For example, applications that interact directly with hardware may be considered to be part of an operating system. In some embodiments, operating system 124 may be an FPGA, printed circuit board, or other wired device. In an embodiment, operating system 124 may include one or more of Google's Android, Apple's iOS, Microsoft's Windows, various implementations of Linux, and the like. In some embodiments, operating system 124 may include a root menu for one or more televisions, stereo systems, media players, and the like. In some embodiments, operating system 124 may be a "home" screen of a device.

Referring again to FIG. 1A, in an embodiment, personal device 20 may include a user interface 122. User interface 122 may include any hardware, software, firmware, and combination thereof that allow a user 105 to interact with a personal device 120, and for a personal device 120 to interact with a user 105. In some embodiments, user interface 122 may include a monitor, screen, touchscreen, liquid crystal display ("LCD") screen, light emitting diode ("LED") screen, speaker, handset, earpiece, keyboard, keypad, touchpad, mouse, trackball, remote control, button set, microphone, video camera, still camera, a charge-coupled device ("CCD") element, a photovoltaic element, and the like.

Referring again to FIG. 1A, in some embodiments, personal device 120 may include a device memory 126. In some embodiments, device memory 126 may include memory, random access memory ("RAM"), read only memory ("ROM"), flash memory, hard drives, disk-based media, disc-based media, magnetic storage, optical storage, volatile memory, nonvolatile memory, and any combination thereof. In some embodiments, device memory 126 may be separated from the device, e.g., available on a different device on a network, or over the air. For example, in a networked system, there may be many personal devices 120 whose device memory 126 is located at a central server that may be a few feet away or located across an ocean.

Referring again to FIG. 1A, in some embodiments, device memory 126 may include one or more of protected data 126A and unprotected data 126B. Not all embodiments include each or both of these, but protected data 126A and unprotected data 126B may be present in one or more embodiments. Protected data 126A may include any data, including data stored on personal device 120, data for which personal device 120 maintains at least partial control of, data for which personal device 120 monitors or provides the ability to monitor, and the like, for which some form of authorization is required to access the data. The authorization may take any form and relate to any sub-unit, including both internally and externally to the device. For example, in an embodiment, protected data 126A may include data which is not available to at least one application running on a computing device. For another example, in an embodiment, protected data 126A may be available to one application at any time, and to another application at specific times, or at times when the first application is not using the data. In an embodiment, protected data 126A includes data for which an application must be authenticated (e.g., a Microsoft operating system certification, or a user flag set to true) in order to access the protected data 126A.

In an embodiment, protected data 126A includes data that a user, e.g., user 105, cannot view until the user 105 verifies their identity, e.g., through a password input or biometric identification. In an embodiment, protected data 126A is limited to the device, and is not transmitted to any other system not under the direct control of the personal device 120. In an embodiment, protected data 126A is limited to the personal device 120, and only applications originating at the personal device 120, or originating with the user 105, are allowed to read protected data 126A. In an embodiment, personal device 120 modifies or directs to be modified protected data 126A, so at least a portion of the protected data 126A is altered or obscured. In an embodiment, personal device 120 allows protected data 126A to be transmitted to an external entity under the condition that the external entity will alter or obscure at least a portion of the protected data 126A.

Referring again to FIG. 1A, in an embodiment, personal device 120 may include device memory 126, which, in some embodiments, may include unprotected data 26B. In an embodiment, unprotected data 126B may have no protections or limitations. In another embodiment, unprotected data 126B may have protections and limitations, but be less protected and/or less limited than protected data 126B. In an embodiment, unprotected data 126B is broadcasted or otherwise transmitted upon request. In an embodiment, unprotected data 126B cannot be accessed by an entity external to personal device 120 due to device design or other factors, but there is no specific protection on unprotected data 126B from access by one or more entities external to personal device 20.

Referring again to FIG. 1A, in an embodiment, personal device 120 may include device interface component 128. In an embodiment, device interface component 128 includes any component that allows the device to interact with its environment. For example, in an embodiment, device interface component 128 includes one or more sensors, e.g., a camera, a microphone, an accelerometer, a thermometer, a satellite positioning system (SPS) sensor, a barometer, a humidity sensor, a compass, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), a radio, including a wireless radio, a transmitter, a receiver, an emitter, a broadcaster, and the like. In an embodiment, device interface component 128 also may include one or more user interface components, e.g., user interface 122 (e.g., although they are drawn separately, in some embodiments, user interface 122 is a type of device interface component 128), and in some embodiments including one or more user input receiving components and output presenting components.

Referring again to FIG. 1A, in an embodiment, device interface component 128 may include protected component 128A. Protected component 128A may include any device interface component 128, of which some non-limiting examples previously were enumerated, for which some form of authorization and/or authentication is required to access the data. The authorization may take any form and relate to any sub-unit, including both internally and externally to the device. In an embodiment, protected component 128A is similar to protected data 126A. For example, in an embodiment, a personal device 120, e.g., a smart phone, may have twelve applications running on the smartphone. In an embodiment, six of those applications may have access to a protected component 128A, e.g., a positioning sensor, and the other six may not. In some embodiments, data collected by a protected component 128A is part of the protected component 128A. In some embodiments, data collected by a protected component 128A becomes protected data 126A. In some embodiments, data collected by a protected component 128A becomes protected data 126A some of the time, or none of the time. In some embodiments, data collected by a protected component 128A may be part of protected component 128A for a particular amount of time, e.g., two weeks, and then may transition to unprotected data or data that is not considered protected or unprotected. In some embodiments, a protected component 128A may be accessible to everyone at particular times and/or circumstances. For example, a protected component 128A, e.g., a wireless radio, may be accessible to any entity between the hours of 7 and 8 pm, and only accessible to specific entities and/or applications at other times. In some embodiments, a protected component 128A, e.g., an image capturing component, may be accessible to any entity when one or more conditions are met, which conditions may or may not be related to the protected component 128A or the personal device 120, e.g., when the personal device 120 is at a particular location.

Referring again to FIG. 1A, in some embodiments, computing device 30 may include personal device interface module 132. In some embodiments, personal device interface module 132 may communicate with one or more personal devices 120. In some embodiments, personal device interface module 132 may receive data 131 received from a personal device 120. Acquired personal device data 131 may include any data gathered from personal device 120, in any manner. In some embodiments, computing device 30 may request data from personal device 120. In some embodiments, computing device 30 may receive data from personal device 120 on a schedule. In some embodiments, computing device 130 may retrieve data from personal device 120 when certain conditions are met. In some embodiments, personal device 120 is broadcasting data, and computing device 130 gathers the broadcasted data. In some embodiments, personal device 120 broadcasts data that only computing device 130 can use (e.g., decrypt, interpret, or the like). In some embodiments, personal device 120 may transmit acquired personal device data 131 to computing device 30 using one or more communication networks 140, which will be described in more detail herein.

Referring again to FIG. 1A, in some embodiments, the acquired personal device data 131 may be anonymous data 131A. In an embodiment, anonymous data refers to data from which the origin of the data cannot be uniquely identified. In some embodiments, the origin of the data may refer to the personal device 120, e.g., a unique identifier, e.g., a MAC address. In some embodiments, the origin of the data may refer to a user 105 associated with the data, either through ownership, use, or other relationship with the device, e.g., a username, a user's name, or a user's social security or other identifying number, or network address or identification. It is noted that, in some embodiments, the device may be able to recognize the origin of the data, e.g., an identity of personal device 120, that is transmitting the data due to the nature of the data transmission, but be unable to deduce the origin of the data through the data itself, in which case, in some embodiments, this data is still considered anonymous data 131A.

Anonymous data 131A may include data for which uniquely identifying information has been removed, or data for which uniquely identifying information has been concealed, obscured, made uncertain, made ambiguous, screened, camouflaged, masked, veiled, shrouded, hidden, encoded, encrypted, or otherwise altered. In some embodiments, the received anonymous data 131A never included uniquely identifying information. In some embodiments, anonymous data 131A may partially or identify its origin in a manner that is not unique, e.g., the user 105 or the personal device 120 from which the anonymous data originated. In some embodiments, uniquely identifying information may be extracted from anonymous data 131A using additional information, e.g., a lookup table, hash, or other known algorithm. In some embodiments, uniquely identifying information may be deduced from anonymous data 131A without additional information. In some embodiments, uniquely identifying information may not be retrieved from anonymous data 131A once the data is in its anonymous format.

In an embodiment, acquired personal device data 131 may include non-anonymous data 131B. In some embodiments, non-anonymous data 131B may identify, either explicitly or implicitly, the origin of the data. In some embodiments, the origin of the data may refer to the personal device 120, e.g., a unique identifier, e.g., a MAC address. In some embodiments, the origin of the data may refer to a user 105 associated with the data, either through ownership, use, or other relationship with the device, e.g., a username, a user's name, or a user's social security or other identifying number, or network address or identification.

Figure 1B:
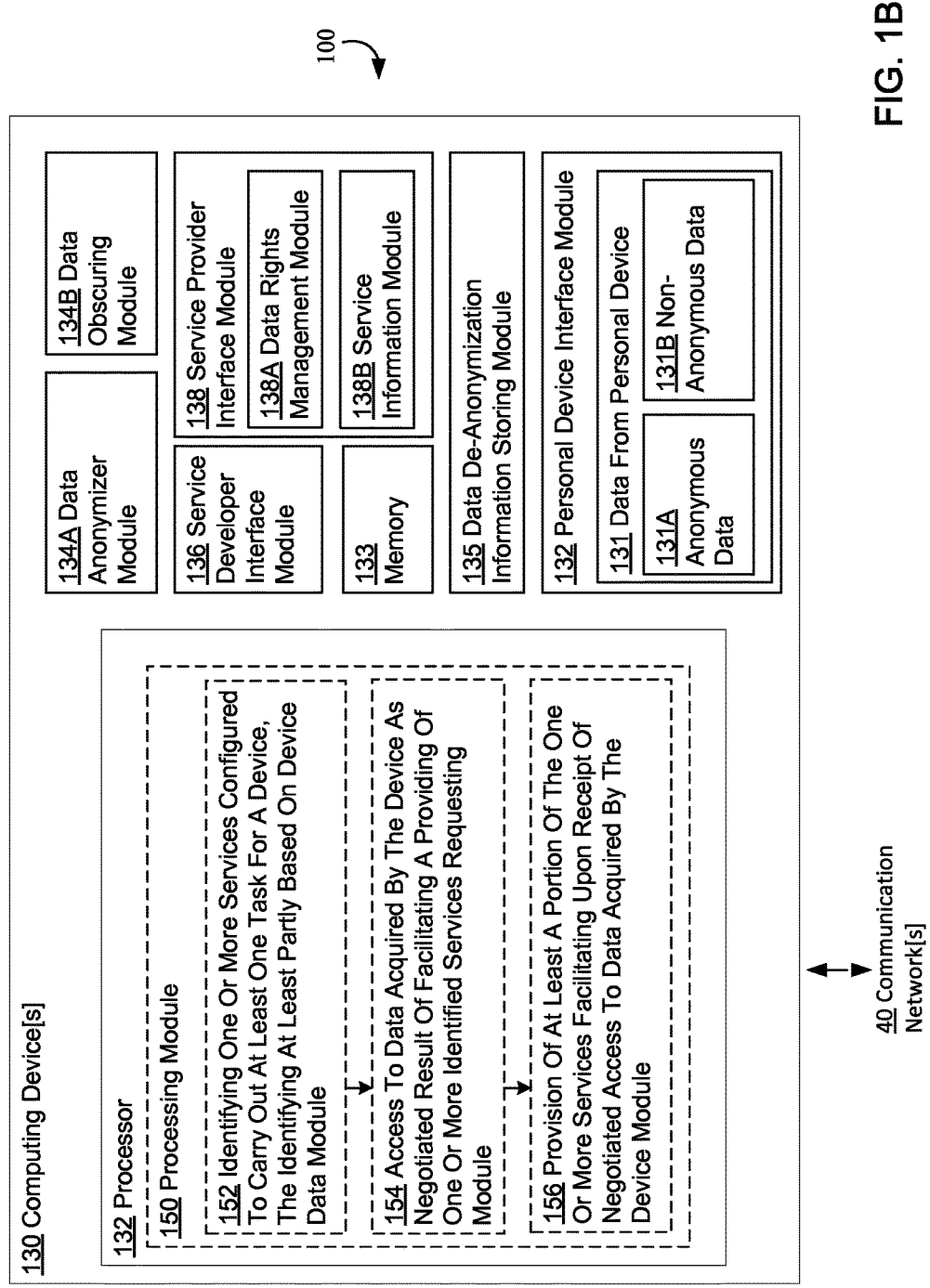
FIG. 1B shows a high-level block diagram of a computing device 130 operating in an exemplary environment 100, according to an embodiment.
Figure 1C:
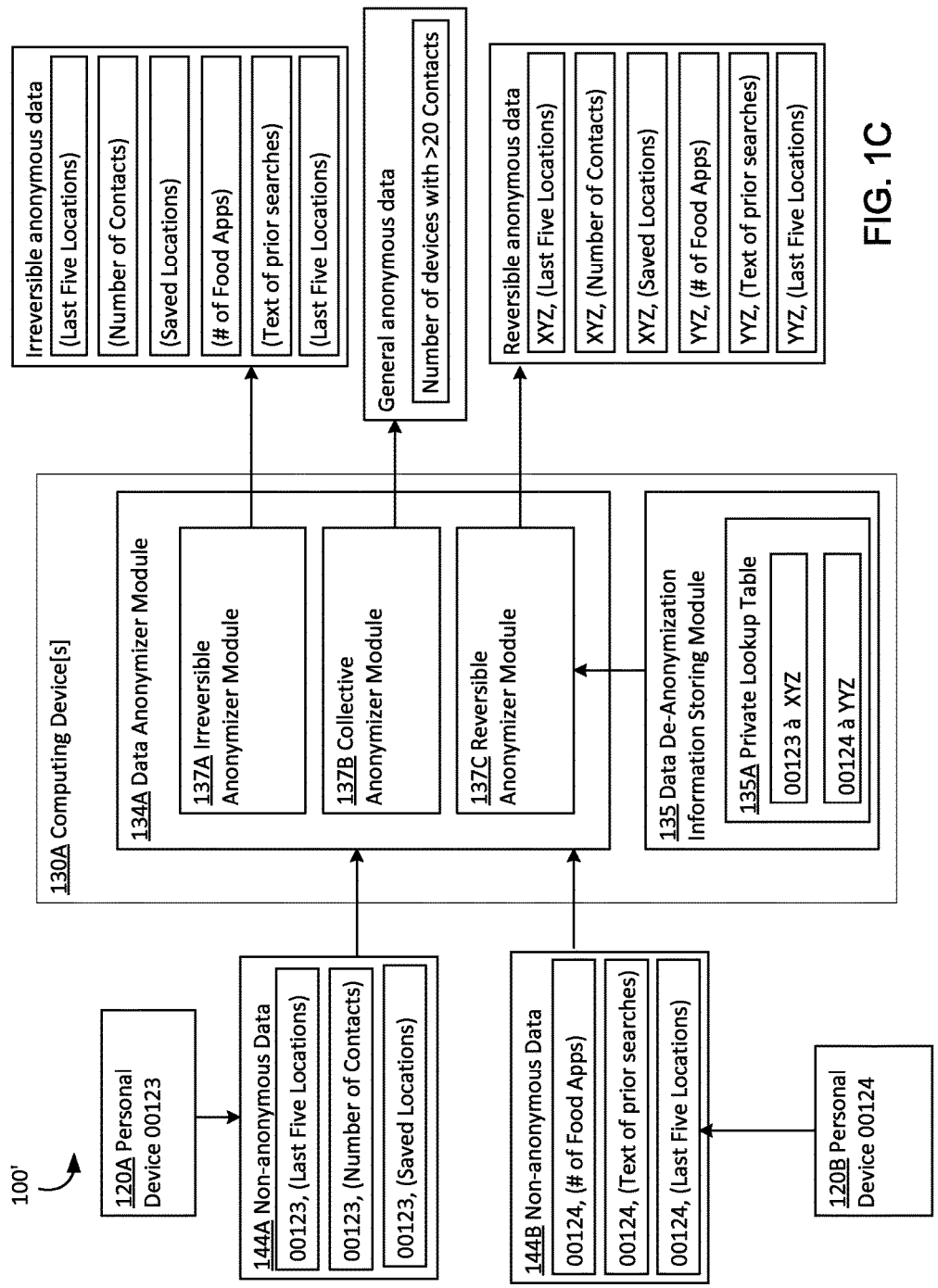
FIG. 1C shows a high level block diagram of a computing device 130A operating in an exemplary embodiment 100', according to an embodiment.
Figure 1D:
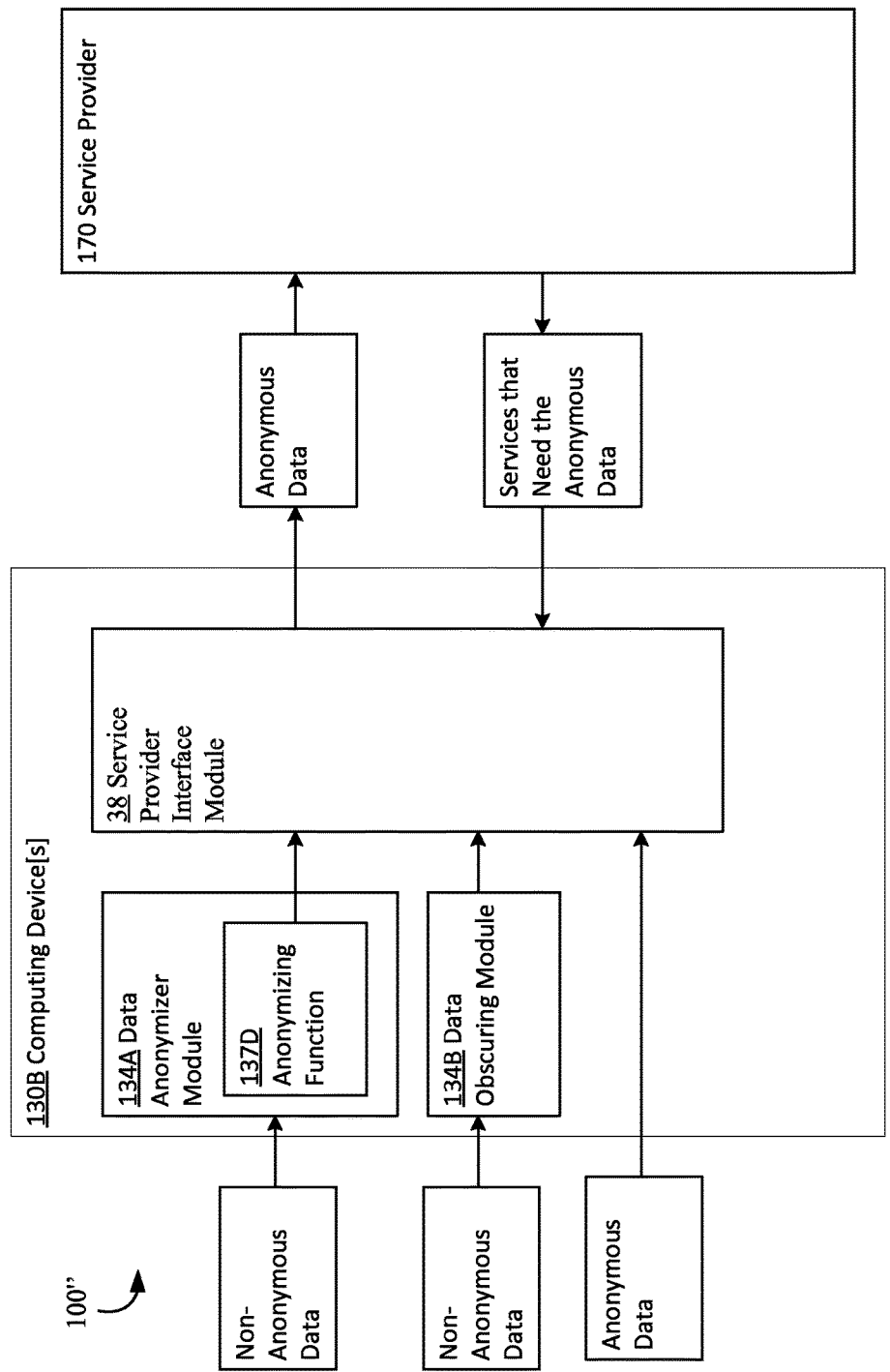
FIG. 1D shows a high-level block diagram of a computing device 130B operating in an exemplary embodiment 100", according to an embodiment.

Referring to FIGS. 1A-1D, in an embodiment, computing device 130 may include a data anonymizer module 134A that converts non-anonymous data 131B into anonymized data, in a process described in more detail with respect to FIGS. 1C and 1D. In an embodiment, depending on the type of anonymization, there may be additional data that can be used to return the anonymized data into non-anonymous data, e.g., a lookup table. In some such embodiments, the additional data, e.g., de-anonymization data, may be stored in data de-anonymization information storing module 135.

Referring again to FIGS. 1A-1D, in an embodiment, computing device 130 may include a data obscuring module 134B. For example, in an embodiment, data obscuring module 134B may obscure the non-anonymous data 131B, similarly to the data anonymizer module 134A. For example, in an embodiment, data obscuring module 134B may apply data masking. In an embodiment, data obscuring module 134B may obscure by addition, e.g., by adding false identification information to the true identification information, so that the false identification information may not be distinguished from the true identification information. Data de-anonymization information storing module 135, data anonymizer module 134A, and data obscuring module 134B may be absent in some embodiments.

Referring again to FIG. 1A, in an embodiment, computing device 130 may include service developer interface module 136. Service developer interface module 136 may communicate with service developer 160, e.g., via communication network 140. Specifically, in an embodiment, service developer interface module 136 may provide limited information regarding the acquired personal device data 131. In an embodiment, for example, service developer interface module 136 may provide information to service developer 160 regarding the type of data collected. In an embodiment, for example, service developer interface module 136 may provide information to service developer 160 regarding an aggregate synopsis of the data collected. In an embodiment, service developer 160 may receive such information and make a decision about what types of services to develop, e.g., using development decision module 162.

Referring again to FIG. 1A, in an embodiment, computing device 130 may include service provider interface module 138. In an embodiment, service provider interface module 138 may communicate with service provider 170, e.g., via communication network 140.

In an embodiment, service provider interface module 138 may include data rights management module 138A. In an embodiment, data rights management module 138A may keep track of which services have rights to which personal device data. For example, in an embodiment, service 172A may have rights to certain anonymous data 131A. For another example, in an embodiment, service 172B may have rights to data that has been processed through the data anonymizer 134A.

Referring again to FIG. 1A, in an embodiment, service provider interface module 138 may include service information module 138B. Service information module 138B may include a list of services that are provided from service provider 170, so that such information may be delivered to personal device 120, in an embodiment. In an embodiment, computing device 130 may present one or more of the services listed in service information module 138B to personal device 120, either upon request, or upon detecting that personal device 120 may be interested in one or more of the services.

Referring again to FIG. 1A, in an embodiment, service provider 170 may provide services to a personal device 120. In an embodiment, these services may be delivered to directly to personal device 120. In an embodiment, service provider 170 has limited or no communication with personal device 120, and communication is handled through an intermediary, e.g., computing device 130. In an embodiment, computing device 130 handles the delivery of services and data between service provider 170 and personal device 120 such that protected data 126A and protected component 128A are protected from service provider 170, but that service provider 170 can still provide services, e.g., service 172A and service 172B, to personal device 120. In an embodiment, service provider 170 includes a list of services management module 174 that maintains a list of services to present to computing device 130, e.g., to allow service information module 138B of computing device 130 to maintain information about various services.

In various embodiments, the communication network 140 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 140 may be wired, wireless, or a combination of wired and wireless networks. It is noted that "communication network" as used herein and in the drawings refers to one or more communication networks, which may or may not interact with each other and which, in some embodiments, may work in concert, wittingly or unwittingly, to facilitate communication between one or more entities.

Referring now to FIG. 1C, an embodiment may include a personal device 120A and a personal device 120B. Personal device 120A may generate non-anonymous data 144A, and personal device 120B may generate non-anonymous data 144B. Non anonymous data 144A and non-anonymous data 144B may be transmitted to computing device 130A, which may be a non-exclusive and non-limiting example of computing device 130. In an embodiment, computing device 130A may include a data anonymizer module 134A. In an embodiment, data anonymizer module 134A may include irreversible anonymizer module 137A, which generates anonymous data that is irreversible, e.g., in an example, the identifying data has been removed. In an embodiment, data anonymizer module 134A may include collective anonymizer module 137B, which may take the non-anonymous data 144A and the non-anonymous data 144B and create an aggregated, general anonymous data, as shown FIG. 1C. In an embodiment, data anonymizer module 134A may include reversible anonymizer module 137C, which may use a private lookup table 135A to convert the non-anonymous data into anonymous data. In an embodiment, that private lookup table 135A may be stored in the data-deanonymization information storing module 135.

Referring now to FIG. 1D, in an embodiment, a computing device 130B may have a data anonymizer 134A that may apply an anonymizing function 132A, as shown in FIG. 1D. For example, an anonymizing function may use a cryptographic method, a perturbation method, a DataFly algorithm, top-down specialization, and/or Mondarian multi-dimensional k-anonymity, as non-limiting and non-exclusive examples. In another embodiment, a data obscuring module 134B obscures the non-anonymous data. In an embodiment, the obscuring may be accomplished by adding similar-looking and plausible "false" data to the actual identifying data, so that later, the true data cannot be determined merely by looking at the data. In an embodiment, the anonymized data may be used by the service provider interface module 38 to give data to the service provider 170, either to carry out a portion of a service, or to determine which services may be useful to one or more personal devices 120.

The examples shown in FIGS. 1C and 1D are merely examples of how a data anonymizer might be implemented, and are not intended to be limiting or exclusive. There are many other techniques for anonymizing the data, some of which will be mentioned herein.

Referring again to FIG. 1B, FIG. 1B shows a more detailed description of computing device 130. In an embodiment, computing device 130 may include a processor 132. Processor 132 may include one or more microprocessors, Central Processing Units ("CPU"), a Graphics Processing Units ("GPU"), Physics Processing Units, Digital Signal Processors, Network Processors, Floating Point Processors, and the like. In some embodiments, processor 132 may be a server. In some embodiments, processor 132 may be a distributed-core processor. Although processor 132 is as a single processor that is part of a single personal device 120, processor 132 may be multiple processors distributed over one or many computing devices 30, which may or may not be configured to operate together. Processor 132 is illustrated as being configured to execute computer readable instructions in order to execute one or more operations described above, and as illustrated in FIGS. 5, 6A-6F, 7A-7I, and 8A-8B. In some embodiments, processor 132 is designed to be configured to operate as processing module 150, which may include one or more of data related to a device having a particular protected portion for which the device controls access acquiring module 152, presentation of a proposal to assist in performing at least one device-related service in return for access to the device particular protected portion facilitating module 154, and performance of at least a portion of the one or more services facilitating in response to a grant of access to data acquired by the device module 154.

In an embodiment, computing device 130 may include a memory 133. In some embodiments, memory 133 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 133 may be located at a single network site. In some embodiments, memory 133 may be located at multiple network sites, including sites that are distant from each other.

Figures 2, 2C:
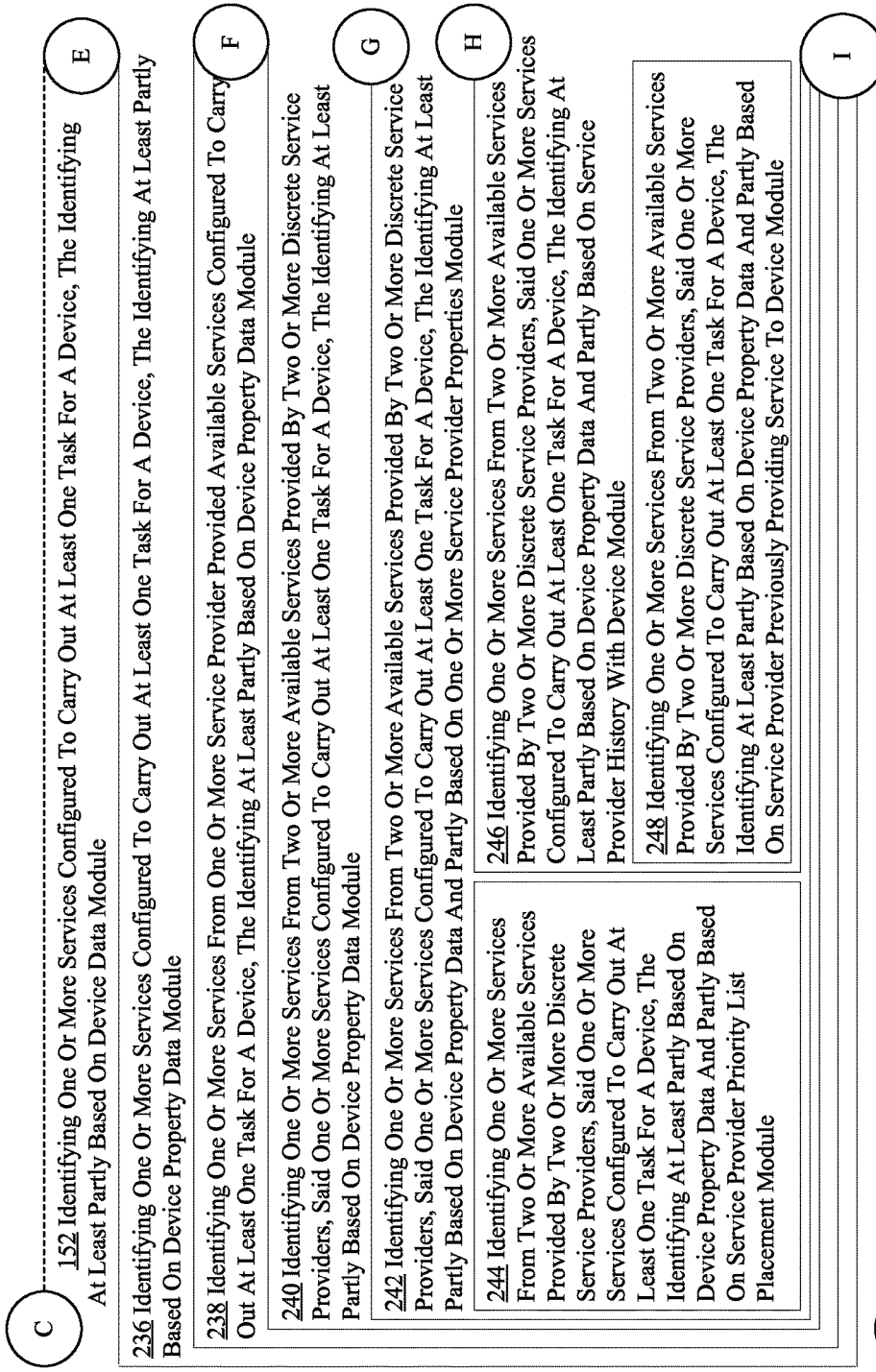

Referring now to FIG. 2, FIG. 2 illustrates an exemplary implementation of the identifying one or more services configured to carry out at least one task for a device, the identifying at least partly based on device data module 152. As illustrated in FIG. 2, the identifying one or more services configured to carry out at least one task for a device, the identifying at least partly based on device data module 152 may include one or more sub-logic modules in various alternative implementations and embodiments. For example, as shown in FIG. 2, e.g., FIG. 2A, in some embodiments, module 152 may include one or more of identifying a notification presentation service configured to notify when one or more entities are within a particular proximity to the device, the identifying at least partly based on device data module 202 and identifying one or more services configured to carry out at least one task for a device, the identifying at least partly based on device data to which limited access is provided module 208. In some embodiments, module 202 may include one or more of identifying a notification presentation service configured to notify when one or more entities are within a particular proximity to the device, the identifying at least partly based on data indicating the device has a large contact list module 204 and identifying a notification presentation service configured to notify when one or more entities are within a particular proximity to the device, the identifying at least partly based on data indicating that a device contact list has restricted access module 206. In some embodiments, module 208 may include one or more of identifying one or more services configured to carry out at least one task for a device, the identifying at least partly based on device data to which limited access is provided to one or more programs module 210 and identifying one or more services configured to carry out at least one task for a device, the identifying at least partly based on device data to which limited access is provided to a kernel-level program module 214. In some embodiments, module 210 may include depicting identifying one or more position-dependent services configured to carry out at least one task for a device, the identifying at least partly based on device data to which limited access is provided to one or more augmented reality programs module 212.

Referring again to FIG. 2, e.g., FIG. 2B, in some embodiments, module 152 may include one or more of identifying one or more services configured to carry out at least one task for a device, the identifying at least partly based on device sensor data module 216 and identifying one or more services configured to carry out at least one task for a device, the identifying at least partly based on device data to which access is restricted from one or more external entities module 226. In some embodiments, module 216 may include one or more of identifying one or more services configured to carry out at least one task for a device, the identifying at least partly based on device image capturing sensor data module 218 and identifying one or more services configured to carry out at least one task for a device, the identifying at least partly based on restricted device sensor data module 222 In some embodiments, module 218 may include identifying one or image processing services configured to carry out at least one task for a device, the identifying at least partly based on device image capturing sensor data module 220. In some embodiments, module 222 may include identifying one or more services configured to carry out at least one task for a device, the identifying at least partly based on device sensor data to which access is restricted to at least a portion of the device module 224. In some embodiments, module 226 may include one or more of identifying one or more services configured to carry out at least one task for a device, the identifying at least partly based on device data to which access is restricted from a communication network provider module 228, identifying one or more services configured to carry out at least one task for a device, the identifying at least partly based on device data to which access is restricted from a device manufacturer module 230, and identifying one or more services configured to carry out at least one task for a device, the identifying at least partly based on device data to which access is restricted from a device application producer module 232. In some embodiments, module 232 may include identifying one or more services, the identifying at least partly based on device data to which access is restricted from a device operating system producer module 234.

Referring again to FIG. 2, e.g., FIG. 2C, in some embodiments, module 152 may include identifying one or more services configured to carry out at least one task for a device, the identifying at least partly based on device property data module 236. In some embodiments, module 236 may include identifying one or more services from one or more service provider provided available services configured to carry out at least one task for a device, the identifying at least partly based on device property data module 238. In some embodiments, module 238 may include identifying one or more services from two or more available services provided by two or more discrete service providers, said one or more services configured to carry out at least one task for a device, the identifying at least partly based on device property data module 240. In some embodiments, module 240 may include identifying one or more services from two or more available services provided by two or more discrete service providers, said one or more services configured to carry out at least one task for a device, the identifying at least partly based on device property data and partly based on one or more service provider properties module 242. In some embodiments, module 242 may include one or more of identifying one or more services from two or more available services provided by two or more discrete service providers, said one or more services configured to carry out at least one task for a device, the identifying at least partly based on device property data and partly based on service provider priority list placement module 244 and identifying one or more services from two or more available services provided by two or more discrete service providers, said one or more services configured to carry out at least one task for a device, the identifying at least partly based on device property data and partly based on service provider history with device module 246. In some embodiments, module 246 may include identifying one or more services from two or more available services provided by two or more discrete service providers, said one or more services configured to carry out at least one task for a device, the identifying at least partly based on device property data and partly based on service provider previously providing service to device module 248.

Referring again to FIG. 2, e.g., FIG. 2D, as described above, in some embodiments, module 152 may include module 236, module 236 may include module 238, module 238 may include module 240, module 240 may include module 242, and module 242 may include module 246. In some embodiments, module 246 may include identifying one or more services from two or more available services provided by two or more discrete service providers, said one or more services configured to carry out at least one task for a device, the identifying at least partly based on device property data and partly based on the service provider providing the one or more identified services to a different device having a common characteristic with the device module 250. In some embodiments, module 242 may include identifying one or more services from two or more available services provided by two or more discrete service providers, said one or more services configured to carry out at least one task for a device, the identifying at least partly based on device property data and partly based on service provider data sharing agreement module 252.

Referring again to FIG. 2, e.g., FIG. 2E, as described above, in some embodiments, module 152 may include module 236, module 236 may include module 238, module 238 may include module 240, and module 240 may include module 242. In some embodiments, module 242 may include identifying one or more services from two or more available services provided by two or more discrete service providers, said one or more services configured to carry out at least one task for a device, the identifying at least partly based on device property data and partly based on service provider prior contract module 254.

Referring again to FIG. 2, e.g., FIG. 2F, in some embodiments, module 152 may include identifying one or more services configured to carry out at least one task for a device, the identifying at least partly based on device usage information data module 256. In some embodiments, module 256 may include one or more of identifying one or more services configured to carry out at least one task for a device, the identifying at least partly based on device position history information module 258, identifying one or more services configured to carry out at least one task for a device, the identifying at least partly based on device application usage information data module 262, identifying one or more services configured to carry out at least one task for a device, the identifying at least partly based on device web browsing information data module 264, and identifying one or more services configured to carry out at least one task for a device, the identifying at least partly based on particular application usage time amount data module 268. In some embodiments, module 258 may include identifying a caloric intake service configured to carry out at least one task for a device, the identifying at least partly based on device position history information module 260. In some embodiments, module 264 may include identifying one or more services configured to carry out at least one task for a device, the identifying at least partly based on device web browsing information indicating three or more downloads a day from bank account websites data module 266. In some embodiments, module 268 may include identifying one or more game playing services configured to carry out at least one task for a device, the identifying at least partly based on particular game usage time amount greater than a particular amount module 270.

Referring again to FIG. 2, e.g., FIG. 2G, in some embodiments, module 152 may include one or more of identifying one or more services configured to carry out at least one task for a device, the identifying at least partly based on device data transmission amount module 272, identifying one or more services configured to carry out at least one task for a device, the identifying at least partly based on restricted device data inventory module 274, and identifying one or more services configured to carry out at least one task for a device, the identifying at least partly based on restricted device sensor module 280. In some embodiments, module 274 may include one or more of identifying one or more services configured to carry out at least one task for a device, the identifying at least partly based on restricted device data inventory indicating restricted position data module 276 and identifying one or more services configured to carry out at least one task for a device, the identifying at least partly based on restricted device data inventory indicating a number of stored previous locations and a number of stored previous contacts module 278. In some embodiments, module 280 may include one or more of identifying one or more data traffic analysis services configured to carry out at least one task for a device, the identifying at least partly based on a restricted data radio module 282 and identifying one or more weather analysis services configured to carry out at least one task for a device, the identifying at least partly based on a restricted barometric pressure sensor module 284.

Referring again to FIG. 2, e.g., FIG. 2H, in some embodiments, module 152 may include identifying one or more alert services configured to alert when one or more devices controlled by a person in the device contact list is within a particular proximity to the device, the identifying at least partly based on device data module 286.

Figures 3, 3B:
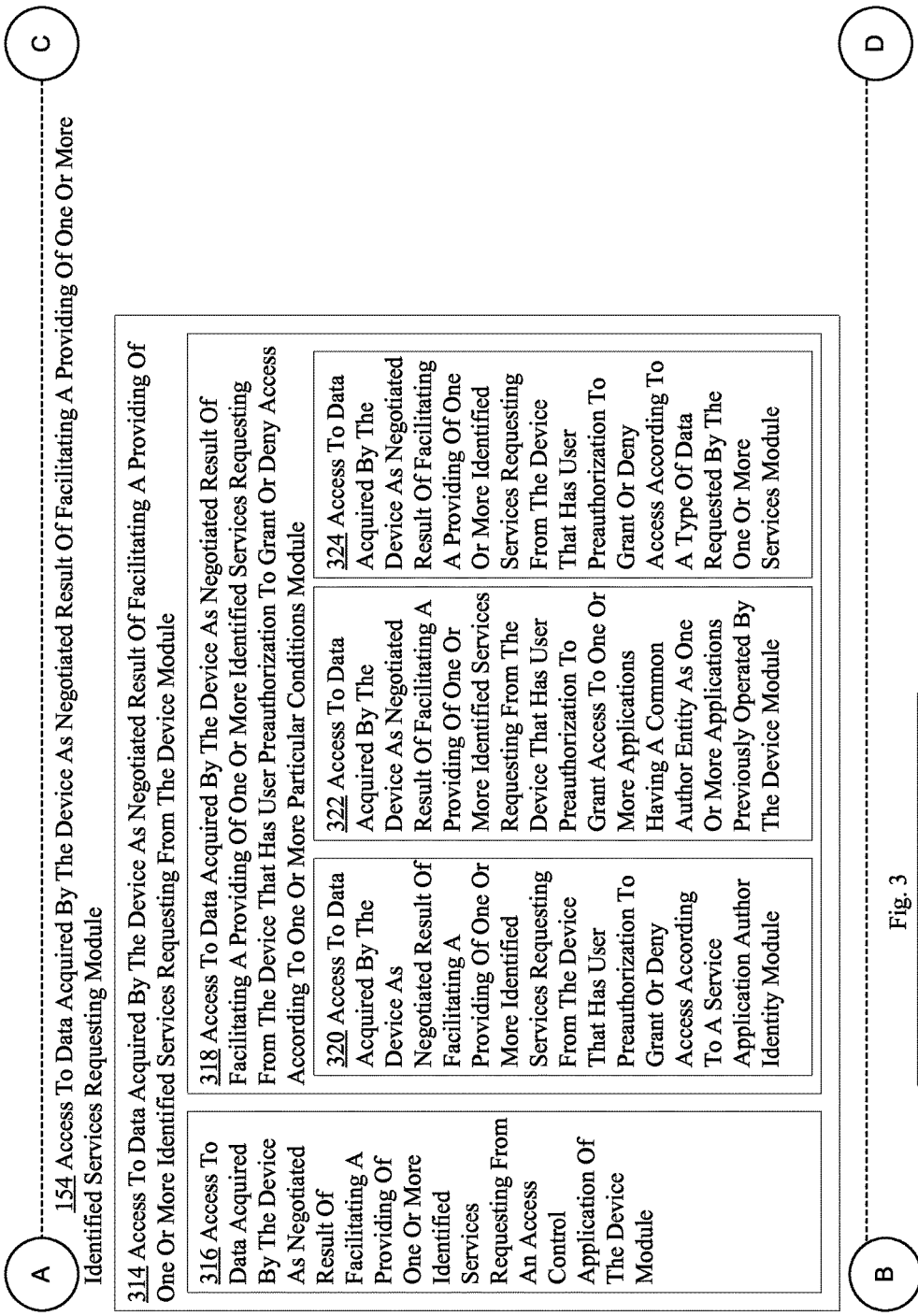

Referring now to FIG. 3, FIG. 3 illustrates an exemplary implementation of access to data acquired by the device as negotiated result of facilitating a providing of one or more identified services requesting module 154. As illustrated in FIG. 3, the access to data acquired by the device as negotiated result of facilitating a providing of one or more identified services requesting module 154 may include one or more sub-logic modules in various alternative implementations and embodiments. For example, as shown in FIG. 3 (e.g., FIG. 3A), in some embodiments, module 154 may include access to data acquired by one or more device sensors as negotiated result of facilitating a providing of one or more identified services requesting module 302. In some embodiments, module 302 may include access to data acquired by one or more device positioning sensors as negotiated result of facilitating a providing of one or more identified services requesting module 304. In some embodiments, module 304 may include access to data acquired by one or more device positioning sensors as negotiated result of facilitating a providing of an identified position-based service requiring access to the data acquired by the one or more device positioning sensors requesting module 306. In some embodiments, module 306 may include access to position data acquired by one or more device positioning sensors and stored on the device as negotiated result of facilitating a providing of an identified position-based service requiring access to the data acquired by the one or more device positioning sensors requesting module 308. In some embodiments, module 308 may include access to position data acquired by one or more device positioning sensors and stored on the device as negotiated result of facilitating a providing of an identified entity proximity alarm based service requiring access to the data acquired by the one or more device positioning sensors requesting module 310. In some embodiments, module 310 may include access to position data acquired by one or more device positioning sensors and stored on the device as negotiated result of transmitting, to the device, an identified entity proximity alarm based service requiring access to the data acquired by the one or more device positioning sensors requesting module 312.

Referring again to FIG. 3, e.g., FIG. 3B, in some embodiments, module 154 may include access to data acquired by the device as negotiated result of facilitating a providing of one or more identified services requesting from the device module 314. In some embodiments, module 314 may include one or more of access to data acquired by the device as negotiated result of facilitating a providing of one or more identified services requesting from an access control application of the device module 316 and access to data acquired by the device as negotiated result of facilitating a providing of one or more identified services requesting from the device that has user preauthorization to grant or deny access according to one or more particular conditions module 318. In some embodiments, module 318 may include one or more of access to data acquired by the device as negotiated result of facilitating a providing of one or more identified services requesting from the device that has user preauthorization to grant or deny access according to a service application author identity module 320, access to data acquired by the device as negotiated result of facilitating a providing of one or more identified services requesting from the device that has user preauthorization to grant access to one or more applications having a common author entity as one or more applications previously operated by the device module 322, and access to data acquired by the device as negotiated result of facilitating a providing of one or more identified services requesting from the device that has user preauthorization to grant or deny access according to a type of data requested by the one or more services module 324.

Referring again to FIG. 3, e.g., FIG. 3C, in some embodiments, module 154 may include one or more of access to data acquired by the device as negotiated result of facilitating a providing of one or more identified services requesting from device operator module 326 and facilitation of user interaction regarding access to data acquired by the device as negotiated result of facilitating a providing of one or more identified services requesting module 332. In some embodiments, module 326 may include access to data acquired by the device as negotiated result of facilitating a providing of one or more identified services requesting, via the device, from device operator module 328. In some embodiments, module 328 may include access to data acquired by the device as negotiated result of providing of one or more identified services requesting, by instructing device to carry out user interaction operations, from device operator module 330. In some embodiments, module 332 may include one or more of transmission of instructions to proceed with a user interaction regarding access to data acquired by the device as negotiated result of facilitating a providing of one or more identified services requesting module 334, transmission of an application that executes a user interaction regarding access to data acquired by the device as negotiated result of facilitating a providing of one or more identified services requesting module 336, and facilitation of presentation of request for access to data acquired by the device as negotiated result of facilitating a providing of one or more identified services requesting module 338. In some embodiments, module 338 may include facilitation of display of request for access to data acquired by the device as negotiated result of facilitating a providing of one or more identified services requesting module 340. In some embodiments, module 340 may include one or more of facilitation of display of request for access to data acquired by the device as a payment for facilitation of providing of one or more identified services requesting module 342 and facilitation of display of request for access to data acquired by the device as a necessary condition precedent to facilitation of providing of one or more identified services requesting module 344.

Referring again to FIG. 3, e.g., FIG. 3E, in some embodiments, module 154 may include one or more of presentation of an example of providing the one or more services facilitating module 346 and presentation of a request for access to the data acquired by the device as a manner of carrying out the one or more services as shown in the presentation of the example facilitating module 348. In some embodiments, module 348 may include one or more of presentation of a request for access to the data acquired by the device as a necessary condition of carrying out the one or more services as shown in the presentation of the example facilitating module 350 and presentation of a request for access to the data acquired by the device as a terms of service agreement for carrying out the one or more services as shown in the presentation of the example facilitating module 352.

Figures 4, 4B:
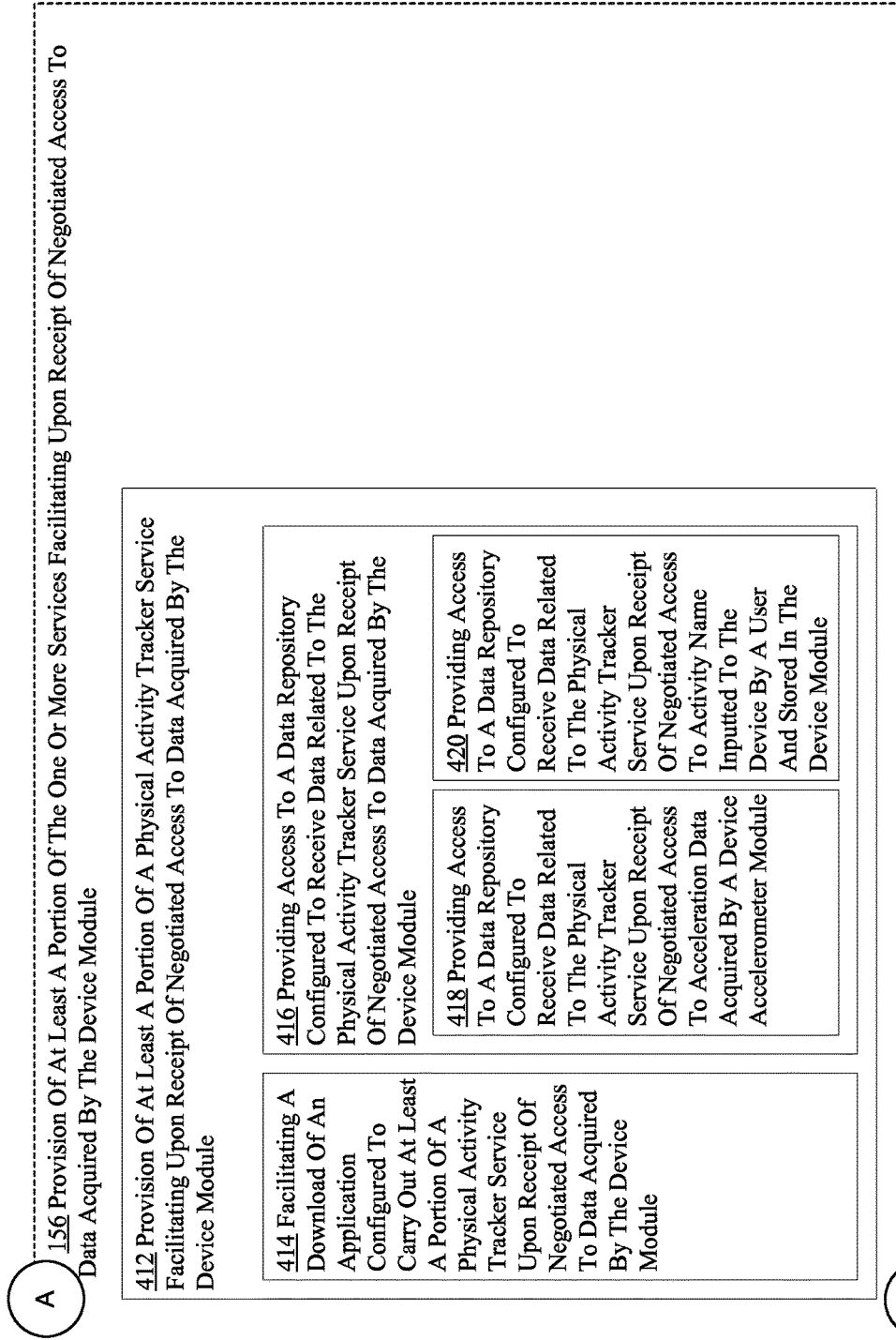

Referring now to FIG. 4, FIG. 4 illustrates an exemplary implementation of the provision of at least a portion of the one or more services facilitating upon receipt of negotiated access to data acquired by the device module 156. As illustrated in FIG. 4, the provision of at least a portion of the one or more services facilitating upon receipt of negotiated access to data acquired by the device module 156 may include one or more sub-logic modules in various alternative implementations and embodiments. For example, as shown in FIG. 4, e.g., FIG. 4A, in some embodiments, module 156 may include one or more of provision of at least a portion of the one or more services facilitating upon receipt of negotiated access to data previously acquired by the device module 402, provision of at least a portion of the one or more services facilitating upon receipt of negotiated access to data as it is obtained by the device module 404, provision of at least a portion of the one or more services facilitating upon receipt of negotiated access to data after it is obtained by the device module 406, provision of at least a portion of the one or more services facilitating upon receipt of negotiated access to data obtained by a device environment interaction component module 408, and providing a location at which one or more applications configured to perform one or more services are configured to be downloaded upon receipt of negotiated access to data acquired by the device module 410.

Referring again to FIG. 4, e.g., FIG. 4B, in some embodiments, module 156 may include provision of at least a portion of a physical activity tracker service facilitating upon receipt of negotiated access to data acquired by the device module 412. In some embodiments, module 412 may include one or more of facilitating a download of an application configured to carry out at least a portion of a physical activity tracker service upon receipt of negotiated access to data acquired by the device module 414 and providing access to a repository configured to receive data related to the physical activity tracker service upon receipt of negotiated access to data acquired by the device module 416. In some embodiments, module 416 may include one or more of providing access to a data repository configured to receive data related to the physical activity tracker service upon receipt of negotiated access to acceleration data acquired by a device accelerometer module 418 and providing access to a data repository configured to receive data related to the physical activity tracker service upon receipt of negotiated access to activity name inputted to the device by a user and stored in the device module 420.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either subcomponent operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 5:
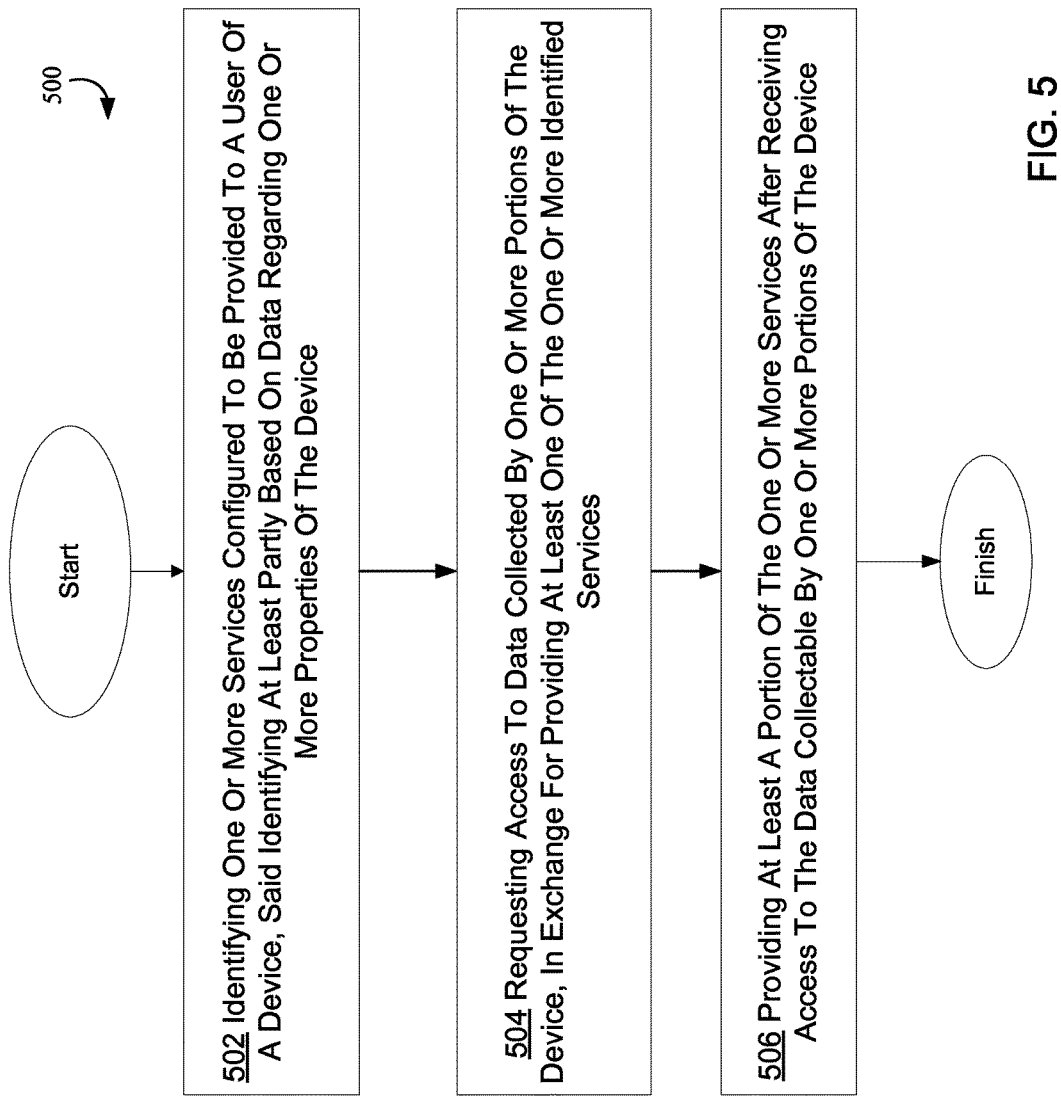
FIG. 5 is a high-level logic flowchart of a process, e.g., operational flow 500, according to an embodiment.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 5 as well as the other operations to be described herein may be performed by at least one of a machine, an article of manufacture, or a composition of matter.

In some embodiments, an operational flow may include receiving data regarding one or more properties of a device, said data not particularly identifying the device. For example, a non-identifying device property data acquiring module receiving data regarding (e.g., data about any aspect, whether temporary or permanent, or whether related to the environment) one or more properties (e.g., any information, regardless of context dependency, triviality, or other factor) of a device (e.g., a piece of equipment and/or a person or entity that may use that equipment, e.g., in an embodiment, a user's laptop computer device), said data not particularly identifying (e.g., silent about identifying, or identifying in any manner that is not a one-to-one identification, e.g., identifying in any manner that allows for ambiguity about which device is being referenced, e.g., "the device in Seattle, Wash." is not particularly identifying, even if there is only one device in Seattle, Wash. at a given time, although in an embodiment, the identification does not need to be permanent, e.g., an IP address, even if it is not persistent, may be particularly identifying the device under some conditions, although not all (e.g., a router may show a single IP address to the wide area network for multiple devices on the local network) the device (e.g., the user's laptop device).

In some embodiments, an operational flow may include receiving data regarding one or more types of information stored in a memory of the device, said data not particularly identifying the device. For example, a non-identifying device property data saved at a location data acquiring module receiving data regarding one or more types of information (e.g., whether there is contact information with phone numbers, or contact information only with emails, or no contact information at all) stored in a memory of the device (e.g., a PDA for tracking personal contacts), said data not particularly identifying the device (e.g., the device is identified through its IP address, but a user of the device is omitted or obscured).

In some embodiments, an operational flow may include acquiring data indicating a property of particular protected data for which the device is configured to selectively allow access. For example, acquiring data indicating at least one characteristic of particular protected data for which the device controls access acquiring module acquiring data indicating a property of particular protected data (e.g., "velocity data indicating that the device spends at least one hour a day traveling between five and eight miles per hour," but no additional information about the velocity or specific velocities at any particular time) for which the device (e.g., an exercise assistant watch) is configured to selectively allow access (e.g., access is granted through Bluetooth to the user's home computer device, but not to other devices).

Referring now to FIG. 5, FIG. 5 shows operation 500, which may include operation 502 depicting identifying one or more services configured to be provided to a user of a device, said identifying at least partly based on data regarding one or more properties of the device. For example, FIG. 1, e.g., FIG. 1B, shows data related (e.g., related in any way, regardless of how tenuous, e.g., in the example listed herein, the service is related because there is a contact list present on the smartphone, which for purposes of an embodiment of this application, is more than sufficient to establish "related") to a device (e.g., a user's tablet device) having a particular protected portion for which the device controls access acquiring module 152 identifying (e.g., finding, selecting, choosing, receiving, acquiring, retrieving, picking up, creating, generating, intercepting, reading, hearing, detecting, picking, weighting, and the like) one or more services (e.g., a "where are your friends" service that shows a user of a device where the user's friends, e.g., the people listed in the user's contact list, are located) configured to be provided (e.g., configured to be made available to, regardless of actual use) to a user of a device (e.g., a smartphone), said identifying (e.g., finding, selecting, choosing, receiving, acquiring, retrieving, picking up, creating, generating, intercepting, reading, hearing, detecting, picking, weighting, and the like) at least partly based on data regarding (e.g., data about any aspect, whether temporary or permanent, or whether related to the environment) one or more properties (e.g., any information, regardless of context dependency, triviality, or other factor) of the device (e.g., a user's tablet device).

Referring again to FIG. 5, operation 500 may include operation 504 depicting requesting access to data collected by one or more portions of the device, in exchange for providing at least a portion of one of the one or more identified services. For example, FIG. 1, e.g., FIG. 1B, shows presentation of a proposal to assist in performing at least one device-related service in return for access to the device particular protected portion facilitating module 154 requesting access (e.g., the giving of one or more authentication tools, e.g., passwords, privileges, logins, addresses, and the like, or permission, authorization, authentication, and the like to one or more of reading, writing, modifying, altering, deleting, encrypting, transmitting, receiving, or performing any of one or more actions or operations upon) to data collected (e.g., received, retrieved, or generated by any interface, including input and/or output devices, e.g., keyboards and pointing devices, and one or more sensors, alone or in concert) by one or more portions (e.g., any component, including hardware, software, firmware, API, and any combination of the foregoing) of the device (e.g., the user's tablet device) in exchange (e.g., in bargain for, in deal for, in trade for, in consideration of, as a quid pro quo, and the like) for providing (e.g., taking one or more actions that, whether directly or indirectly, are intended to assist in the completion, execution, or carrying out of at least a portion of, regardless of whether such actions constitute the whole of the service or only a part of) at least one of the one or more identified services (e.g., a "where are your friends" service that shows a user of a device where the user's friends, e.g., the people listed in the user's contact list, are located).

Referring again to FIG. 5, operation 500 may include operation 506 depicting providing at least a portion of the one or more services after receiving access to the data collectable by one or more portions of the device. For example. FIG. 1, e.g., FIG. 1B, shows performance of at least a portion of the one or more services facilitating in response to a grant of access to data acquired by the device module 156 providing e.g., taking one or more actions that, whether directly or indirectly, are intended to assist in the completion, execution, or carrying out of one or more steps or instructions in executing or carrying out) of at least a portion of the at least one service (e.g., the "where are the user's friends" service) after receiving access (e.g., the giving of one or more authentication tools, e.g., passwords, privileges, logins, addresses, and the like, or permission, authorization, authentication, and the like to one or more of reading, writing, modifying, altering, deleting, encrypting, transmitting, receiving, or performing any of one or more actions or operations upon) to the data (e.g., the user's contact list stored on the tablet device) collectable by one or more portions (e.g., the on-screen virtual keyboard of the tablet device) of the device (e.g., the user's tablet device).

Figure 6A:
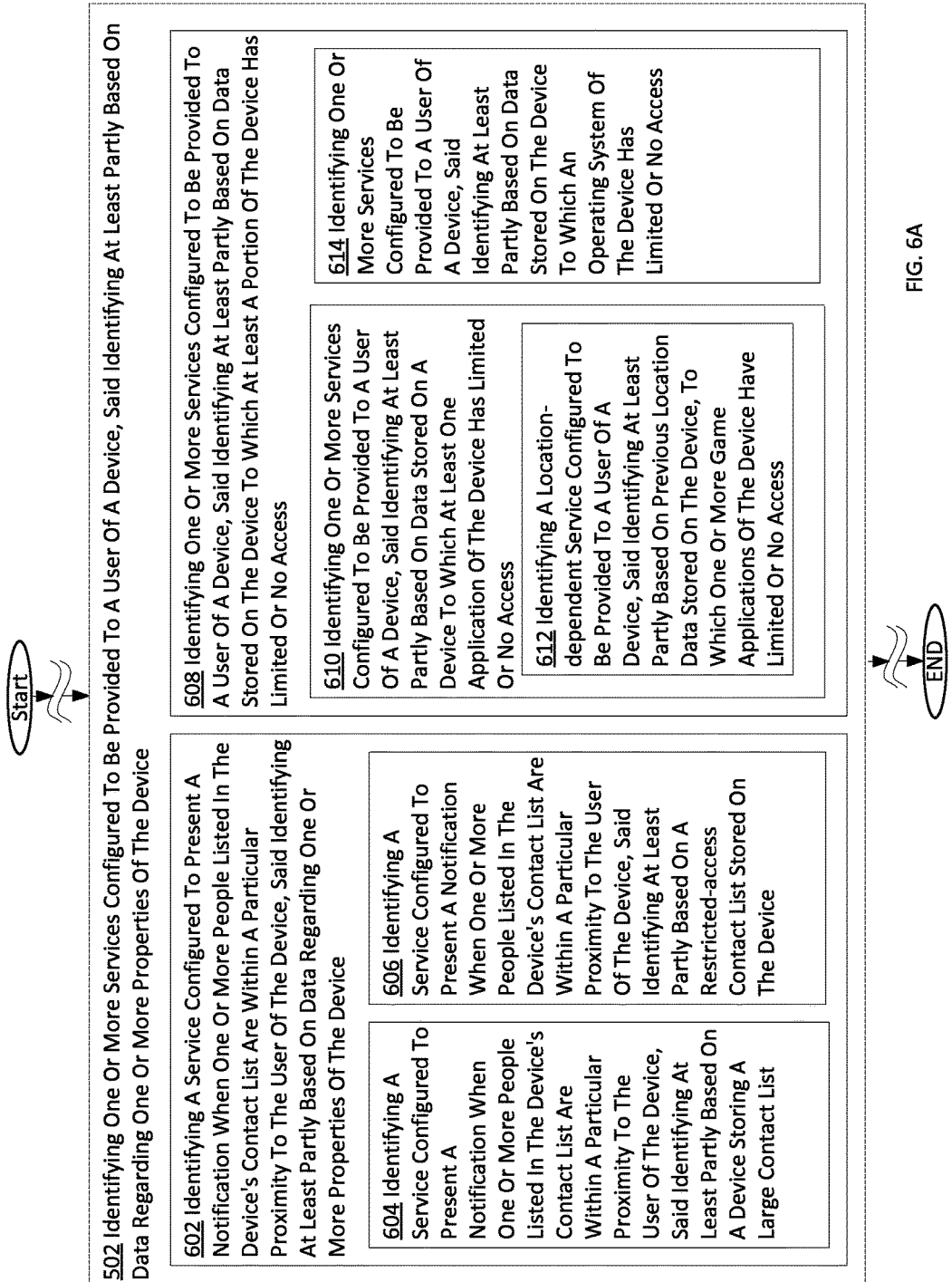
FIG. 6A is a high-level logic flow chart of a process depicting alternate implementations of an identifying services operation 502, according to one or more embodiments.

FIGS. 6A-6E depict various implementations of operation 502, depicting identifying one or more services configured to be provided to a user of a device, said identifying at least partly based on data regarding one or more properties of the device according to embodiments. Referring now to FIG. 6A, operation 502 may include operation 602 depicting identifying a service configured to present a notification when one or more entities listed in the device's contact list are within a particular proximity to the user of the device, said identifying at least partly based on data regarding one or more properties of the device. For example, FIG. 2, e.g., FIG. 2A, shows identifying a service notification presentation service configured to notify when one or more entities are within a particular proximity to the device, the identifying at least partly based on device data module 202 identifying (e.g., selecting, choosing, retrieving, requesting from third parties and selecting from the responses, selecting from a list, selecting from a database, selecting based on one or more criteria, and the like, one or more of) a service configured to present a notification (e.g., light up a light, or present a message on a screen) when one or more entities listed in the device's contact list are within a particular proximity to the user of the device (e.g., within 30 feet of), said identifying at least partly based on data regarding one or more properties of the device (e.g., based on data indicating a position of the device, granular within a city block).

Referring again to FIG. 6A, operation 602 may include operation 604 depicting identifying a service configured to present a notification when one or more people listed in the device's contact list are within a particular proximity to the user of the device, said identifying at least partly based on a device storing a large contact list. For example, FIG. 2, e.g., FIG. 2A, shows identifying a notification presentation service configured to notify when one or more entities are within a particular proximity to the device, the identifying at least partly based on data indicating the device has a large contact list module 204 identifying a service configured to present a notification (e.g., making an audible sound) when one or more people listed in the device's contact list are within a particular proximity to a user of the device (e.g., within one mile), said identifying at least partly based on a device storing a large contact list (e.g., the service is selected because someone with a large contact list might want to know when a certain contact or group of contacts is close to her location).

Referring again to FIG. 6A, operation 602 may include operation 606 depicting identifying a service configured to present a notification when one or more people listed in the device's contact list are within a particular proximity to the user of the device, said identifying at least partly based on a restricted-access contact list stored on the device. For example, FIG. 2, e.g., FIG. 2A, shows identifying a notification presentation service configured to notify when one or more entities are within a particular proximity to the device, the identifying at least partly based on data indicating that a device contact list has restricted access module 206 identifying a service configured to present a notification when one or more people listed in the device's contact list are within a particular proximity (e.g., thirty feet) to the user of the device (e.g., a smartphone, e.g., a Samsung Galaxy), said identifying at least partly based on a restricted-access contact list stored on the device (e.g., the service of presenting notifications when contact list contacts are within a particular proximity is selected because the device, e.g., the Samsung Galaxy, has restricted access to its contact list from outside entities, and this service is a manner in which access may be granted).

Referring again to FIG. 6A, operation 502 may include operation 608 depicting identifying one or more services configured to be provided to a user of the device, said identifying at least partly based on data stored on the device to which at least a portion of the device has limited or no access. For example, FIG. 2, e.g., FIG. 2A, shows identifying one or more services configured to carry out at least one task for a device, the identifying at least partly based on device data to which limited access is provided module 208 identifying one or more services (e.g., an alternate health-food finding service) configured to be provided to a user of a device (e.g., a smart appliance in a user's house, e.g., a refrigerator), said identifying at least partly based on data stored on the device (e.g., an updating inventory of what is in the refrigerator stored on the device, which has access to the things that the user bought with a credit card that are perishable) to which at least a portion of the device has limited or no access (e.g., the data transmission portion of the smart refrigerator may not have access to the refrigerator inventory).

Referring again to FIG. 6A, operation 608 may include operation 610 depicting identifying one or more services configured to be provided to a user of the device, said identifying at least partly based on data stored on a device to which at least one application of the device has limited or no access. For example, FIG. 2, e.g., FIG. 2A, shows identifying one or more services configured to carry out at least one task for a device, the identifying at least partly based on device data to which limited access is provided to one or more programs module 210 identifying one or more services (e.g., an ice-cream shop locating service) configured to be provided to a user of a device (e.g., a tablet device, e.g., an iPad), said identifying at least partly based on data stored on a device to which at least one application of the device (e.g., an application installed by the device operating system designer, which also designed the ice cream shop locating service) has limited or no access (e.g., access is allowed only to the applications that the user specifically enumerates).

Referring again to FIG. 6A, operation 610 may include operation 612 depicting identifying a location-dependent service configured to be provided to a user of the device, said identifying at least partly based on previous location data stored on the device, to which one or more game applications of the device have limited or no access. For example, FIG. 2, e.g., FIG. 2A, shows identifying one or more position-dependent services configured to carry out at least one task for a device, the identifying at least partly based on device data to which limited access is provided to one or more augmented reality programs module 212 identifying a location-dependent service (e.g., a service to show the average strength of wireless signals in the vicinity of the device) configured to be provided to a user of a device (e.g., a cellular telephone), said identifying at least partly based on previous location data stored on the device, to which one or more game applications of the device (e.g., the Brick Breaker game designed for Blackberry) have limited or no access (e.g., that application cannot access the location information, or the wireless radio).

Referring again to FIG. 6A, operation 608 may include operation 614 depicting identifying one or more services configured to be provided to a user of the device, said identifying at least partly based on data stored on the device to which an operating system of the device has limited or no access. For example, FIG. 2, e.g., FIG. 2A, shows identifying one or more services configured to carry out at least one task for a device, the identifying at least partly based on device data to which limited access is provided to a kernel-level program module 214 identifying one or more services (e.g., a new music identifying service) configured to be provided to a user of a device, said identifying at least partly based on data stored on the device (e.g., the identifying of the application is partly based on the songs that are stored on the device, and partly based on the recognition that more than 70% of the device's memory is unused) to which an operating system of the device has limited or no access (e.g., the operating system of the device has access to the information regarding usage of the device memory, but not access to the names of all the songs accessible through the device).

Figure 6B:
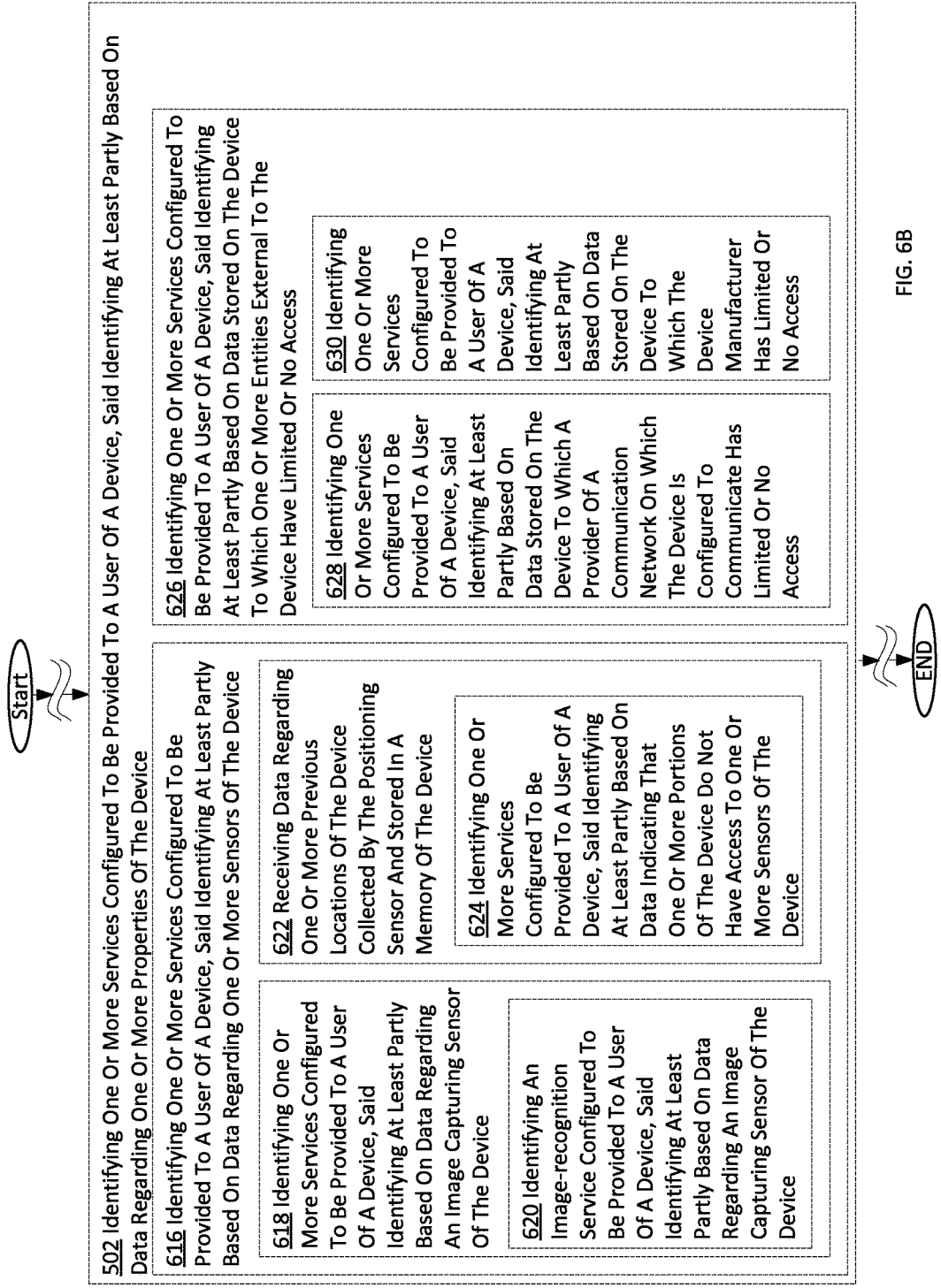
FIG. 6B is a high-level logic flow chart of a process depicting alternate implementations of an identifying services operation 502, according to one or more embodiments.

Referring now to FIG. 6B, operation 502 may include operation 616 depicting identifying one or more services configured to be provided to a user of the device, said identifying at least partly based on data regarding one or more sensors of the device. For example, FIG. 2, e.g., FIG. 2B, shows identifying one or more services configured to carry out at least one task for a device, the identifying at least partly based on device sensor data module 216 identifying one or more services (e.g., a service designed to predict the best time of day to go for a bicycle ride) configured to be provided to a user of a device, said identify Referring again to FIG. 6B, operation 616 may include operation 618 depicting identifying one or more services configured to be provided to a user of the device, said identifying at least partly based on data regarding an image capturing sensor of the device. For example, FIG. 2, e.g., FIG. 2B, shows identifying one or more services configured to carry out at least one task for a device, the identifying at least partly based on device image capturing sensor data module 218 identifying one or more services (e.g., a service showing the user of the device a list of one or more upcoming concerts that could be attended, based on music that has been played on the device)

Referring again to FIG. 6B, operation 618 may include operation 620 depicting identifying an image-recognition service configured to be provided to a user of the device, said identifying at least partly based on data regarding an image capturing sensor of the device. For example, FIG. 2, e.g., FIG. 2B, shows identifying one or image processing services configured to carry out at least one task for a device, the identifying at least partly based on device image capturing sensor data module 220 identifying an image-recognition service configured to be provided to a user of a device (e.g., a wireless-radio enabled digital SLR camera), said identifying at least partly based on data regarding an image capturing sensor of the device (e.g., the service is only provided to digital cameras having image capturing sensors with greater capacity than five megapixels).

Referring again to FIG. 6B, operation 616 may include operation 622 depicting identifying one or more services configured to be provided to a user of the device, said identifying at least partly based on data indicating restricted access to one or more sensors of the device. For example, FIG. 2, e.g., FIG. 2B, shows identifying one or more services configured to carry out at least one task for a device, the identifying at least partly based on restricted device sensor data module 222 identifying one or more services (e.g., a service that identifies which time of day is best to run on one or more particular roads) configured to be provided to a user of the device (e.g., a tablet device, e.g., a Samsung Galaxy), said identifying at least partly based on data indicating restricted access (e.g., one or more entities cannot access something without one or more additional steps) to one or more sensors of the device (e.g., Bluetooth radio).

Referring again to FIG. 6B, operation 622 may include operation 624 depicting identifying one or more services configured to be provided to a user of the device, said identifying at least partly based on data indicating that one or more portions of the device do not have access to one or more sensors of the device. For example, FIG. 2, e.g., FIG. 2B, shows identifying one or more services configured to carry out at least one task for a device, the identifying at least partly based on device sensor data to which access is restricted to at least a portion of the device module 224 (e.g., a service that identifies which time of day is best to go for a run based on the weather patterns for that day) configured to be provided to a user of the device, said identifying at least partly based on data indicating that one or more portions of the device (e.g., an application installed by the user that has access to the user's contact list but not access to the barometer) do not have access to one or more sensors of the device (e.g., the barometer, and the application wants access to the barometer sensor, so the weather pattern based service is identified).

Referring again to FIG. 6B, operation 502 may include operation 626 depicting identifying one or more services configured to be provided to a user of the device, said identifying at least partly based on data stored on the device to which one or more entities external to the device have limited or no access. For example, FIG. 2, e.g., FIG. 2B, shows identifying one or more services configured to carry out at least one task for a device, the identifying at least partly based on device data to which access is restricted from one or more external entities module 226 identifying one or more services (e.g., a service that identifies how far an athlete should run on a particular day, based on the length and speed of the runs on previous days that are stored on the device) configured to be provided to a user of the device (e.g., a user's smartphone, e.g., a Nokia Lumia Windows phone), said identifying at least partly based on data stored on the device (e.g., data regarding a user's last twenty web searches) to which one or more entities (e.g., a communication network provider that provides one or more networks for the device to communicate on) external to the device (e.g., the service does not originate from the device, but from a tower or other structure that is not part of the device) have limited or no access (e.g., the communication network provider can only access one of the twenty web searches, e.g., the most recent one, but the communication network provider wants access to all of them, e.g., this shows that there may not be a direct, immediately obvious link between the information desired by the entity and the offered service, although that may be the case in other embodiments).

Referring again to FIG. 6B, operation 626 may include operation 628 depicting identifying one or more services configured to be provided to a user of the device, said identifying at least partly based on data stored on the device to which a provider of a communication network on which the device is configured to communicate has limited or no access. For example, FIG. 2, e.g., FIG. 2B, shows identifying one or more services configured to carry out at least one task for a device, the identifying at least partly based on device data to which access is restricted from a communication network provider module 228 identifying one or more services (e.g., a service that shows where the nearest available taxi is to the device's location) identifying one or more services configured to be provided to a user of the device (e.g., a smartphone), said identifying at least partly based on data stored on the device (e.g., location data) to which a provider of a communication network (e.g., a provider of a wireless router for the user to use at Starbucks, or an AT&T cellular provider) on which the device is configured to communicate has limited or no access (e.g., the position data is kept private by the device from outgoing traffic).

Referring again to FIG. 6B, operation 626 may include operation 630 depicting identifying one or more services configured to be provided to a user of the device, said identifying at least partly based on data stored on the device to which the device manufacturer has limited or no access. For example, FIG. 2, e.g., FIG. 2B, shows identifying one or more services configured to carry out at least one task for a device, the identifying at least partly based on device data to which access is restricted from a device manufacturer module 230 identifying one or more services (e.g., a service that shows if there is a store within five miles of the user's location that has the item that the user is considering purchasing for a cheaper price), said identifying at least partly based on data stored on the device (e.g., a tablet device, e.g., data stored on the device may be various spreadsheets created on a computer and transferred to the device) to which the device manufacturer (e.g., ASUS) has limited or no access.

Figure 6C:
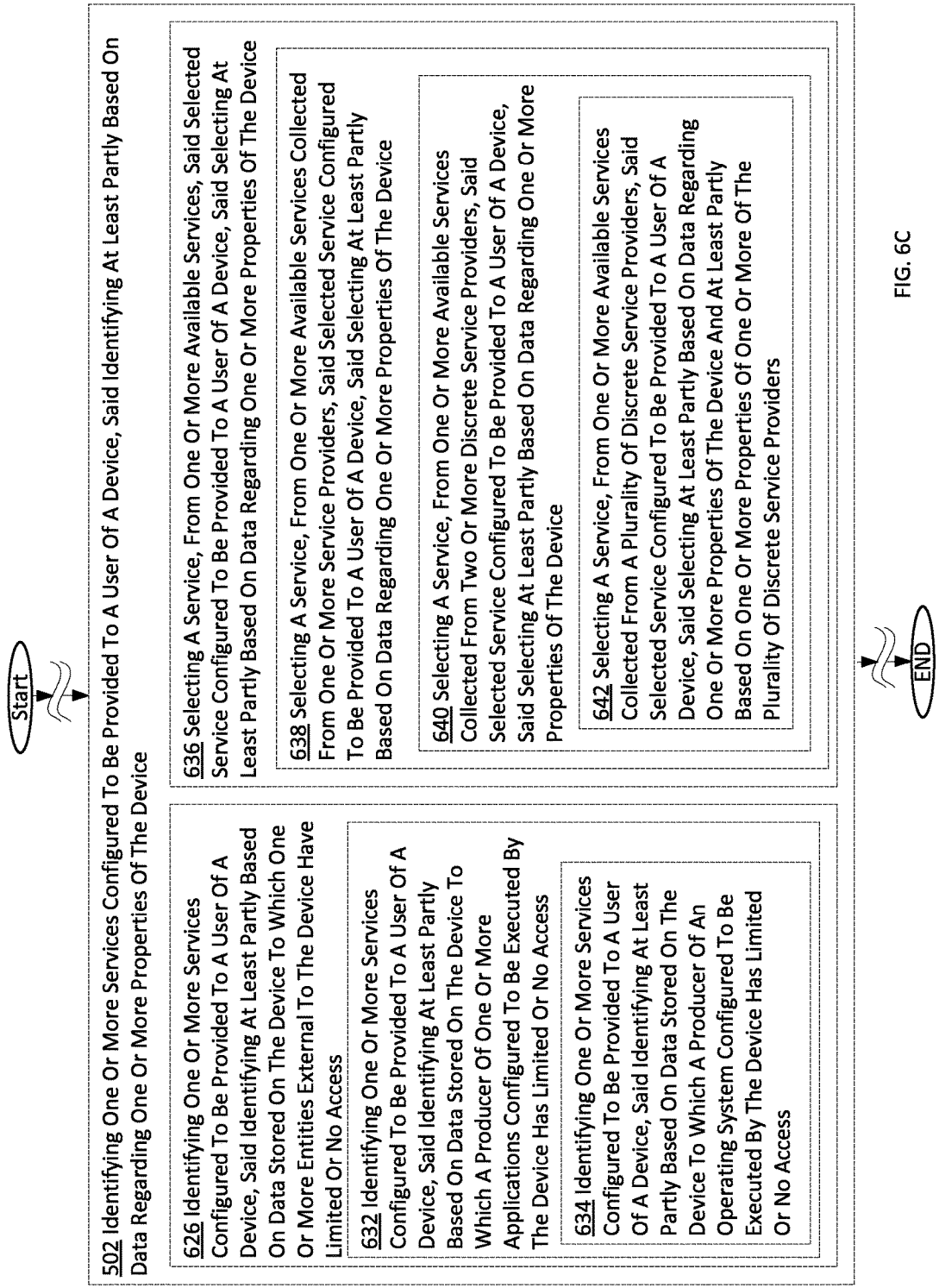
FIG. 6C is a high-level logic flow chart of a process depicting alternate implementations of an identifying services operation 502, according to one or more embodiments.

Referring now to FIG. 6C, operation 626 may include operation 632 depicting identifying one or more services configured to be provided to a user of the device, said identifying at least partly based on data stored on the device to which a producer of one or more applications configured to be executed by the device has limited or no access. For example, FIG. 2, e.g., FIG. 2B, shows identifying one or more services configured to carry out at least one task for a device, the identifying at least partly based on device data to which access is restricted from a device application producer module 232 identifying one or more services (e.g., a service that shows a route through Washington, D.C., that avoids all roundabouts), said identifying at least partly based on data stored on the device (e.g., an in-car driving assistant) to which a producer of one or more applications (e.g., a music playing application) configured to be executed by the device has limited or no access (e.g., the device may keep the music playing application from accessing its stored routing information).

Referring again to FIG. 6C, operation 632 may include operation 634 depicting identifying one or more services configured to be provided to a user of the device, said identifying at least partly based on data stored on the device to which a producer of an operating system configured to be executed by the device has limited or no access. For example, FIG. 2, e.g., FIG. 2B, shows identifying one or more services, the identifying at least partly based on device data to which access is restricted from a device operating system producer module 234 identifying one or more services (e.g., a service that shows which bars in a particular neighborhood have the highest ratio of women to men) configured to be provided to a user of a device (e.g., a smartphone device), said identifying at least partly based on data stored on the device (e.g., data posted to social networking services indicating whether the user is single, married, or other) to which a producer of an operating system (e.g., Google, the producer of the Android operating system) configured to be executed by the device (e.g., the smartphone) has limited or no access.

Referring again to FIG. 6C, operation 502 may include operation 636 depicting selecting a service, from one or more available services, said selected service configured to be provided to a user of a device, said selecting at least partly based on data regarding one or more properties of the device. For example, FIG. 2, e.g., FIG. 2C, shows identifying one or more services configured to carry out at least one task for a device, the identifying at least partly based on device property data module 236 selecting a service (e.g., a seat-picking on an airplane service), from one or more available services, said selected service configured to be provided to a user of a device (e.g., a computer device), said selecting at least partly based on one or more properties of the device (e.g., the device has a web browser opened that is pointed to an airline-ticket finding web page).

Referring again to FIG. 6C, operation 636 may include operation 638 depicting selecting a service, from one or more available services collected from one or more service providers, said selected service configured to be provided to a user of a device, said selecting at least partly based on data regarding one or more properties of the device. For example, FIG. 2, e.g., FIG. 2C, shows identifying one or more services from one or more service provider provided available services configured to carry out at least one task for a device, the identifying at least partly based on device property data module 238 selecting a service (e.g., selecting a bicycling service), from one or more available services (e.g., a bicycling service, a fuel-consumption service, a car-tire-selecting service, and the like), collected from one or more service providers (e.g., an exercise service provider and a gasoline company provider), said selected service (e.g., a bicycling service) configured to be provided to a user of a device (e.g., a smartphone), said selecting at least partly based on data regarding one or more properties of the device (e.g., the device is designed to be strapped to a bicycle crossbar).

Referring again to FIG. 6C, operation 638 may include operation 640 depicting selecting a service, from one or more available services collected from two or more discrete service providers, said selected service configured to be provided to a user of a device, said selecting at least partly based on data regarding one or more properties of the device. For example, FIG. 2, e.g., FIG. 2C, shows identifying one or more services (e.g., a fluid drinking guidance service from two or more available services provided by two or more discrete service providers, said one or more services (e.g., a fluid drinking guidance service for long bicycle rides), and a traffic configured to carry out at least one task for a device, the identifying at least partly based on device property data module 240 selecting a service, from one or more available services collected from two or more discrete service providers, said selected service configured to be provided to a user of a device (e.g., a smartphone device), said selecting at least partly based on data regarding one or more properties of the device (e.g., data indicating that the device spends more than one hour a day traveling at speeds that indicate that the device is being transported by bicycling).

Referring again to FIG. 6C, operation 640 may include operation 642 depicting selecting a service, from one or more available services collected from a plurality of discrete service providers, said selected service configured to be provided to a user of a device, said selecting at least partly based on data regarding one or more properties of the device and at least partly based on one or more properties of one or more of the plurality of discrete service providers. For example, FIG. 2, e.g., FIG. 2C, shows identifying one or more services from two or more available services provided by two or more discrete service providers, said one or more services configured to carry out at least one task for a device, the identifying at least partly based on device property data and partly based on one or more service provider properties module 242 selecting a service (e.g., a coffee shop comparison service) from one or more available services (e.g., five different coffee-shop comparison services, but one requires a barometer to determine which coffee shop is located in an area having the best weather conditions to maintain bagel freshness) collected from a plurality of discrete service providers (e.g., Starbucks coffee company might provide one, and Tully's coffee shops might provide one, Dunkin' Donuts may provide a service, and AT&T Communications), said selected service configured to be provided to a user of a device said selecting at least partly based on data regarding one or more properties of the device and at least partly based on one or more properties of one or more of the plurality of discrete service providers (e.g., Starbucks, because they are the only provider that makes coffee beans, or AT&T because they are the only telecommunications provider).

Figure 6D:
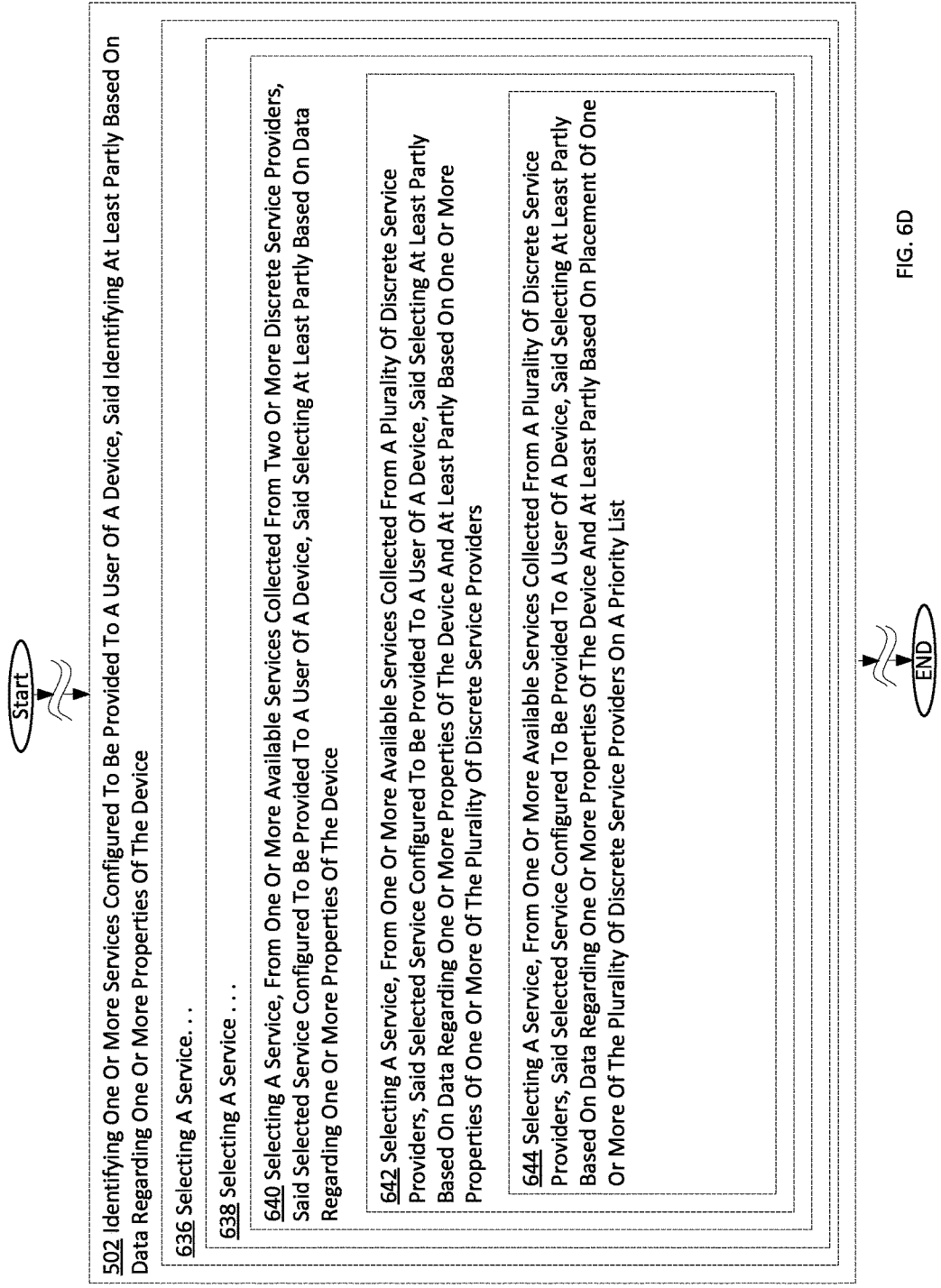
FIG. 6D is a high-level logic flow chart of a process depicting alternate implementations of an identifying services operation 502, according to one or more embodiments.

Referring now to FIG. 6D, operation 642 may include operation 644 depicting selecting a service, from one or more available services collected from a plurality of discrete service providers, said selected service configured to be provided to a user of a device, said selecting at least partly based on data regarding one or more properties of the device and at least partly based on placement of one or more of the plurality of discrete service providers on a priority list. For example, FIG. 2, e.g., FIG. 2C, shows identifying one or more services from two or more available services provided by two or more discrete service providers, said one or more services configured to carry out at least one task for a device, the identifying at least partly based on device property data and partly based on service provider priority list placement module 244 selecting a service, from one or more available services collected from a plurality of discrete service providers, said selected service configured to be provided to a user of a device, said selecting at least partly based on data regarding one or more properties of the device and at least partly based on placement of one or more of the plurality of discrete service providers on a priority list (e.g., service providers may pay, or prove themselves worthy, of a particular spot on a list, and thus be selected in that order; in some embodiments, a selection from the list may change the rank on the list (e.g., a service provider that is selected may drop to the bottom or the near bottom so that someone else is selected the next time).

Figure 6E:
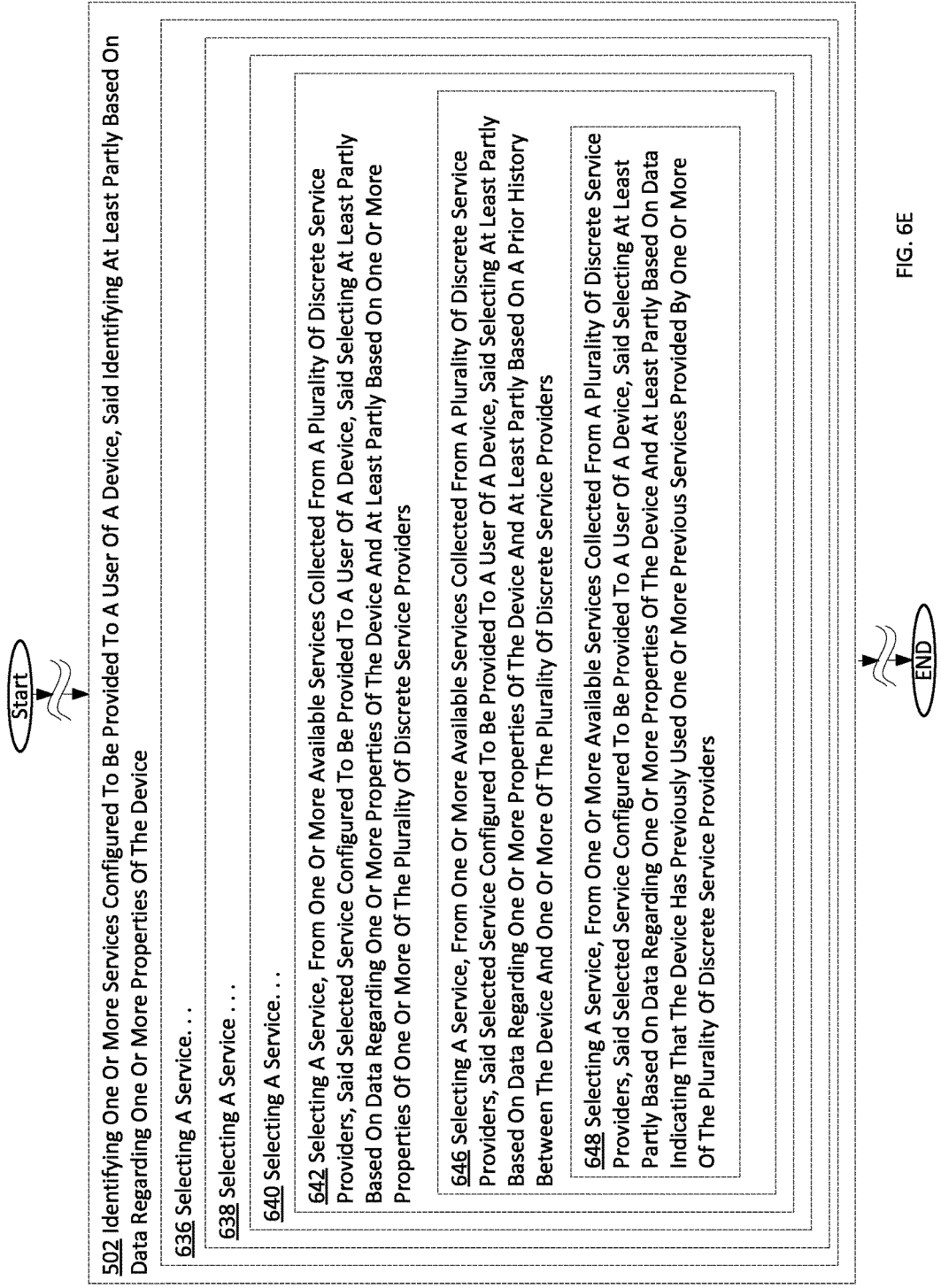
FIG. 6E is a high-level logic flow chart of a process depicting alternate implementations of an identifying services operation 502, according to one or more embodiments.

Referring now to FIG. 6E, operation 642 may include operation 646 depicting selecting a service, from one or more available services collected from a plurality of discrete service providers, said selected service configured to be provided to a user of a device, said selecting at least partly based on data regarding one or more properties of the device and at least partly based on a prior history between the device and one or more of the plurality of discrete service providers. For example, FIG. 2, e.g., FIG. 2C, shows identifying one or more services from two or more available services provided by two or more discrete service providers, said one or more services configured to carry out at least one task for a device, the identifying at least partly based on device property data and partly based on service provider history with device module 246 selecting a service, from one or more available services collected from a plurality of discrete service providers, said selected service configured to be provided to a user of a device, said selecting at least partly based on data regarding one or more properties of the device and at least partly based on a prior history between the device and one or more of the plurality of discrete service providers (e.g., one of the service providers may previously have provided a service to the user, and the user may have ranked that service very low, so that service provider is less likely to be selected to provide a different service).

Referring again to FIG. 6E, operation 646 may include operation 648 depicting selecting a service, from one or more available services collected from a plurality of discrete service providers, said selected service configured to be provided to a user of a device, said selecting at least partly based on data regarding one or more properties of the device and at least partly based on data indicating that the device has previously used one or more previous services provided by one or more of the plurality of discrete service providers. For example, FIG. 2, e.g., FIG. 2C, shows identifying one or more services from two or more available services provided by two or more discrete service providers, said one or more services configured to carry out at least one task for a device, the identifying at least partly based on device property data and partly based on service provider previously providing service to device module 248 selecting a service, from one or more available services collected from a plurality of discrete service providers, said selected service configured to be provided to a user of a device, said selecting at least partly based on data regarding one or more properties of the device and at least partly based on data indicating that the device has previously used one or more previous services provided by one or more of the plurality of discrete service providers (e.g., Google may provide a map service and an email service, and if the device has previously used the map service, then that may add in priority for selection of Google to also provide the email service, particularly if the user has used the map service on different occasions, e.g., indicating that the user is satisfied with the map service).

Figure 6F:
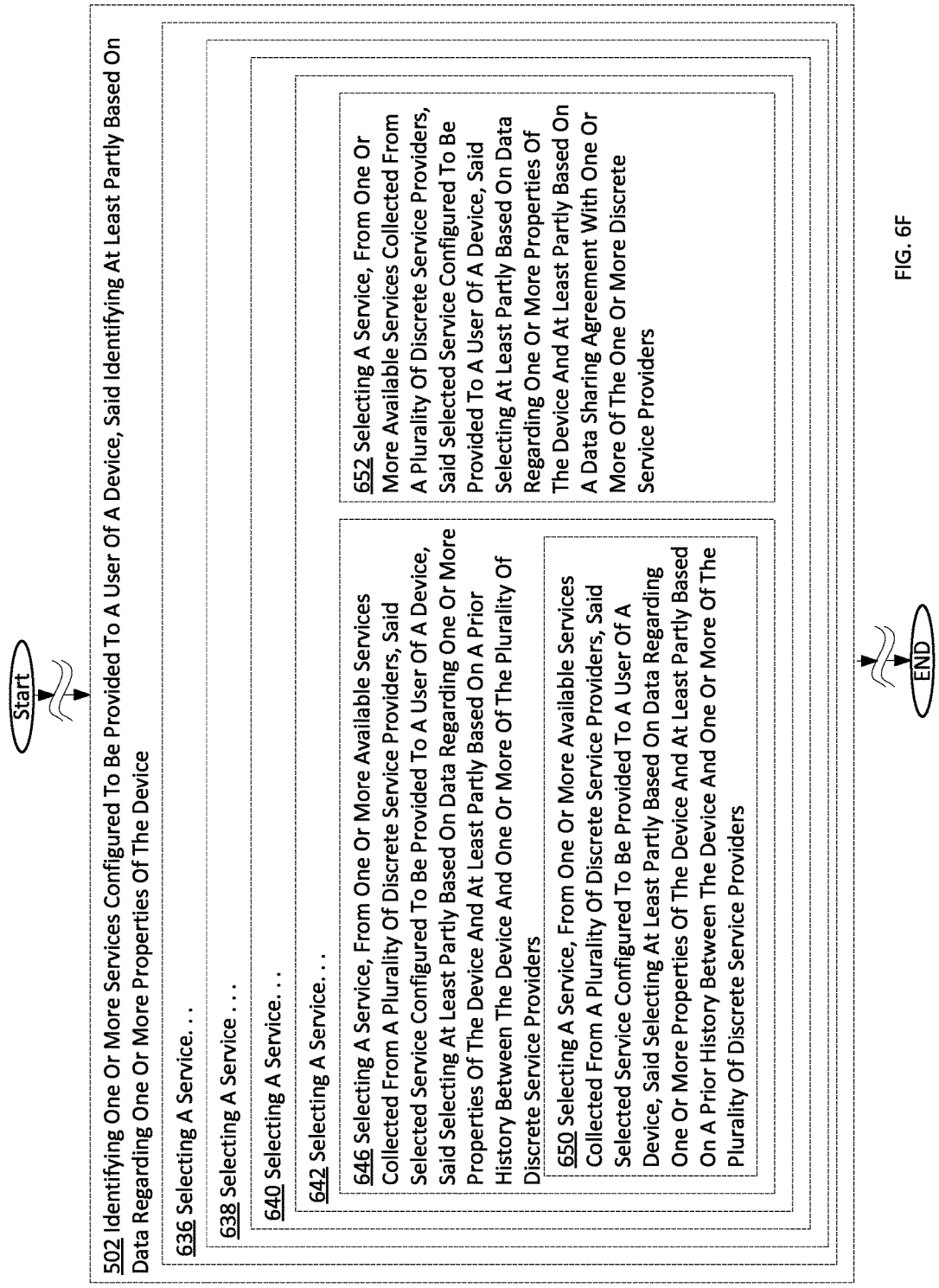
FIG. 6F is a high-level logic flow chart of a process depicting alternate implementations of an identifying services operation 502, according to one or more embodiments.

Referring now to FIG. 6F, operation 646 may include operation 650 depicting selecting a service, from one or more available services collected from a plurality of discrete service providers, said selected service configured to be provided to a user of a device, said selecting at least partly based on data regarding one or more properties of the device and at least partly based on data indicating that one or more devices having a characteristic in common with the device have previously used one or more previous services provided by one or more of the plurality of discrete service providers. For example, FIG. 2, e.g., FIG. 2D, shows identifying one or more services from two or more available services provided by two or more discrete service providers, said one or more services configured to carry out at least one task for a device, the identifying at least partly based on device property data and partly based on the service provider providing the one or more identified services to a different device having a common characteristic with the device module 250 selecting a service, from one or more available services collected from a plurality of discrete service providers, said selected service configured to be provided to a user of a device, said selecting at least partly based on data regarding one or more properties of the device and at least partly based on data indicating that one or more devices having a characteristic in common with the device have previously used one or more previous services provided by one or more of the plurality of discrete service providers (e.g., if the service to be provided is a mapping service, then devices with the same type of positioning sensor that have previously used the service may increase that service's chances of being identified; or, in another embodiment, if the service to be provided is a mapping service and the device is located in Seattle, then other mapping services that have previously worked well for users located in Seattle may be more likely to be identified).

Referring again to FIG. 6F, operation 642 may include operation 652 depicting selecting a service, from one or more available services collected from a plurality of discrete service providers, said selected service configured to be provided to a user of a device, said selecting at least partly based on data regarding one or more properties of the device and at least partly based on a data sharing agreement with one or more of the one or more discrete service providers. For example, FIG. 2, e.g., FIG. 2D, shows identifying one or more services from two or more available services provided by two or more discrete service providers, said one or more services configured to carry out at least one task for a device, the identifying at least partly based on device property data and partly based on service provider data sharing agreement module 252 selecting a service, from one or more available services collected from a plurality of discrete service providers, said selected service configured to be provided to a user of a device, said selecting at least partly based on data regarding one or more properties of the device and at least partly based on a data sharing agreement with one or more of the one or more discrete service providers (e.g., if the identifying entity has a data sharing agreement with a service provider that allows the identifying entity to have access to the data collected by the service installed on the user's device, then this may make that service provider's service more likely to be selected).

Figure 6G:
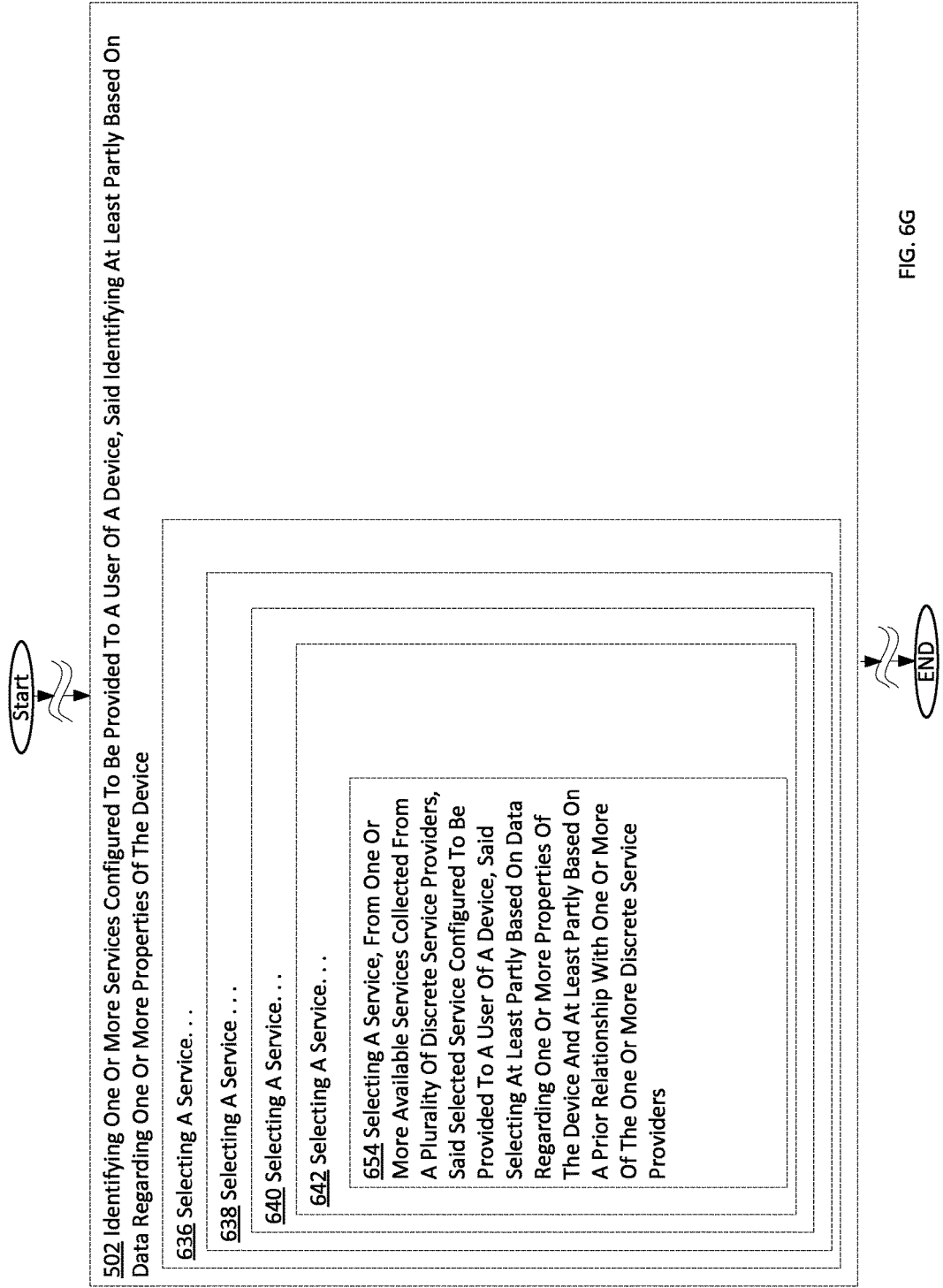
FIG. 6G is a high-level logic flow chart of a process depicting alternate implementations of an identifying services operation 502, according to one or more embodiments.

Referring now to FIG. 6G, operation 642 may include operation 654 depicting selecting a service, from one or more available services collected from a plurality of discrete service providers, said selected service configured to be provided to a user of a device, said selecting at least partly based on data regarding one or more properties of the device and at least partly based on a prior relationship with one or more of the one or more discrete service providers. For example, FIG. 2, e.g., FIG. 2E, shows identifying one or more services from two or more available services provided by two or more discrete service providers, said one or more services configured to carry out at least one task for a device, the identifying at least partly based on device property data and partly based on service provider prior contract module 254 selecting a service, from one or more available services collected from a plurality of discrete service providers, said selected service configured to be provided to a user of a device, said selecting at least partly based on data regarding one or more properties of the device and at least partly based on a prior relationship with one or more of the one or more discrete service providers (e.g., previously, the selecting entity may have successfully used the service provider's applications and/or services and been satisfied with them, which may lead to selection of that service provider's services).

Figure 6H:
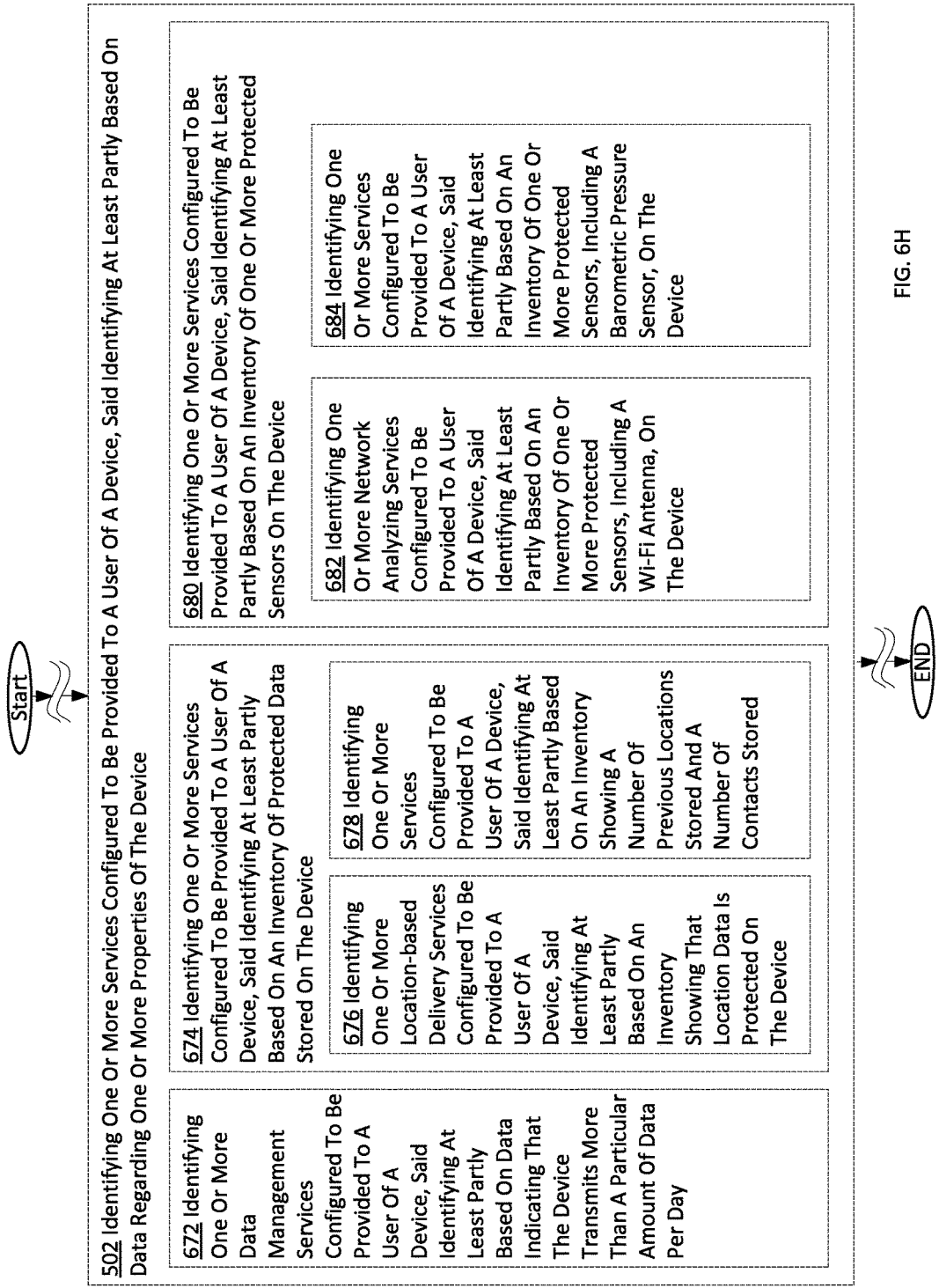
FIG. 6H is a high-level logic flow chart of a process depicting alternate implementations of an identifying services operation 502, according to one or more embodiments.

Referring now to FIG. 6H, operation 502 may include operation 656 depicting identifying one or more services configured to be provided to a user of a device, said identifying at least partly based on data regarding one or more usage properties of the device. For example, FIG. 2, e.g., FIG. 2F, shows identifying one or more services configured to carry out at least one task for a device, the identifying at least partly based on device usage information data module 256 identifying one or more services (e.g., a soda pop vending machine inventory displaying service) be provided to a user of a device (e.g., a user's smart phone), said identifying at least partly based on data regarding one or more usage properties (e.g., the user uses a credit card transaction application installed on the device to buy a lot of sodas) of the device.

Referring again to FIG. 6H, operation 656 may include operation 658 depicting identifying one or more services configured to be provided to a user of a device, said identifying at least partly based on data including one or more locations at which the device is present. For example, FIG. 2, e.g., FIG. 2F, shows identifying one or more services configured to carry out at least one task for a device, the identifying at least partly based on device position history information module 258 identifying one or more services (e.g., identifying which grocery store has the freshest inventory of blackberries) configured to be provided to a user of a device (e.g., a home shopping program running on a home computer), said identifying at least partly based on data including one or more locations (e.g., a house) at which the device (e.g., the home computer) is present.

Referring again to FIG. 6H, operation 658 may include operation 660 depicting identifying one or more calorie counting services configured to be provided to a user of a device, said identifying at least partly based on data including one or more restaurants at which the device is present. For example, FIG. 2, e.g., FIG. 2F, shows identifying a caloric intake service configured to carry out at least one task for a device, the identifying at least partly based on device position history information module 660 identifying one or more calorie counting services configured to be provided to a user of a device (e.g., a watch that can load programs and take measurements designed to improve workout efficiency), said identifying at least partly based on data including one or more restaurants at which the device is present (e.g., which may be based on location data, which may be the result of reading a GPS sensor, or triangulating position data).

Referring again to FIG. 6H, operation 656 may include operation 662 depicting identifying one or more services configured to be provided to a user of a device, said identifying at least partly based on data including one or more applications operating on the device. For example, FIG. 2, e.g., FIG. 2F, shows identifying one or more services configured to carry out at least one task for a device, the identifying at least partly based on device application usage information data module 262 identifying one or more services (e.g., activity planning, e.g., scheduling a sports game based on people's calendars service) configured to be provided to a user of the device, said identifying at least partly based on data including one or more applications operating on the device (e.g., a calendar application).

Referring again to FIG. 6H, operation 656 may include operation 664 depicting identifying one or more services configured to be provided to a user of a device, said identifying at least partly based on data regarding one or more web pages downloaded on the device. For example, FIG. 2, e.g., FIG. 2F, shows identifying one or more services configured to carry out at least one task for a device, the identifying at least partly based on device web browsing information data module 264 identifying one or more services (e.g., a new restaurant finding service) configured to be provided to a user of the device (e.g., a user's smartphone), said identifying at least partly based on data regarding one or more web pages (e.g., web pages showing searches done for new restaurants and visits to restaurant review web sites) downloaded (e.g., retrieved at the request of the user) on the device.

Referring again to FIG. 6H, operation 664 may include operation 666 depicting identifying one or more personal finance management services configured to be provided to a user of a device, said identifying at least partly based on data indicating that bank account websites are downloaded three or more times a day, for at least two days. For example, FIG. 2, e.g., FIG. 2F, shows identifying one or more services configured to carry out at least one task for a device, the identifying at least partly based on device web browsing information indicating three or more downloads a day from bank account websites data module 266 identifying one or more personal finance management services configured to be provided to a user of a device (e.g., a home personal computer user), said identifying at least partly based on data indicating that bank account websites are downloaded three or more times a day for at least two days.

Referring again to FIG. 6H, operation 656 may include operation 668 depicting identifying one or more services configured to be provided to a user of a device, said identifying at least partly based on data including one or more types of applications operating on the device for longer than a particular time. For example, FIG. 2, e.g., FIG. 2F, shows identifying one or more services configured to carry out at least one task for a device, the identifying at least partly based on particular application usage time amount data module 268 identifying one or more services (e.g., game services, e.g., offering services that will result in purchasing a new weapon or other in-game item for a game) to be provided to a user of a device (e.g., a game system, e.g., a Sony Play Station Portable "PSP"), said identifying at least partly based on data including one or more types of applications (e.g., games that are first person shooters or role-playing games) operating on the device for longer than a particular time (e.g., after ten hours, a user may be getting bored, so this service allows him to earn a new weapon or other in-game item).

Referring again to FIG. 6H, operation 668 may include operation 670 depicting identifying one or more game playing services configured to be provided to a user of a device, said identifying at least partly based on data indicating that game applications are operating on the device for greater than fifty percent of the time that the device is active. For example, FIG. 2, e.g., FIG. 2F, shows identifying one or more game playing services configured to carry out at least one task for a device, the identifying at least partly based on particular game usage time amount greater than a particular amount module 270 identifying one or more game playing services (e.g., a new game finder) configured to be provided to a user of a device (e.g., a user of a smartphone that can do other things besides play games), said identifying at least partly based on data indicating that game applications are operating on the device for greater than fifty percent of the time that the device is active).

Referring now to FIG. 6I, operation 502 may include operation 672 depicting identifying one or more data management services configured to be provided to a user of a device, said identifying at least partly based on data indicating that the device transmits more than a particular amount of data per day. For example, FIG. 2, e.g., FIG. 2G, shows identifying one or more services configured to carry out at least one task for a device, the identifying at least partly based on device data transmission amount module 272 identifying one or more data management services (e.g., picture organizing services) configured to be provided to a user of a device (e.g., a smartphone with a camera, or other digital camera), said identifying at least partly based on data indicating that the device transmits more than a particular amount of data (e.g., more than 500 MB) of data per day).

Referring again to FIG. 6I, operation 502 may include operation 674 depicting identifying one or more services configured to be provided to a user of a device, said identifying at least partly based on an inventory of protected data stored on the device. For example, FIG. 2, e.g., FIG. 2G, shows identifying one or more services configured to carry out at least one task for a device, the identifying at least partly based on restricted device data inventory module 274 identifying one or more services (e.g., a bandwidth regulator that changes when non-priority information is uploaded or downloaded based on available bandwidth) configured to be provided to a user of a device (e.g., an ultraportable laptop computer, e.g., a netbook), said identifying at least partly based on an inventory of protected data (e.g., an inventory of what types of data are prevented from access by unauthorized entities) stored on the device (e.g., stored in the device memory, or stored in a remote location to which the device can read and write).

Referring again to FIG. 6I, operation 674 may include operation 676 depicting identifying one or more location-based delivery services configured to be provided to a user of a device, said identifying at least partly based on an inventory showing that location data is protected on the device. For example, FIG. 2, e.g., FIG. 2G, shows identifying one or more services configured to carry out at least one task for a device, the identifying at least partly based on restricted device data inventory indicating restricted position data module 276 identifying one or more location-based delivery services configured to be provided to a user of a device (e.g., a smartphone), said identifying at least partly based on an inventory showing that location data is protected (e.g., unauthorized users must receive authorization prior to accessing) on the device.

Referring again to FIG. 6I, operation 674 may include operation 678 depicting identifying one or more services configured to be provided to a user of a device, said identifying at least partly based on an inventory showing a number of previous locations stored and a number of contacts stored. For example, FIG. 2, e.g., FIG. 2G, shows identifying one or more services configured to carry out at least one task for a device, the identifying at least partly based on restricted device data inventory indicating a number of stored previous locations and a number of stored previous contacts module 278 identifying one or more services (e.g., a service to show when the device user's friends are arriving at various locations) configured to be provided to a user of a device (e.g., a smartphone, e.g., an HTC Evo phone), said identifying at least partly based on an inventory showing a number of previous locations stored and a number of contacts stored (e.g., in the contact list of the device).

Referring again to FIG. 6I, operation 502 may include operation 680 depicting identifying one or more services configured to be provided to a user of the device, said identifying at least partly based on an inventory of one or more protected sensors on the device. For example, FIG. 2, e.g., FIG. 2G, shows identifying one or more services configured to carry out at least one task for a device, the identifying at least partly based on restricted device sensor module 280 identifying one or more services (e.g., displaying a rule book for a sport or game being played in the proximity of the device) configured to be provided to a user of the device (e.g., a user of a tablet device, e.g., a Microsoft Surface).

Referring again to FIG. 6I, operation 680 may include operation 682 depicting identifying one or more network analyzing services configured to be provided to a user of the device, said identifying at least partly based on an inventory of one or more protected sensors, including a Wi-Fi antenna, on the device. For example, FIG. 2, e.g., FIG. 2G, shows identifying one or more data traffic analysis services configured to carry out at least one task for a device the identifying at least partly based on a restricted data radio module 282 identifying one or more network analyzing services configured to be provided to a user of a device (e.g., a portable hotspot), said identifying at least partly based on an inventory of one or more protected sensors, including a Wi-Fi antenna, on the device.

Referring again to FIG. 6I, operation 680 may include operation 684 depicting identifying one or more services configured to be provided to a user of the device, said identifying at least partly based on an inventory of one or more protected sensors, including a barometric pressure sensor, on the device. For example, FIG. 2, e.g., FIG. 2G, shows identifying one or more weather analysis services configured to carry out at least one task for a device, the identifying at least partly based on a restricted barometric pressure sensor module 284 identifying one or more services (e.g., an ideal garden planting time calculating service) configured to be provided to a user of a device (e.g., a home weather/garden device mounted in a user's house), said identifying at least partly based on an inventory of one or more protected sensors, including a barometric pressure sensor, on the device.

Referring now to FIG. 8J, operation 502 may include operation 686 depicting identifying a service configured to identify when one or more entities listed in the device's contact list are within a particular proximity to the user of the device, said identifying at least partly based on data regarding one or more properties of the device. For example, FIG. 2, e.g., FIG. 2G, shows identifying one or more alert services configured to alert when one or more devices controlled by a person in the device contact list is within a particular proximity to the device, the identifying at least partly based on device data module 244 identifying a service configured to identify when one or more entities (e.g., people, house phones, businesses) listed in the device's contact list are within a particular proximity (e.g., either through their movement, if possible, or through the user's movement, or both) to the user of the device (e.g., the user's smartphone), said identifying at least partly based on data regarding one or more properties of the device (e.g., identifying that the device has stored more than twenty-five contacts for whom it can be determined through checking the contacts' publically-available Facebook status, are listed as "single").

Figure 7A:
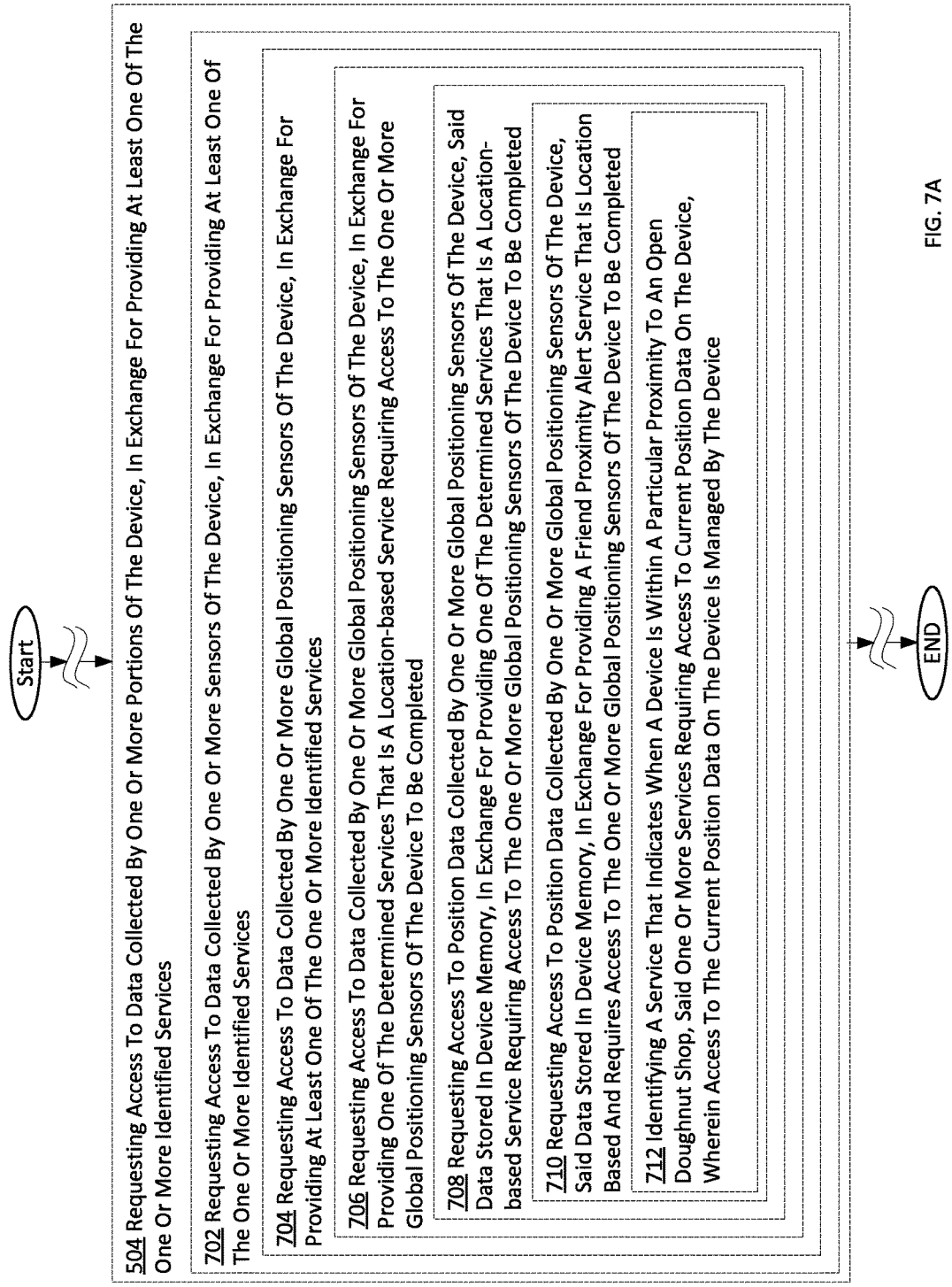
FIG. 7A is a high-level logic flow chart of a process depicting alternate implementations of a data access requesting operation 504, according to one or more embodiments.

FIGS. 7A-7E depict various implementations of operation 504, depicting requesting access to data collected by one or more portions of the device, in exchange for providing at least a portion of one of the one or more identified services, according to embodiments. Referring now to FIG. 7A, operation 504 may include operation 702 depicting requesting access to data collected by one or more sensors of the device, in exchange for providing at least one of the one or more identified services. For example, FIG. 3, e.g., FIG. 3A, shows access to data acquired by one or more device sensors as negotiated result of facilitating a providing of one or more identified services requesting module 302 requesting access to data collected by one or more sensors of the device (e.g., a barometric pressure sensor), in exchange for providing at least one of the one or more identified services (e.g., a service that estimates how much time until it starts raining).

Referring again to FIG. 7A, operation 702 may include operation 704 depicting requesting access to data collected by one or more global positioning sensors of the device, in exchange for providing at least one of the one or more identified services. For example, FIG. 3, e.g., FIG. 3A, shows access to data acquired by one or more device positioning sensors as negotiated result of facilitating a providing of one or more identified services requesting module 304 requesting access to data collected by one or more global positioning sensors of the device, in exchange for providing at least one of the one or more identified services (e.g., a service showing the user a list of the nearest automated teller machine devices ("ATMs") and what the service fee for each of the ATMs is).

Referring again to FIG. 7A, operation 704 may include operation 706 depicting requesting access to data collected by one or more global positioning sensors of the device, in exchange for providing one of the determined services that is a location-based service requiring access to the one or more global positioning sensors of the device to be completed. For example, FIG. 3, e.g., FIG. 3A shows access to data acquired by one or more device positioning sensors as negotiated result of facilitating a providing of an identified position-based service requiring access to the data acquired by the one or more device positioning sensors requesting module 306 requesting access to data collected by one or more global positioning sensors of the device (e.g., a user's smartphone), in exchange for providing one of the determined services that is a location based service (e.g., giving the user of the device directions to the nearest public bathroom and information regarding its rating by other users) requiring access to the one or more global positioning sensors of the device to be completed.

Referring again to FIG. 7A, operation 706 may include operation 708 depicting requesting access to position data collected by one or more global positioning sensors of the device, said data stored in device memory, in exchange for providing one of the determined services that is a location-based service requiring access to the one or more global positioning sensors of the device to be completed. For example, FIG. 3, e.g., FIG. 3A shows access to position data acquired by one or more device positioning sensors and stored on the device as negotiated result of facilitating a providing of an identified position-based service requiring access to the data acquired by the one or more device positioning sensors requesting module 308 requesting access to position data collected by one or more global positioning sensors of the device (e.g., a tablet device, e.g., a Google Nexus 7), said data stored in device memory, in exchange for providing one of the determined services (e.g., mapping the population density in the vicinity of the user of the device) requiring access to the one or more global positioning sensors of the device to be completed (e.g., even though the application could make a guess about the location, without access to the GPS sensor, then the service cannot be completed because the location of the device cannot be accurately determined).

Referring again to FIG. 7A, operation 708 may include operation 710 depicting requesting access to position data collected by one or more global positioning sensors of the device, said data stored in device memory, in exchange for providing a friend proximity alert service that is location based and requires access to the one or more global positioning sensors of the device to be completed. For example, FIG. 3, e.g., FIG. 3A, shows access to position data acquired by one or more device positioning sensors and stored on the device as negotiated result of facilitating a providing of an identified entity proximity alarm based service requiring access to the data acquired by the one or more device positioning sensors requesting module 310 requesting access to position data collected by one or more global positioning sensors of the device (e.g., a smartphone, e.g., an HTC Evo), said data stored in device memory, in exchange for providing a friend proximity alert service that is location based and requires access to the one or more global positioning sensors of the device (e.g., without this information, the service cannot be carried out) to be completed.

Referring again to FIG. 7A, operation 708 may include operation 712 depicting requesting access to position data collected by one or more positioning sensors of the device, said data stored in device memory, in exchange for transmitting, to the device, a friend proximity alert service that is location based and requires access to the one or more global positioning sensors of the device to be completed. For example, FIG. 3, e.g., FIG. 3A, shows access to position data acquired by one or more device positioning sensors and stored on the device as negotiated result of transmitting, to the device, an identified entity proximity alarm based service requiring access to the data acquired by the one or more device positioning sensors requesting module 312 requesting access to position data collected by one or more positioning sensors of the device (e.g., a smartphone, e.g., an Apple iPhone), said data stored in device memory, in exchange for transmitting, to the device, a friend proximity alert service (e.g., an application that is configured to transmit and receive the data needed to carry out the service, and to deliver the results and/or process the received data into results) that is location based and requires access to the one or more global positioning sensors of the device to be completed (e.g., without the position information, it cannot accurately determine which "friends" of the device are within proximity).

Figure 7B:
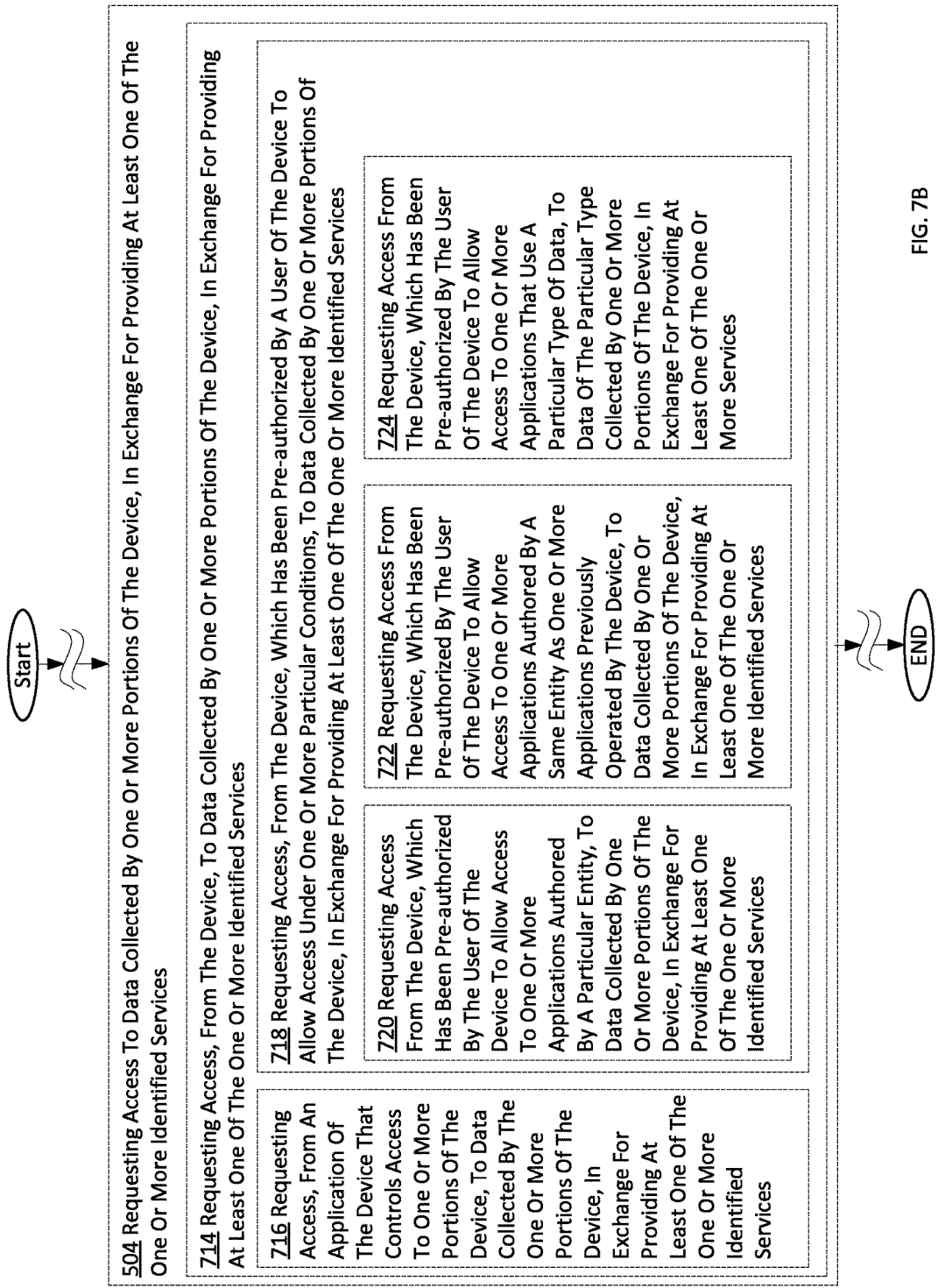
FIG. 7B is a high-level logic flow chart of a process depicting alternate implementations of a data access requesting operation 504, according to one or more embodiments.

Referring now to FIG. 7B, operation 504 may include operation 714 depicting requesting access, from the device, to data collected by one or more portions of the device, in exchange for providing at least one of the one or more identified services. For example, FIG. 3, e.g., FIG. 3B, shows access to data acquired by the device as negotiated result of facilitating a providing of one or more identified services requesting from the device module 314 requesting access (e.g., the ability to read, write, modify, transmit, alter, process, or otherwise obtain), from the device (e.g., a smartphone, e.g., a Nokia Lumia Windows Phone), to data collected by one or more portions of the device (e.g., a contact list, or a list of applications that have been downloaded, or a memorandum drafted by the user and stored on the device) in exchange for providing at least one of the one or more identified services (e.g., a "red zone" alert that alerts the user when her favorite football team is about to score a touchdown).

Referring again to FIG. 7B, operation 714 may include operation 716 depicting requesting access, from an application of the device that controls access to one or more portions of the device, to data collected by the one or more portions of the device, in exchange for providing at least one of the one or more identified services. For example, FIG. 3, e.g., FIG. 3B, shows access to data acquired by the device as negotiated result of facilitating a providing of one or more identified services requesting from an access control application of the device module 316 requesting access, from an application of the device that controls access to one or more portions of the device (e.g., a device operating system, e.g., Windows 8 running on a Windows Surface tablet), to data collected by the one or more portions of the device (e.g., twitter messages typed in through the keyboard and/or transmitted via the wireless radio), in exchange for providing at least one of the one or more identified services (e.g., "enhanced twitter" which corrects twitter messages typed by the user and adds hash tags and keywords which will increase visibility).

Referring again to FIG. 7B, operation 714 may include operation 718 depicting requesting access, from the device, which has been pre-authorized by a user of the device to allow access under one or more particular conditions, to data collected by one or more portions of the device, in exchange for providing at least one of the one or more identified services. For example, FIG. 3, e.g., FIG. 3B, shows access to data acquired by the device as negotiated result of facilitating a providing of one or more identified services requesting from the device that has user preauthorization to grant or deny access module 318 requesting access, from the device (e.g., a smartphone, e.g., a Blackberry 8800), which has been pre-authorized by a user of the device (e.g., the user has said "allow all Google-based applications") to allow access under one or more particular conditions (e.g., the service is authored or approved by Google), to data collected by one or more portions of the device (e.g., position data gathered from the positioning sensor), in exchange for providing at least one of the one or more identified services (e.g., context-based search engine services).

Referring again to FIG. 7B, operation 718 may include operation 720 depicting requesting access from the device, which has been pre-authorized by the user of the device to allow access to one or more applications authored by a particular entity, to data collected by one or more portions of the device, in exchange for providing at least one of the one or more identified services. For example, FIG. 3, e.g., FIG. 3B, shows access to data acquired by the device as negotiated result of facilitating a providing of one or more identified services requesting from the device that has user preauthorization to grant or deny access according to a service application author identity module 320 requesting access from the device (e.g., a Microsoft Surface tablet device), which has been pre-authorized by the user of the device to allow access to one or more applications (e.g., Microsoft Word and Microsoft Excel, a word-processing program and a spreadsheet processing program, respectively) authored by a particular entity (e.g., Microsoft), to data collected by one or more portions of the device (e.g., bank statements downloaded from the user's bank onto the device), in exchange for providing at least one of the one or more identified services (e.g., using Excel to deliver balanced personal budget services).

Referring again to FIG. 7B, operation 718 may include operation 722 depicting requesting access from the device, which has been pre-authorized by the user of the device to allow access to one or more applications authored by a same entity as one or more applications previously operated by the device, to data collected by one or more portions of the device, in exchange for providing at least one of the one or more identified services. For example. FIG. 3, e.g., FIG. 3B, shows access to data acquired by the device as negotiated result of facilitating a providing of one or more identified services requesting from the device that has user preauthorization to grant access to one or more applications having a common author entity as one or more applications previously operated by the device module 322 requesting access from the device, which has been pre-authorized by the user of the device (e.g., a portable gaming system) to allow access to one or more applications (e.g., a new game) authored by a same entity (e.g., a game application authoring company, e.g., Zynga) as one or more applications previously operated by the device (e.g., the device previously operated one or more applications by Zynga), in exchange for providing at least one of the one or more identified services (e.g., showing the device's friends from the contact list and their high scores of the game, while playing the game).

Referring again to FIG. 7B, operation 718 may include operation 724 depicting requesting access from the device, which has been pre-authorized by the user of the device to allow access to one or more applications that use a particular type of data, to data of the particular type collected by one or more portions of the device, in exchange for providing at least one of the one or more services. For example, FIG. 3, e.g., FIG. 3B, shows requesting access from the device (e.g., a networked computer on an enterprise corporate environment), which has been pre-authorized by the user of the device (e.g., the networked computer) to allow access to one or more applications that use a particular type of data (e.g., an application that can take data from a work environment and run simulations and projections on the data), to data of the particular type (e.g., data from a particular project that the user is working on, e.g., Project A), collected by one or more portions of the device (e.g., received, from the network, over a cable), in exchange for providing at least one of the one or more services (e.g., running a simulation with the data compared to real-world events).

Figure 7C:
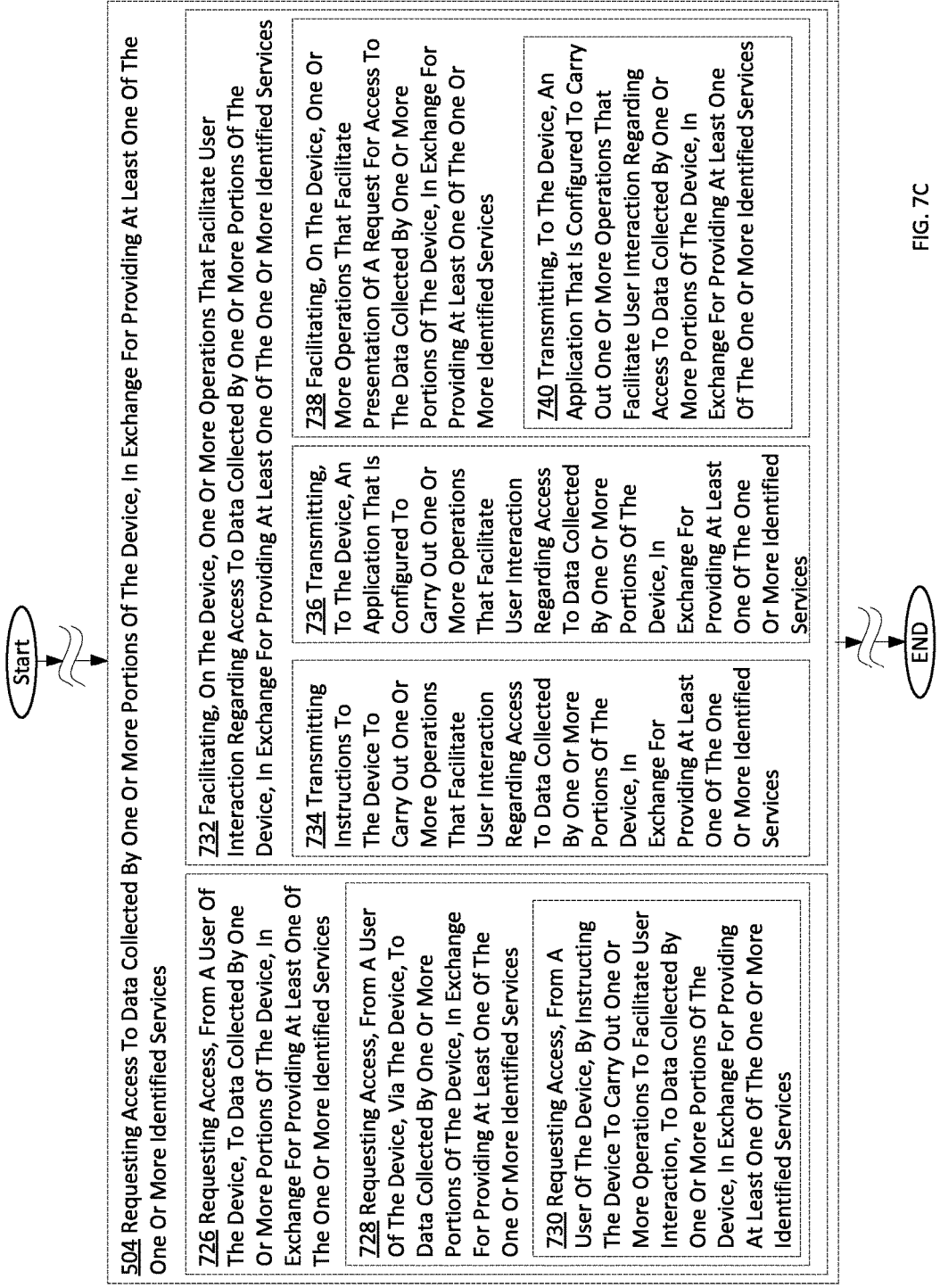
FIG. 7C is a high-level logic flow chart of a process depicting alternate implementations of a data access requesting operation 504, according to one or more embodiments.

Referring now to FIG. 7C, operation 504 may include operation 726 depicting requesting access, from a user of the device, to data collected by one or more portions of the device, in exchange for providing at least one of the one or more identified services. For example, FIG. 3, e.g., FIG. 3C, shows access to data acquired by the device as negotiated result of facilitating a providing of one or more identified services requesting from device operator module 326 requesting access, from a user of the device (e.g., a cellular telephone), to data collected by one or more portions of the device (e.g., temperature data collected by a device thermometer that plugs into an expansion port of the device), in exchange for providing at least one of the one or more identified services (e.g., a weather predicting service).

Referring again to FIG. 3C, operation 726 may include operation 728 depicting requesting access, from a user of the device, via the device, to data collected by one or more portions of the device, in exchange for providing at least one of the one or more identified services. For example, FIG. 3, e.g., FIG. 3C, shows access to data acquired by the device as negotiated result of facilitating a providing of one or more identified services requesting, via the device, from device operator module 328 requesting access, from a user of the device (e.g., a smartphone, e.g., a Palm Pre), via the device (e.g., using the device to communicate the request for access, either through the screen or through some other device output mechanism), to data collected by one or more portions of the device (e.g., a number of pictures in the picture album, but not the actual pictures themselves), in exchange for providing at least one of the one or more identified services (e.g., providing recommendations for hosting the user's picture album).

Referring again to FIG. 3C, operation 728 may include operation 730 depicting requesting access, from a user of the device, by instructing the device to carry out one or more operations to facilitate user interaction, to data collected by one or more portions of the device, in exchange for providing at least one of the one or more identified services. For example, FIG. 3, e.g., FIG. 3C, shows access to data acquired by the device as negotiated result of providing of one or more identified services requesting, by instructing device to carry out user interaction operations, from device operator module 330 requesting access, from a user of the device, by instructing the device to carry out one or more operations to facilitate user interaction (e.g., requesting that the device display a screen that says "would you grant access to your contact list in exchange for receiving information about potential new contacts in your home city"), to data collected by one or more portions of the device (e.g., the contact list of a smartphone), in exchange for providing at least one of the one or more identified services (e.g., using the contact list and known network information to see if any "friends of friends" are located in the device's current city).

Referring again to FIG. 3C, operation 504 may include operation 732 depicting facilitating, on the device, one or more operations that facilitate user interaction regarding access to data collected by one or more portions of the device, in exchange for providing at least one of the one or more identified services. For example, FIG. 3, e.g., FIG. 3C, shows facilitation of user interaction regarding access to data acquired by the device as negotiated result of facilitating a providing of one or more identified services requesting module 332 facilitating, on the device, one or more operations that facilitate user interaction (e.g., receiving speech from the user that authorizes release of one or more pictures stored on the device) regarding access to data collected by one or more portions of the device (e.g., pictures captured by an image capturing sensor of the device, e.g., a smartphone), in exchange for providing at least one of the one or more identified services (e.g., providing a "celebrity look-a-like" service for pictures as a party game).

Referring again to FIG. 7C, operation 732 may include operation 734 depicting transmitting instructions to the device to carry out one or more operations that facilitate user interaction regarding access to data collected by one or more portions of the device, in exchange for providing at least one of the one or more identified services. For example, FIG. 3, e.g., FIG. 3C, shows transmission of instructions to proceed with a user interaction regarding access to data acquired by the device as negotiated result of facilitating a providing of one or more identified services requesting module 334 transmitting instructions to the device to carry out one or more operations (e.g., displaying one or more screens, accepting speech or touchscreen interaction, and the like) that facilitate user interaction regarding access to data (e.g., position data collected by a device, e.g., a smartphone, positioning sensor) collected by one or more portions of the device (e.g., the GPS sensor of a Samsung smartphone), in exchange for providing at least one of the one or more identified services (e.g., showing which restaurants in the vicinity of the user's device are open past midnight).

Referring again to FIG. 7C, operation 732 may include operation 736 depicting transmitting, to the device, an application that is configured to carry out one or more operations that facilitate user interaction regarding access to data collected by one or more portions of the device, in exchange for providing at least one of the one or more identified services. For example, FIG. 3, e.g., FIG. 3C, shows transmission of an application that executes a user interaction regarding access to data acquired by the device as negotiated result of facilitating a providing of one or more identified services requesting module 336 transmitting, to the device (e.g., a smartphone, e.g., a Google phone), an application that is configured to carry out one or more operations (e.g., displaying a dialog box on the screen and accepting touch screen input) regarding access to data collected by one or more portions of the device (e.g., ambient light collected from a light sensor), in exchange for providing at least one of the one or more identified services (e.g., a service that lights up a smartphone notification light when conditions are right to take a picture).

Referring again to FIG. 7C, operation 732 may include operation 738 depicting facilitating, on the device, one or more operations that facilitate presentation of a request for access to the data collected by one or more portions of the device, in exchange for providing at least one of the one or more identified services. For example, FIG. 3, e.g., FIG. 3C, shows facilitation of presentation of request for access to data acquired by the device as negotiated result of facilitating a providing of one or more identified services requesting module 338 facilitating, on the device, one or more operations that facilitate presentation of a request for access to the data collected by one or more portions of the device (e.g., scheduled appointments entered using voice entry into a calendar of a smartphone), in exchange for providing at least one of the one or more identified services (e.g., a health management service that automatically schedules various appointments, e.g., eye appointments, physicals, dental appointments, haircuts, prescription refills, and the like).

Referring again to FIG. 7C, operation 732 may include operation 740 depicting facilitating, on the device, one or more operations configured to display a request for access to the data collected by one or more portions of the device, in exchange for providing at least one of the one or more identified services. For example, FIG. 3, e.g., FIG. 3C, shows facilitation of display of request for access to data acquired by the device as negotiated result of facilitating a providing of one or more identified services requesting module 340 facilitating, on the device, one or more operations configured to display a request for access to the data collected by one or more portions of the device (e.g., how many playlists were created on the smartphone, and the frequency to which those playlists are created, but not which songs are in those playlists), in exchange for providing at least one of the one or more identified services (e.g., a playlist mixing service).

Figure 7D:
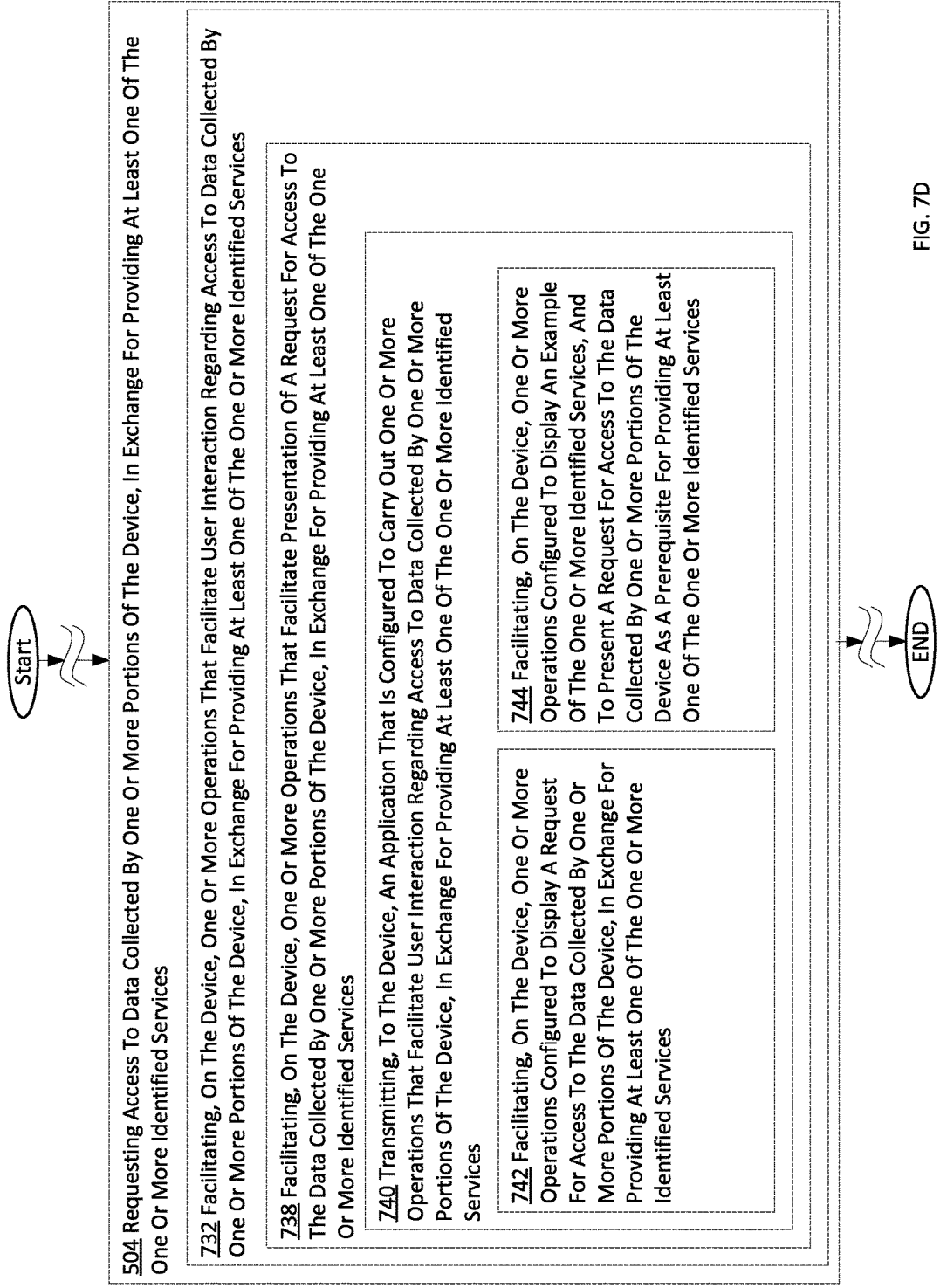
FIG. 7D is a high-level logic flow chart of a process depicting alternate implementations of a data access requesting operation 504, according to one or more embodiments.

Referring now to FIG. 7D, operation 740 may include operation 742 depicting facilitating, on the device, one or more operations configured to display a request for access to the data collected by one or more portions of the device, as a form of payment for providing at least one of the one or more identified services. For example, FIG. 3, e.g., FIG. 3C, shows facilitation of display of request for access to data acquired by the device as a payment for facilitation of providing of one or more identified services requesting module 342 facilitating, on the device, one or more operations (e.g., causing the speaker of the device, e.g., the portable navigation system, to read instructions) to display a request (e.g., the reading of instructions coupled with displaying a large "yes" box on the screen) for access to the data collected by one or more portions of the device (e.g., speed data collected by the speedometer), as a form of payment for providing at least one of the one or more identified services (e.g., tracking gas mileage and suggesting optimum speed services).

Referring again to FIG. 7D, operation 740 may include operation 744 depicting facilitating, on the device, one or more operations configured to display an example of the one or more identified services, and to present a request for access to the data collected by one or more portions of the device as a prerequisite for providing at least one of the one or more identified services. For example, FIG. 3, e.g., FIG. 3C, shows facilitation of display of request for access to data acquired by the device as a necessary condition precedent to facilitation of providing of one or more identified services requesting module 344 facilitating, on the device, one or more operations configured to display an example of the one or more identified services (e.g., a sample map of ice cream shops in a famous vicinity, e.g., Times Square, to show an example of the ice cream shop finder), and to present a request for access to the data (e.g., position data) collected by one or more portions of the device (e.g., the GPS sensor of an Apple iPhone) as a prerequisite for providing at least one of the one or more identified services (e.g., "We can't show you the ice cream shops in your area till we have access to this data").

Figure 3D:
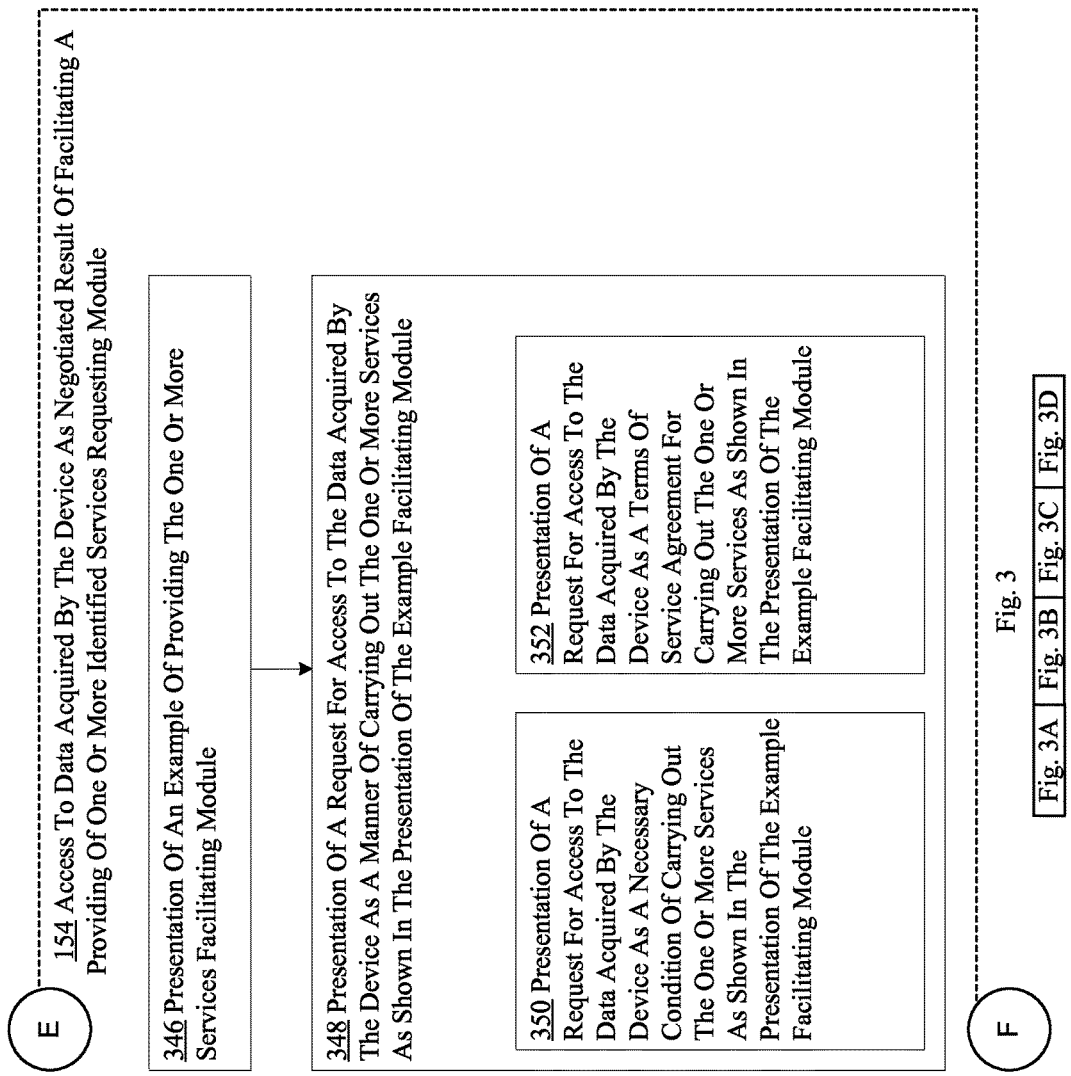
Figure 7E:
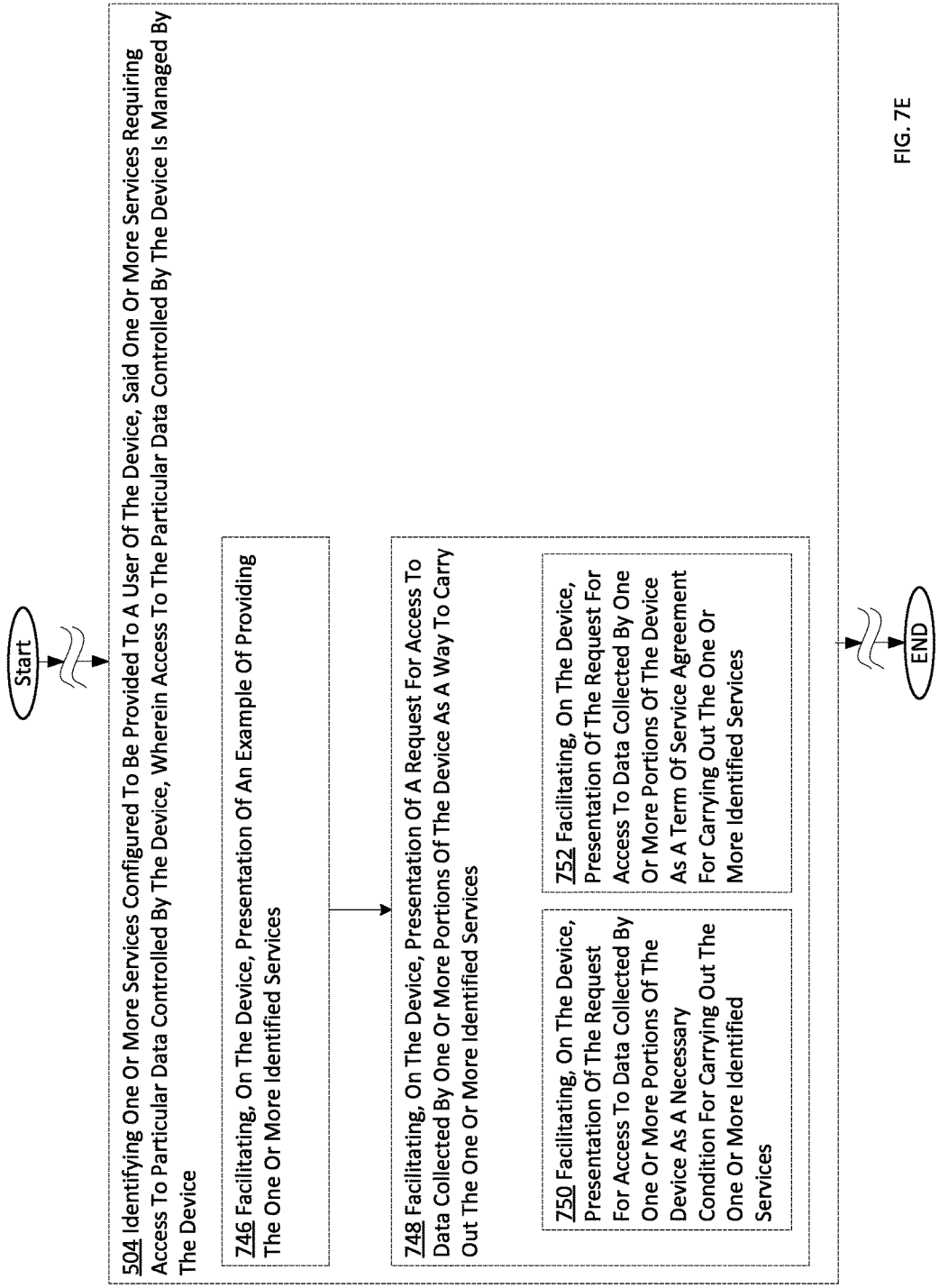
FIG. 7E is a high-level logic flow chart of a process depicting alternate implementations of a data access requesting operation 504, according to one or more embodiments.

Referring now to FIG. 7E, operation 504 may include operation 746 depicting facilitating, on the device, presentation of an example of providing the one or more identified services. For example, FIG. 3, e.g., FIG. 3D, shows presentation of an example of providing the one or more services facilitating module 346 facilitating (e.g., taking one or more steps to assist in the carrying out of), on the device (e.g., a smartphone, e.g., a Windows-branded phone), presentation of an example of providing the one or more services (e.g., showing a sample new playlist that could be created with access to the names of songs stored in the user's music cloud).

Referring again to FIG. 7E, operation 504 may include operation 748 depicting facilitating, on the device, presentation of a request for access to data collected by one or more portions of the device as a manner of carrying out the one or more identified services similarly to the presented example. For example, FIG. 3, e.g., FIG. 3D, shows presentation of a request for access to the data acquired by the device as a manner of carrying out the one or more services as shown in the presentation of the example facilitating module 348 facilitating, on the device (e.g., the Windows-branded phone), presentation of a request for access to data (e.g., for access to a list of songs) collected by one or more portions of the device (e.g., downloaded from a place and received at the phone, or stored in the cloud after being purchased using an account associated with the phone) as a manner of carrying out the one or more identified services (e.g., the access to the list of songs is presented as a manner of carrying out the auto-playlisting service) similarly to the presented example (e.g., the showing of a sample new playlist).

Referring again to FIG. 7E, operation 748 may include operation 750 depicting facilitating, on the device, presentation of the request for access to data collected by one or more portions of the device as a necessary condition for carrying out the one or more identified services. For example, FIG. 3, e.g., FIG. 3D shows presentation of a request for access to the data acquired by the device as a necessary condition of carrying out the one or more services as shown in the presentation of the example facilitating module 350 facilitating, on the device, presentation of the request for access to data collected by one or more portions of the device (e.g., data regarding the user's web browsing history) as a necessary condition for carrying out the one or more identified services (e.g., suggesting new websites that the user might be interested in browsing).

Referring again to FIG. 7E, operation 748 may include operation 752 depicting facilitating, on the device, presentation of the request for access to data collected by one or more portions of the device as a term of service agreement for carrying out the one or more identified services. For example, FIG. 3, e.g., FIG. 3D, shows presentation of a request for access to the data acquired by the device as a form of payment for carrying out the one or more services as shown in the presentation of the example facilitating module 352 facilitating, on the device, presentation of the request for access to data collected by one or more portions of the device (e.g., listings of various wireless networks detected by the wireless radio) as a term of service agreement (e.g., as part of the EULA when the user subscribes to the service) for carrying out the one or more identified services (e.g., showing a map of areas covered by public wireless networks).

Figure 8A:
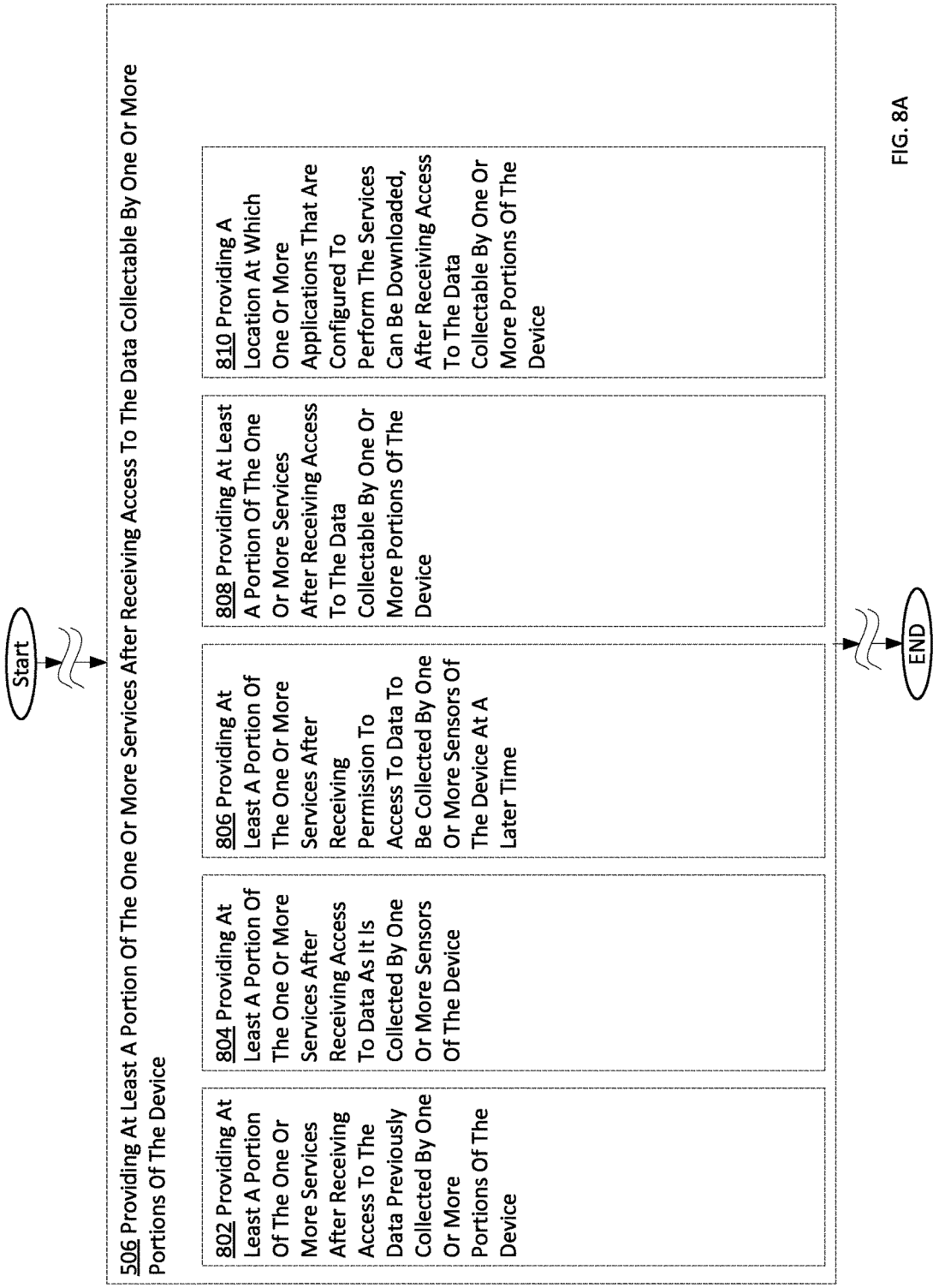
FIG. 8A is a high-level logic flow chart of a process depicting alternate implementations of a providing operation 506, according to one or more embodiments.

FIGS. 8A-8E depict various implementations of operation 506 depicting providing at least a portion of the one or more services after receiving access to the data collectable by one or more portions of the device, according to embodiments. Referring now to FIG. 8A, operation 506 may include operation 802 depicting providing at least a portion of the one or more services after receiving access to the data previously collected by one or more portions of the device. For example, FIG. 4, e.g., FIG. 4A, shows provision of at least a portion of the one or more services facilitating upon receipt of negotiated access to data previously acquired by the device module 402 providing at least a portion of the one or more services (e.g., for the service "show all the ATMs close to the user's device location," providing a list of the ATMs to the device and letting the device do further filtering) after receiving access to the data (e.g., position data) previously collected by one or more portions of the device.

Referring again to FIG. 8A, operation 506 may include operation 804 depicting providing at least a portion of the one or more services after receiving access to data as it is collected by one or more sensors of the device. For example, FIG. 4, e.g., FIG. 4A, shows provision of at least a portion of the one or more services facilitating upon receipt of negotiated access to data as it is obtained by the device module 404 providing at least a portion of the one or more services (e.g., making a download of an application that carries out the service available) after receiving access to data (e.g., velocity data) as it is collected by one or more sensors (e.g., velocity sensors) of the device (e.g., an in car motor vehicle control system).

Referring again to FIG. 8A, operation 506 may include operation 806 depicting providing at least a portion of the one or more services after receiving permission to access data to be collected by one or more sensors of the device at a later time. For example, FIG. 4, e.g., FIG. 4A, shows provision of at least a portion of the one or more services facilitating upon receipt of negotiated access to data after it is obtained by the device module 406 providing at least a portion of the one or more services providing at least a portion of the one or more services (e.g., providing one or more instructions for carrying out at least a portion of a service that identifies lower-calorie restaurant alternatives near any restaurant the user chooses) after receiving permission to access to data to be collected by one or more sensors (e.g., data of the review of the restaurant typed by the keyboard of the device, e.g., the sensor of the computer) at a later time (e.g., when the user gets back from the restaurant and fills out the review on her computer).

Referring again to FIG. 8A, operation 506 may include operation 808 depicting providing at least a portion of the one or more services after receiving access to the data collectable by one or more portions of the device. For example, FIG. 4, e.g., FIG. 4A, shows provision of at least a portion of the one or more services facilitating upon receipt of negotiated access to data obtained by a device environment interaction component module 408 providing at least a portion of the one or more services (e.g., providing computing power and/or memory to carry out a service of tracking weather and light phenomena for a garden planning service) after receiving access to the data (e.g., barometer, temperature, and ambient light data) collectable by one or more portions of the device (e.g., a smartphone with weather detecting extensions).

Referring again to FIG. 8A, operation 506 may include operation 810 depicting providing a location at which one or more applications that are configured to perform the services can be downloaded, after receiving access to the data collectable by one or more portions of the device. For example, FIG. 4, e.g., FIG. 4A, shows providing a location at which one or more applications configured to perform one or more services are configured to be downloaded upon receipt of negotiated access to data acquired by the device module 410 providing a location (e.g., a server, e.g., a network computer, e.g., providing a web address) at which one or more applications that are configured to perform the services can be downloaded (e.g., retrieved by the device), after receiving access to the data collectable by one or more portions of the device (e.g., a tablet device, e.g., an Apple iPad).

Referring now to FIG. 8B, operation 506 may include operation 812 depicting providing at least a portion of a physical activity tracker service after receiving access to the data collectable by one or more portions of the device. For example, FIG. 4, e.g., FIG. 4B, shows provision of at least a portion of a physical activity tracker service facilitating upon receipt of negotiated access to data acquired by the device module 412 providing at least a portion of a physical activity tracker service after receiving access to the data (e.g., calorie burning data) collectable by one or more portions of the device (e.g., the device, e.g., a treadmill at a gym) has a heart rate monitor, which it then uses the data from that to extrapolate calorie burning)

Referring again to FIG. 8B, operation 812 may include operation 814 depicting providing an application that carries out the physical activity tracker service, after receiving access to the data collectable by one or more portions of the device. For example, FIG. 4, e.g., FIG. 4B, shows facilitating a download of an application configured to carry out at least a portion of a physical activity tracker service facilitating upon receipt of negotiated access to data acquired by the device module 414 providing an application (e.g., a program running on a smartphone) that carries out a physical activity tracker service, after receiving access to the data collectable by one or more portions of the device (e.g., a speedometer of the device, e.g., a smartphone device).

Referring again to FIG. 8B, operation 812 may include operation 816 depicting providing access to a data repository configured to receive data related to the physical activity tracker service from the device, after receiving access to the data collectable by one or more portions of the device. For example, FIG. 4, e.g., FIG. 4B, shows providing access to a data repository configured to receive data related to the physical activity tracker service upon receipt of negotiated access to data acquired by the device module 416 providing access to a data repository (e.g., a remote location where data is stored on behalf of one or more devices) configured to receive data (e.g., distance traveled) related to the physical activity tracker service from the device (e.g., a piece of clothing wired to track and relay data), after receiving access to the data collectable by one or more portions of the device (e.g., a separate piece of equipment, e.g., a home server, that is linked to the piece of clothing that tracks and relays data, grants access to the data collectible by the piece of clothing with tracking equipment).

Referring again to FIG. 8B, operation 816 may include operation 818 depicting providing access to a data repository configured to receive data related to the physical activity tracker service from the device, after receiving access to device acceleration data collectable by an accelerometer of the device. For example, FIG. 4, e.g., FIG. 4B, shows providing access to a data repository configured to receive data related to the physical activity tracker service upon receipt of negotiated access to acceleration data acquired by a device accelerometer module 418 providing access to a data repository (e.g., a location that stores data) configured to receive data (e.g., data regarding acceleration) related to the physical activity tracker service from the device (e.g., a personal training watch worn by a user), after receiving access to device acceleration data collectable by an accelerometer of the device.

Referring again to FIG. 8B, operation 816 may include operation 820 depicting providing access to a data repository configured to receive data related to the physical activity tracker service from the device, after receiving access to activity name information spoken into a device microphone and stored on the device. For example, FIG. 4, e.g., FIG. 4B, shows providing access to a data repository configured to receive data related to the physical activity tracker service upon receipt of negotiated access to activity name inputted to the device by a user and stored in the device module 420 providing access to a data repository (e.g., one or more structures, e.g., servers, hard drives, removable media, physical media, ordered matter, or any structure designed to store data) configured to receive data related to the physical activity tracker service (e.g., to receive name of activity, duration, and intensity level), after receiving access to activity name information (e.g., "Spin class, thirty minutes, intensity eight out of ten") spoken into a device microphone and stored on the device.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A method, comprising:
   receiving at least one indication of at least one property of a device that does not particularly identify the device and that does not particularly identify a user of the device, wherein the at least one indication of at least one property includes at least one indication of at least one velocity range and at least one duration during which the device travels within the at least one velocity range;
   determining one or more services to be provided to a user of the device at least partly based on the at least one velocity range and the at least one duration, the one or more services requiring access to particular data maintained by the device that would particularly identify at least one of the device or the user of the device and requiring access to position data derived from at least one hardware component of the device;
   requesting access to the particular data maintained by the device, the particular data including the position data derived from the at least one hardware component of the device, in exchange for providing the one or more services including at least one service that is a location-based service which requires the access to the position data derived from the at least one hardware component of the device to be carried out;
   providing at least a portion of the one or more services after receiving access to the particular data maintained by the device; and
   obtaining at least one identification of the at least one of the device or the user of the device from the particular data maintained by the device,
   wherein at least one of the receiving, determining, requesting, providing, or obtaining is at least partially implemented using at least one processing device.

2. The method of claim 1, wherein the requesting access to the particular data maintained by the device, the particular data including the position data derived from the at least one hardware component of the device, in exchange for providing the one or more services including at least one service that is a location-based service which requires the access to the position data derived from the at least one hardware component of the device to be carried out comprises:
   requesting the access to the particular data maintained by the device, the particular data including at least some data collected by one or more sensors of the device as the position data derived from the at least one hardware component of the device, in the exchange for the providing the one or more services including the at least one service that is the location-based service which requires the access to the position data derived from the at least one hardware component of the device to be carried out.

3. The method of claim 1, wherein the requesting access to the particular data maintained by the device, the particular data including the position data derived from the at least one hardware component of the device, in exchange for providing the one or more services including at least one service that is a location-based service which requires the access to the position data derived from the at least one hardware component of the device to be carried out comprises:
   requesting the access, from the device, to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out.

4. The method of claim 3, wherein the requesting the access, from the device, to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out comprises:

requesting the access, from an application of the device that controls access to one or more portions of the device including at least the particular data, to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out.

5. The method of claim 3, wherein the requesting the access, from the device, to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out comprises:

requesting the access, from the device, which has been pre-authorized by the user of the device to allow access under one or more particular conditions, to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out.

6. The method of claim 5, wherein the requesting the access, from the device, which has been pre-authorized by the user of the device to allow access under one or more particular conditions, to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out comprises:

requesting the access, from the device, which has been pre-authorized by the user of the device to allow access to one or more applications authored by a particular entity, to allow the access to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out.

7. The method of claim 5, wherein the requesting the access, from the device, which has been pre-authorized by the user of the device to allow access under one or more particular conditions, to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out comprises:

requesting the access, from the device, which has been pre-authorized by the user of the device to allow access to one or more applications authored by a same entity as one or more applications previously operated by the device to allow the access to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out.

8. The method of claim 5, wherein the requesting the access, from the device, which has been pre-authorized by the user of the device to allow access under one or more particular conditions, to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out comprises:

requesting the access, from the device, which has been pre-authorized by the user of the device to allow access to one or more applications that use a particular type of data, to allow the access to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out.

9. The method of claim 1, wherein the requesting access to the particular data maintained by the device, the particular data including the position data derived from the at least one hardware component of the device, in exchange for providing the one or more services including at least one service that is a location-based service which requires the access to the position data derived from the at least one hardware component of the device to be carried out comprises:

requesting the access, from the user of the device, to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out.

10. The method of claim 9, wherein the requesting the access, from the user of the device, to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out comprises:

requesting the access, from the user of the device, via the device, to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out.

11. The method of claim 10, wherein the requesting the access, from the user of the device, via the device, to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out comprises:

requesting the access, from the user of the device, by instructing the device to carry out one or more operations to facilitate at least one user interaction relating to an offer directed to the user of the device to provide the one or more services, to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out.

12. The method of claim 1, wherein the requesting access to the particular data maintained by the device, the particular data including the position data derived from the at least one hardware component of the device, in exchange for providing the one or more services including at least one service that is a location-based service which requires the access to the position data derived from the at least one hardware component of the device to be carried out comprises:

facilitating, on the device, at least one user interaction regarding the access to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out.

13. The method of claim 12, wherein the facilitating, on the device, at least one user interaction regarding the access to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out comprises:

transmitting one or more instructions to the device to carry out one or more operations that facilitate the at least one user interaction regarding the access to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out.

14. The method of claim 12, wherein the facilitating, on the device, at least one user interaction regarding the access to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out comprises:

facilitating, on the device, at least one presentation of a request for the access to the particular data maintained by the device, the particular data including the position data derived from the at least one hardware component of the device, in the exchange for the providing the one or more services including the at least one service that is the location-based service which requires the access to the position data derived from the at least one hardware component of the device to be carried out.

15. The method of claim 1, wherein the requesting access to the particular data maintained by the device, the particular data including the position data derived from the at least one hardware component of the device, in exchange for providing the one or more services including at least one service that is a location-based service which requires the access to the position data derived from the at least one hardware component of the device to be carried out comprises:

facilitating, on the device, at least one display of a request for the access to the particular data maintained by the device, the particular data including the position data derived from the at least one hardware component of the device, to be granted by the user as a form of payment by the user for receiving the one or more services including the at least one service that is the location-based service which requires the access to the position data derived from the at least one hardware component of the device to be carried out.

16. The method of claim 1, wherein the providing at least a portion of the one or more services after receiving access to the particular data maintained by the device comprises:

providing the at least the portion of the one or more services after receiving the access to the particular data maintained by the device including at least some data previously collected by one or more portions of the device.

17. The method of claim 1, wherein the providing at least a portion of the one or more services after receiving access to the particular data maintained by the device comprises:

providing the at least the portion of the one or more services after receiving the access to the particular data maintained by the device including at least some data provided as it is collected by one or more sensors of the device.

18. The method of claim 1, wherein the providing at least a portion of the one or more services after receiving access to the particular data maintained by the device comprises:

providing the at least the portion of the one or more services after receiving permission to access data to be collected by one or more sensors of the device at a later time.

19. The method of claim 1, wherein the providing at least a portion of the one or more services after receiving access to the particular data maintained by the device comprises:

providing a location at which one or more applications that are configured to perform the one or more services can be downloaded after the receiving the access to the particular data maintained by the device.

20. The method of claim 1, wherein the providing at least a portion of the one or more services after receiving access to the particular data maintained by the device comprises:
  providing the at least the portion of the one or more services including at least an exercise tracker service after the receiving the access to the particular data maintained by the device.

21. The method of claim 20, wherein the providing the at least the portion of the one or more services including at least an exercise tracker service after the receiving the access to the particular data maintained by the device comprises:
  providing an application that carries out the exercise tracker service after the receiving the access to the particular data maintained by the device including at least receiving access to device acceleration data collectable by an accelerometer of the device.

22. The method of claim 1, wherein the receiving at least one indication of at least one property of a device that does not particularly identify the device and that does not particularly identify a user of the device, wherein the at least one indication of at least one property includes at least one indication of at least one velocity range and at least one duration during which the device travels within the at least one velocity range comprises:
  receiving one or more pieces of information collected by the device, in addition to the at least one indication of the at least one velocity range and the at least one duration during which the device travels within the at least one velocity range, that does not particularly identify the device and that does not particularly identify the user of the device.

23. The method of claim 22, wherein the receiving one or more pieces of information collected by the device, in addition to the at least one indication of the at least one velocity range and the at least one duration during which the device travels within the at least one velocity range, that does not particularly identify the device and that does not particularly identify the user of the device comprises:
  receiving at least some data regarding an existence of the one or more pieces of the information collected by the device that does not particularly identify the device and that does not particularly identify the user of the device.

24. The method of claim 22, wherein the receiving one or more pieces of information collected by the device, in addition to the at least one indication of the at least one velocity range and the at least one duration during which the device travels within the at least one velocity range, that does not particularly identify the device and that does not particularly identify the user of the device comprises:
  receiving at least one of the one or more pieces of the information collected by the device that does not particularly identify the device and that does not particularly identify the user of the device.

25. The method of claim 1, wherein the receiving at least one indication of at least one property of a device that does not particularly identify the device and that does not particularly identify a user of the device, wherein the at least one indication of at least one property includes at least one indication of at least one velocity range and at least one duration during which the device travels within the at least one velocity range comprises:
  receiving at least one indication of one or more pieces of information collected by a device, in addition to the at least one indication of the at least one velocity range and the at least one duration during which the device travels within the at least one velocity range, that does not particularly identify a different device that collected the information.

26. The method of claim 1, wherein the receiving at least one indication of at least one property of a device that does not particularly identify the device and that does not particularly identify a user of the device, wherein the at least one indication of at least one property includes at least one indication of at least one velocity range and at least one duration during which the device travels within the at least one velocity range comprises:
  receiving the at least one indication of the at least one property of a device that omits a device identifier associated with the device.

27. The method of claim 1, wherein the receiving at least one indication of at least one property of a device that does not particularly identify the device and that does not particularly identify a user of the device, wherein the at least one indication of at least one property includes at least one indication of at least one velocity range and at least one duration during which the device travels within the at least one velocity range comprises:
  receiving at least one indication of at least one velocity range and at least one duration during which the device travels within the at least one velocity range, the at least one indication of the at least one velocity range and the at least one duration during which the device travels within the at least one velocity range not identifying the particular velocities at which the device travels during the at least one duration.

28. The method of claim 1, wherein the obtaining at least one identification of the at least one of the device or the user of the device from the particular data maintained by the device comprises:
  obtaining the at least one identification of the at least one of the device or the user of the device from at least one network address which is the particular data maintained by the device.

29. The method of claim 28, wherein the obtaining the at least one identification of the at least one of the device or the user of the device from at least one network address which is the particular data maintained by the device comprises:
  obtaining the at least one identification of the at least one of the device or the user of the device from at least one media access control ("MAC") address as the at least one network address which is the particular data maintained by the device.

30. The method of claim 1, wherein the determining one or more services to be provided to a user of the device at least partly based on the at least one velocity range and the at least one duration, the one or more services requiring access to particular data maintained by the device that would particularly identify at least one of the device or the user of the device and requiring access to position data derived from at least one hardware component of the device comprises:
  determining the one or more services to be provided to the user of the device, the one or more services requiring access to the position data which has been derived from at least one global positioning sensor of the device.

31. The method of claim 1, wherein the determining one or more services to be provided to a user of the device at least partly based on the at least one velocity range and the at least one duration, the one or more services requiring access to particular data maintained by the device that would particularly identify at least one of the device or the user of the device and requiring access to position data derived from at least one hardware component of the device comprises:

determining the one or more services to be provided to the user of the device, the one or more services requiring access to the position data which has been derived from at least one location services application of the device which is dependent upon access to the at least one hardware component of the device.

32. The method of claim 1, wherein the receiving at least one indication of at least one property of a device that does not particularly identify the device and that does not particularly identify a user of the device, wherein the at least one indication of at least one property includes at least one indication of at least one velocity range and at least one duration during which the device travels within the at least one velocity range comprises:
receiving at least one indication of at least one property of an exercise assistant watch that does not particularly identify the exercise assistant watch and that does not particularly identify a wearer of the exercise assistant watch, wherein the at least one indication of at least one property includes an amount of time per day during which the exercise assistant watch characteristically travels within at least one velocity range.

33. The method of claim 1, wherein the determining one or more services to be provided to a user of the device at least partly based on the at least one velocity range and the at least one duration, the one or more services requiring access to particular data maintained by the device that would particularly identify at least one of the device or the user of the device and requiring access to position data derived from at least one hardware component of the device comprises:
determining at least one exercise tracker service as the one or more services to be provided to the user of the device.

34. The method of claim 1, wherein the determining one or more services to be provided to a user of the device at least partly based on the at least one velocity range and the at least one duration, the one or more services requiring access to particular data maintained by the device that would particularly identify at least one of the device or the user of the device and requiring access to position data derived from at least one hardware component of the device comprises:
determining at least one exercise tracker service as the one or more services to be provided to the user of the device at least partly based on inferring from the at least one velocity range and the at least one duration that the user of the device is exercising while in possession of the device.

35. The method of claim 1, wherein the determining one or more services to be provided to a user of the device at least partly based on the at least one velocity range and the at least one duration, the one or more services requiring access to particular data maintained by the device that would particularly identify at least one of the device or the user of the device and requiring access to position data derived from at least one hardware component of the device comprises:
determining at least one exercise tracker service as the one or more services to be provided to the user of the device at least partly based on at least one indication that the device is in motion at a velocity of between five miles per hour and eight miles per hour as the at least one velocity range and at least partly based on at least one indication that the device travels at the velocity of between five miles per hour and eight miles per hour as the at least one duration.

36. The method of claim 35, wherein the determining at least one exercise tracker service as the one or more services to be provided to the user of the device at least partly based on at least one indication that the device is in motion at a velocity of between five miles per hour and eight miles per hour as the at least one velocity range and at least partly based on at least one indication that the device travels at the velocity of between five miles per hour and eight miles per hour as the at least one duration comprises:
determining the at least one exercise tracker service as the one or more services to be provided to the user of the device at least partly based on the at least one indication that the device is in motion at the velocity of between five miles per hour and eight miles per hour as the at least one velocity range and at least partly based on the at least one indication that the device travels at the velocity of between five miles per hour and eight miles per hour on at least five days a week as the at least one duration.

37. The method of claim 1, wherein the receiving at least one indication of at least one property of a device that does not particularly identify the device and that does not particularly identify a user of the device, wherein the at least one indication of at least one property includes at least one indication of at least one velocity range and at least one duration during which the device travels within the at least one velocity range comprises:
receiving the at least one indication of the at least one property of the device that does not particularly identify the device and that does not particularly identify the user of the device, wherein the at least one indication of at least one property includes the at least one indication of at least one velocity range, the at least one duration during which the device travels within the at least one velocity range, and at least one IP address for a router to which the device is connected as a node local to the router.

38. The method of claim 1, wherein the receiving at least one indication of at least one property of a device that does not particularly identify the device and that does not particularly identify a user of the device, wherein the at least one indication of at least one property includes at least one indication of at least one velocity range and at least one duration during which the device travels within the at least one velocity range comprises:
receiving the at least one indication of the at least one property of the device that does not particularly identify the device and that does not particularly identify the user of the device, wherein the at least one indication of at least one property includes the at least one indication of at least one velocity range, the at least one duration during which the device travels within the at least one velocity range, and at least one indication of a geographic locale in which the device is located.

39. The method of claim 1, wherein the determining one or more services to be provided to a user of the device at least partly based on the at least one velocity range and the at least one duration, the one or more services requiring access to particular data maintained by the device that would particularly identify at least one of the device or the user of the device and requiring access to position data derived from at least one hardware component of the device comprises:
determining one or more services to be provided to a user of the device at least partly based on comparing the at least one velocity range and the at least one duration with at least one previous instance during which the device was in motion within the at least one velocity range for the at least one duration.

40. The method of claim 39, wherein the determining one or more services to be provided to a user of the device at least partly based on the at least one velocity range and the at least one duration, the one or more services requiring access to particular data maintained by the device that would particularly identify at least one of the device or the user of the device and requiring access to position data derived from at least one hardware component of the device comprises:

determining one or more health management services capable of being provided to a user of the device at least partly based on the at least one velocity range and the at least one duration, the one or more health management services capable of automatically scheduling one or more of physicals, dental appointments, or prescription refills and requiring access to particular data maintained by the device that would particularly identify at least one of the device or the user of the device and requiring access to position data derived from at least one hardware component of the device.

41. A system, comprising:

at least one computing device; and one or more instructions which, when executed by the at least one computing device, configure the at least one computing device to perform one or more operations including at least:

receiving at least one indication of at least one property of a device that does not particularly identify the device and that does not particularly identify a user of the device, wherein the at least one indication of at least one property includes at least one indication of at least one velocity range and at least one duration during which the device travels within the at least one velocity range;

determining one or more services to be provided to a user of the device at least partly based on the at least one velocity range and the at least one duration, the one or more services requiring access to particular data maintained by the device that would particularly identify at least one of the device or the user of the device and requiring access to position data derived from at least one hardware component of the device;

requesting access to the particular data maintained by the device, the particular data including the position data derived from the at least one hardware component of the device, in exchange for providing the one or more services including at least one service that is a location-based service which requires the access to the position data derived from the at least one hardware component of the device to be carried out;

providing at least a portion of the one or more services after receiving access to the particular data maintained by the device; and obtaining at least one identification of the at least one of the device or the user of the device from the particular data maintained by the device.

42. A system, comprising:

at least one processing device; and at least one non-transitory computer-readable medium couplable with the at least one processing device and including at least:

one or more instructions for receiving at least one indication of at least one property of a device that does not particularly identify the device and that does not particularly identify a user of the device, wherein the at least one indication of at least one property includes at least one indication of at least one velocity range and at least one duration during which the device travels within the at least one velocity range;

one or more instructions for determining one or more services to be provided to a user of the device at least partly based on the at least one velocity range and the at least one duration, the one or more services requiring access to particular data maintained by the device that would particularly identify at least one of the device or the user of the device and requiring access to position data derived from at least one hardware component of the device;

one or more instructions for requesting access to the particular data maintained by the device, the particular data including the position data derived from the at least one hardware component of the device, in exchange for providing the one or more services including at least one service that is a location-based service which requires the access to the position data derived from the at least one hardware component of the device to be carried out;

one or more instructions for providing at least a portion of the one or more services after receiving access to the particular data maintained by the device; and one or more instructions for obtaining at least one identification of the at least one of the device or the user of the device from the particular data maintained by the device.

\* \* \* \* \*